Nov. 10, 1964 R. J. BAHNSEN ETAL 3,156,897

DATA PROCESSING SYSTEM WITH LOOK AHEAD FEATURE

Filed Dec. 1, 1960 53 Sheets-Sheet 1

INVENTORS
R. J. BAHNSEN
J. F. DIRAC
BY
Hughes, Rothwell, Mion & Zinn
ATTORNEYS

FIG. 1.1

LOADING CODE

| | TYPE OF LOAD | | MEM AREA | OK | C | H | S | INT | EOP | XRS | IC | F | |
|---|---|---|---|---|---|---|---|---|---|---|---|---|---|
| I | E UNIT INSTR SINGLE FETCH | A | EXT | 0 | 1 | I/0 NOTE 2 | 0 | 0 | 1 | 0 | I/0 NOTE 1 | 0 | |
| | | B | XM | 1 | 0 | 0 | 0 | 0 | 1 | 0 | I/0 NOTE 1 | 0 | IMMEDIATE OPERANDS FALL IN THIS CLASS |
| | | C | INT | 0 | 0 | 0 | 0 | 1 | 1 | 0 | I/0 NOTE 1 | 0 | |
| II | E UNIT INSTR MULTIPLE FETCH (NOT LAST FETCH) | A | EXT | 0 | 1 | I/0 NOTE 2 | 0 | 0 | 1 | 0 | 0 | 0 | |
| | | B | XM | 1 | 0 | 0 | 0 | 0 | 1 | 0 | 0 | 0 | IMMEDIATE OPERANDS FALL IN THIS CLASS |
| | | C | INT | 0 | 0 | 0 | 0 | 1 | 1 | 0 | 0 | 0 | |
| III | E UNIT STORE | A | EXT | 0 | 1 | 0 | 1 | 0 | 1 | 0 | 1 | 0 | |
| | | B | XM | 0 | 0 | 0 | 1 | 0 | 1 | 1 | 1 | 0 | |
| | | C | INT | 0 | 0 | 0 | 1 | 1 | 1 | 0 | 1 | 0 | |
| IV | E UNIT FETCH & STORE | A | EXT | THIS IS ELEMENTALIZED INTO A MULTIPLE FETCH LOADING FOLLOWED BY A STORE LOADING. THE FETCH LEVEL HAS IC=0 | | | | | | | | | |
| | | B | XM | | | | | | | | | | |
| | | C | INT | | | | | | | | | | |
| V | INDEX MODIFICATION (LOAD OLD INDEX WORD) | | | I/0 | 1 | 0 | 0 | 0 | 0 | 1 | 1 | 0 | |
| VI | I UNIT STORE | A | EXT | 1 | 1 | 1 | 1 | 0 | 0 | 0 | 1 | 0 | |
| | | B | XM | THIS IS HANDLED LIKE INDEX MODIFICATION | | | | | | | | | |
| | | C | INT | 1 | 0 | 0 | 1 | 1 | 0 | 0 | 1 | 0 | |
| VII | INDICATOR SETTING ONLY | | | 0 | 0 | 0 | 0 | 0 | 0 | 0 | 1 | 0 | |
| VIII | BRANCH (UNCONDITIONAL) | | | 0 | 0 | 0 | 0 | 0 | 0 | 0 | 1 | 0 | |
| IX | I UNIT FETCH OF INTERNAL OPERAND | | | 0 | - | 0 | 0 | 1 | 0 | 0 | 0 | 0 | |

NOTE 1- IC=0 IF THE FETCH IS PART OF A FETCH AND STORE TYPE INSTRUCTION, OTHERWISE IC=1

NOTE 2- A COMPARE WITH THE LA EA'S IS MADE DURING THE LOAD
IF THERE IS AN EQUAL COMPARISON H⟶0
IF THERE IS NO EQUAL COMPARISON, H⟶1

FIG. 1.2 CONTROL BITS FOR LOADING LA (OK, C, H, AND S BITS)
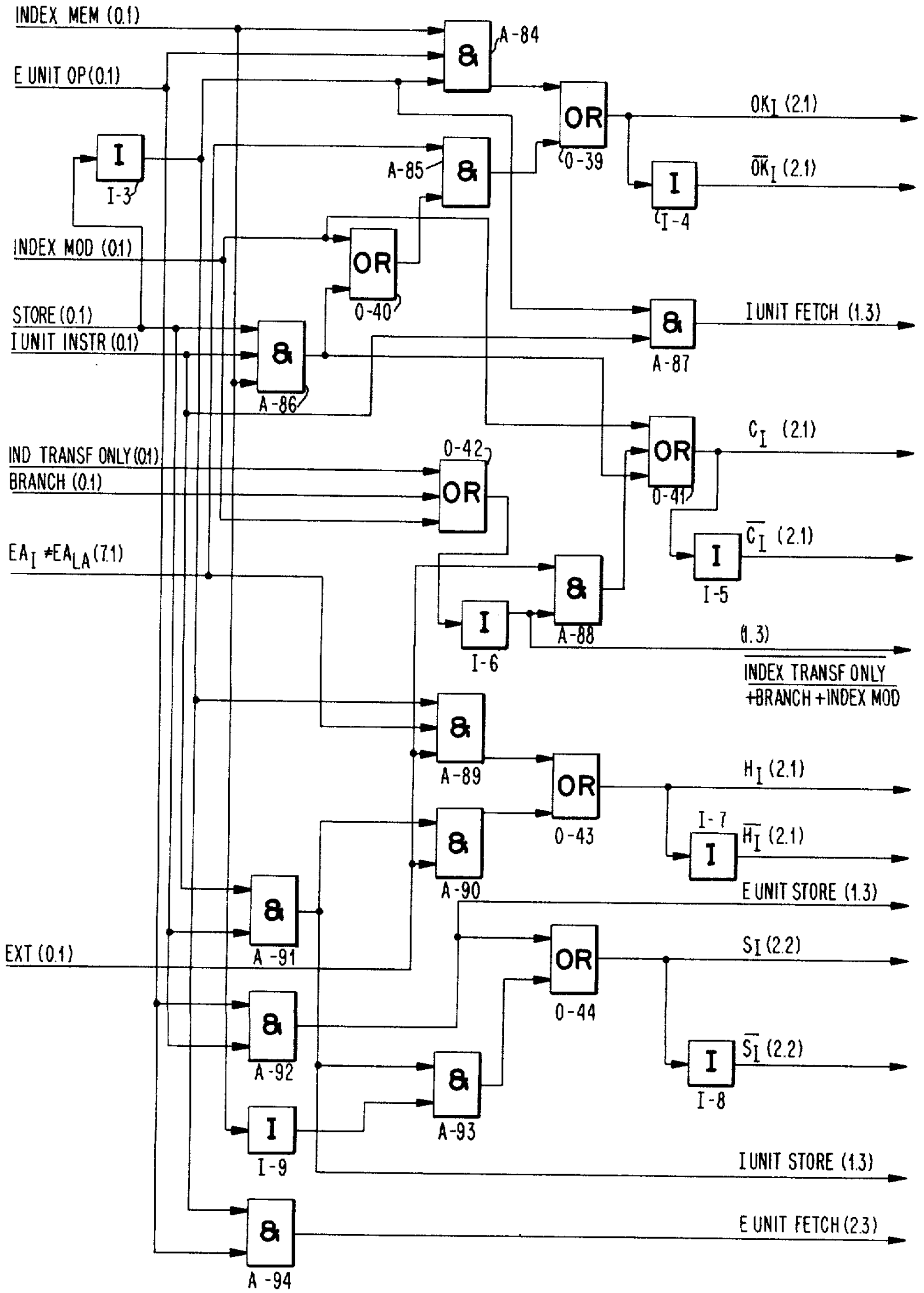

FIG. 1.3 CONTOL BITS FOR LOADING LA (INT, EOP, XRS, IC)
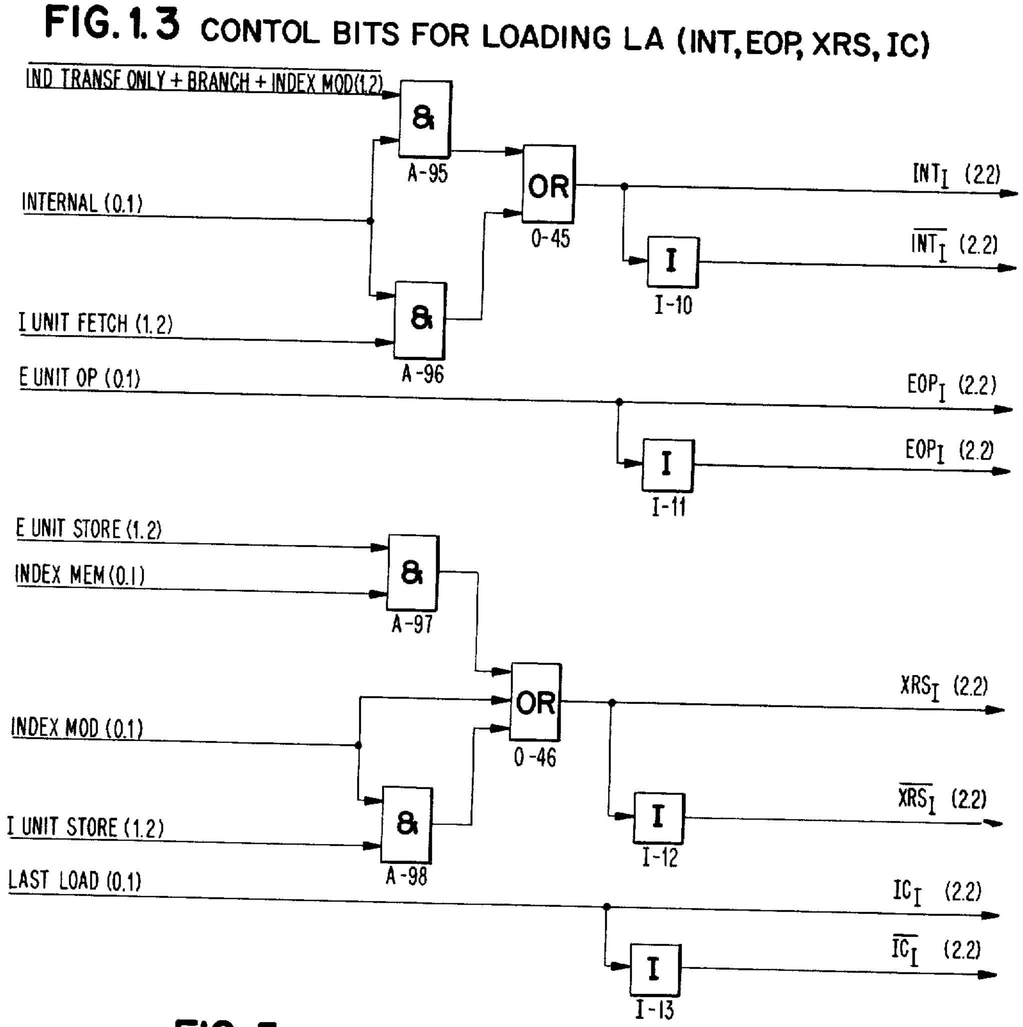
FIG. 5 INTERRUPT MECHANISM
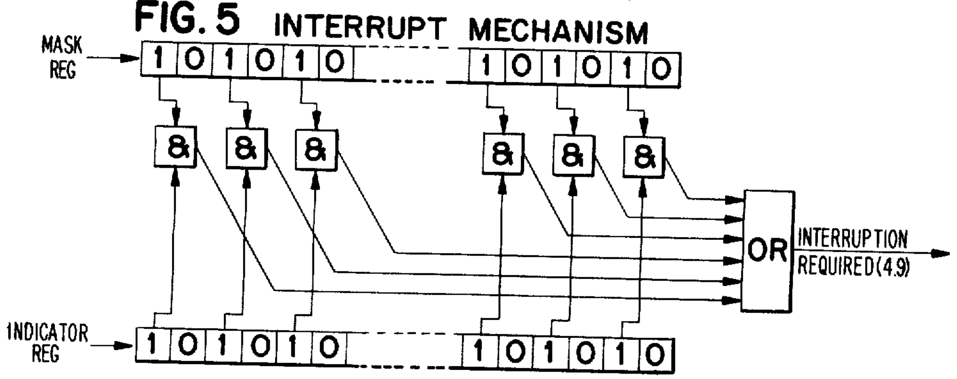

COMPARISON WITH PRIOR ART

Nov. 10, 1964 R. J. BAHNSEN ETAL 3,156,897
DATA PROCESSING SYSTEM WITH LOOK AHEAD FEATURE
Filed Dec. 1, 1960 53 Sheets-Sheet 6
FIG. 2.1
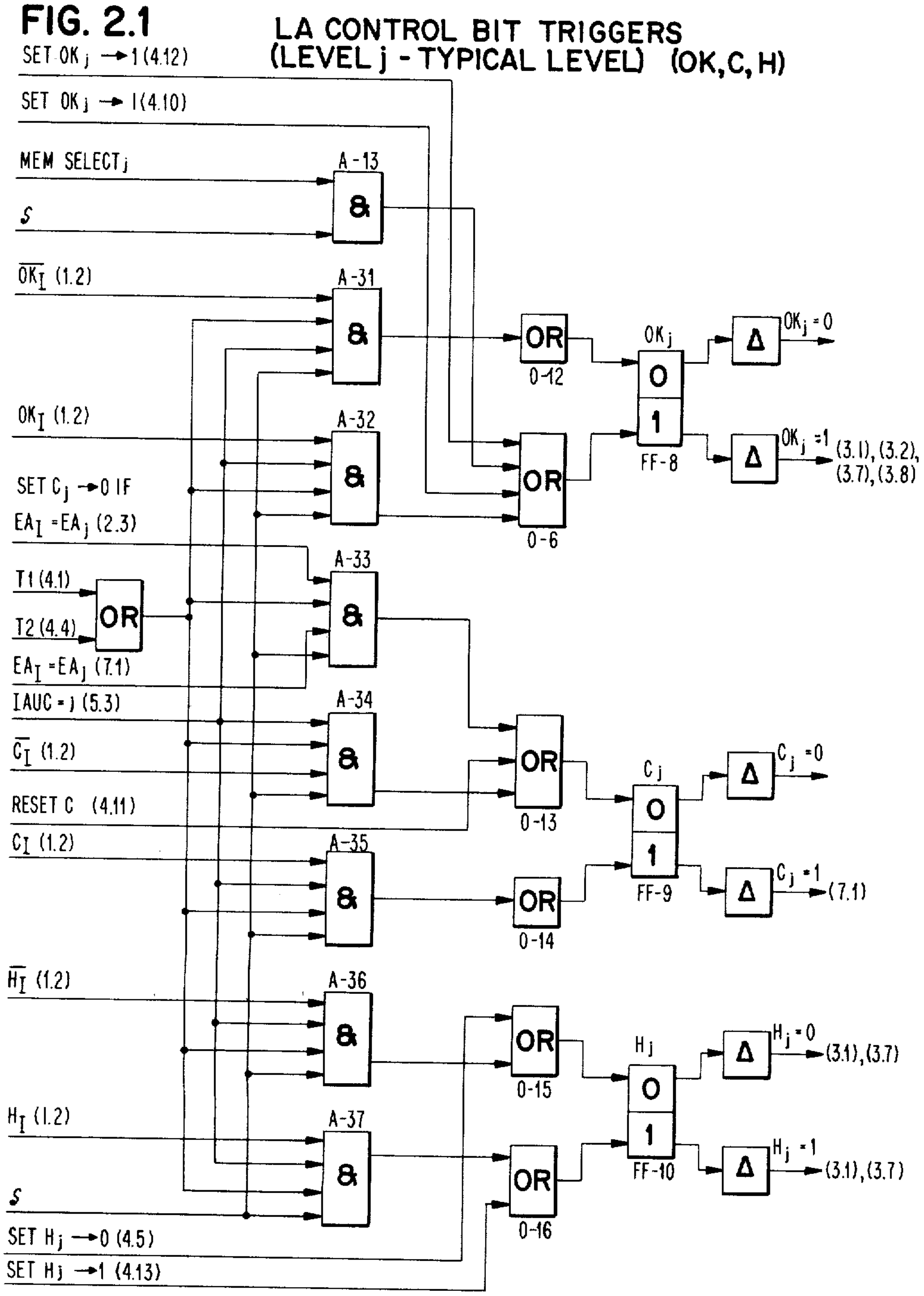

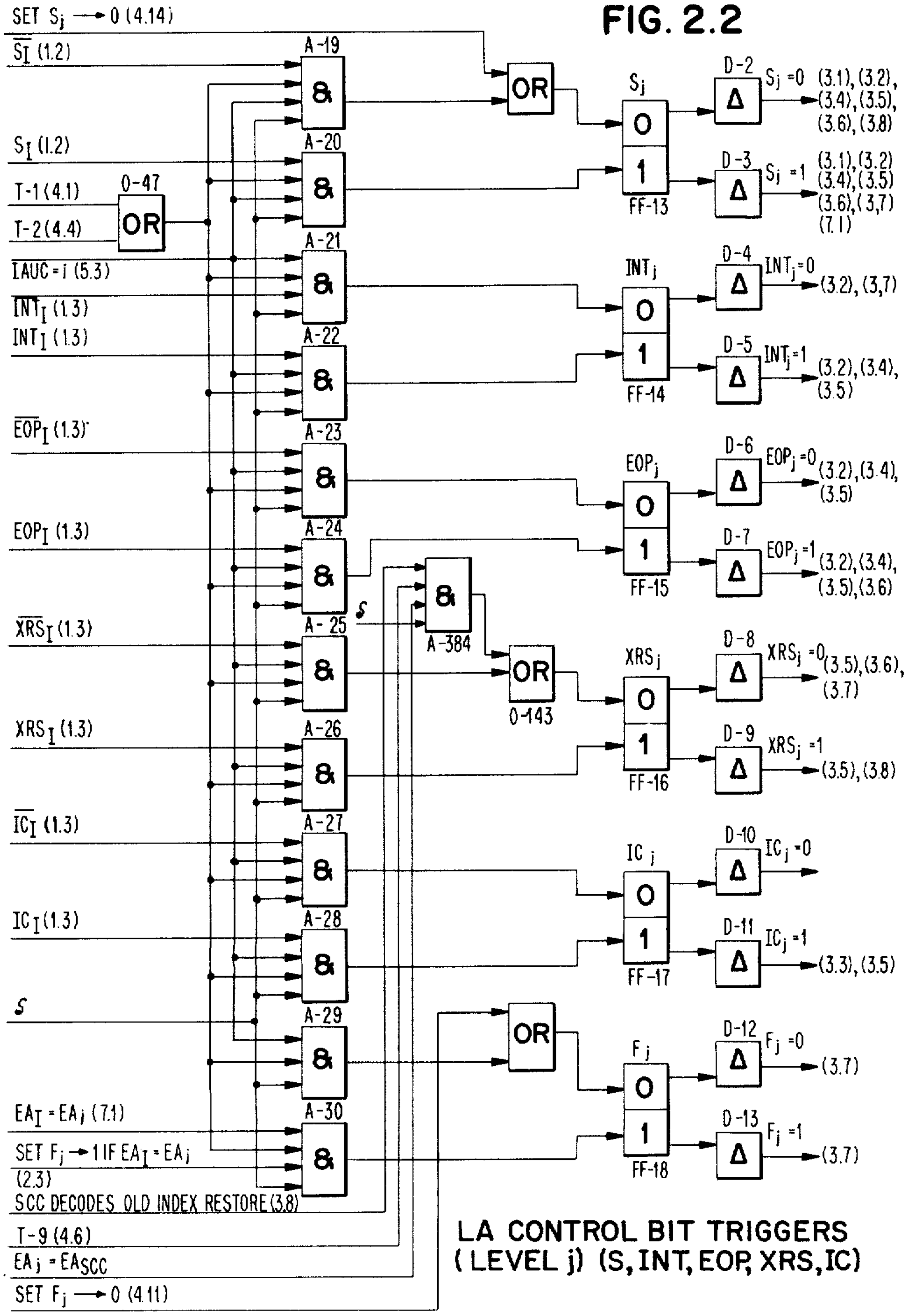
FIG. 2.2

FIG. 2.3 FORWARD SET-UP
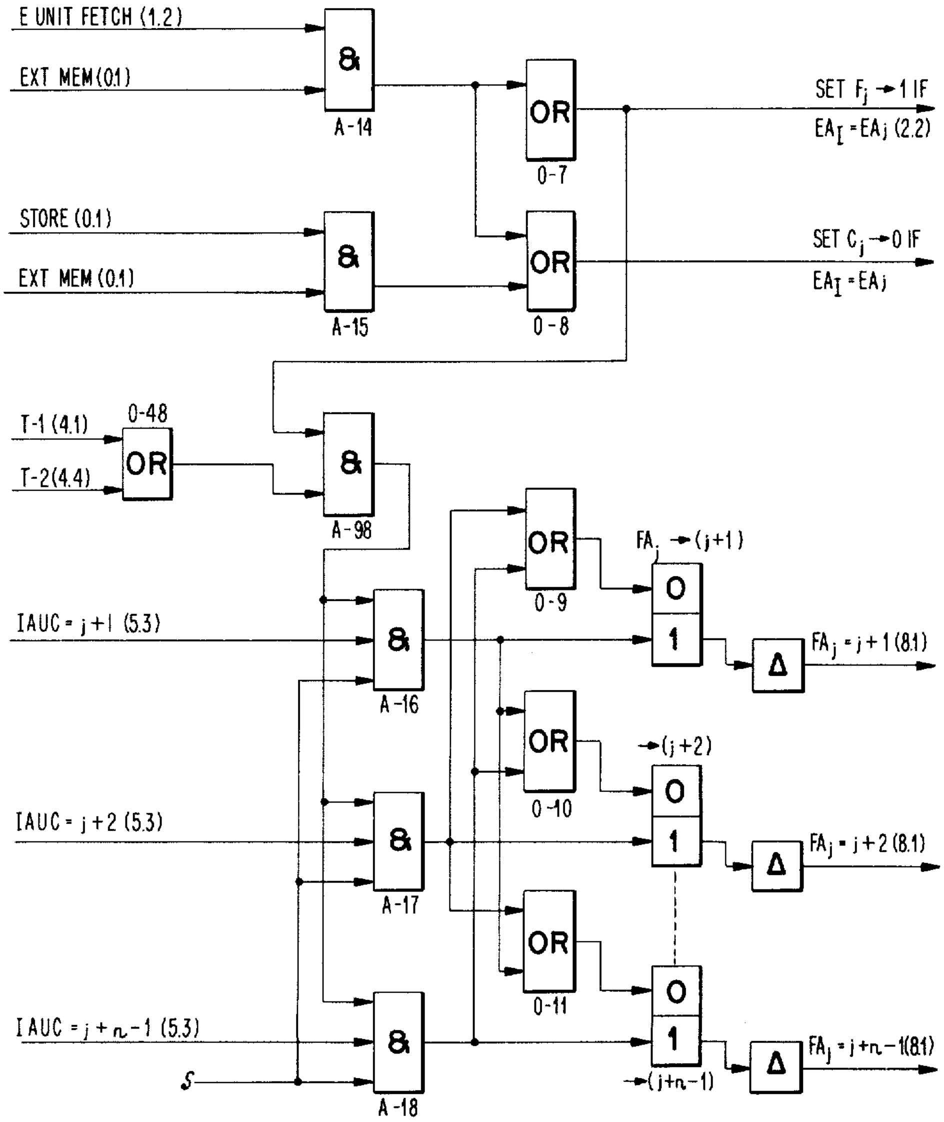
THE FA INDICATES THE REGISTER TO WHICH DATA IS TO BE FORWARDED. IF THERE ARE n LEVELS, THE NOTATIONS ABOVE THE FLIP FLOPS ARE ASSUMED TO FORM A RING WITH THE 0 TERM AND j TERM MISSING. 1, 2, . . . , j−1, j+1, . . . n−1, n, 1, 2 . . . etc.

Nov. 10, 1964 R. J. BAHNSEN ETAL 3,156,897

DATA PROCESSING SYSTEM WITH LOOK AHEAD FEATURE

Filed Dec. 1, 1960

53 Sheets-Sheet 9

Nov. 10, 1964 R. J. BAHNSEN ETAL 3,156,897
DATA PROCESSING SYSTEM WITH LOOK AHEAD FEATURE
Filed Dec. 1, 1960 53 Sheets-Sheet 10
FIG. 3.1 OCC DECODE
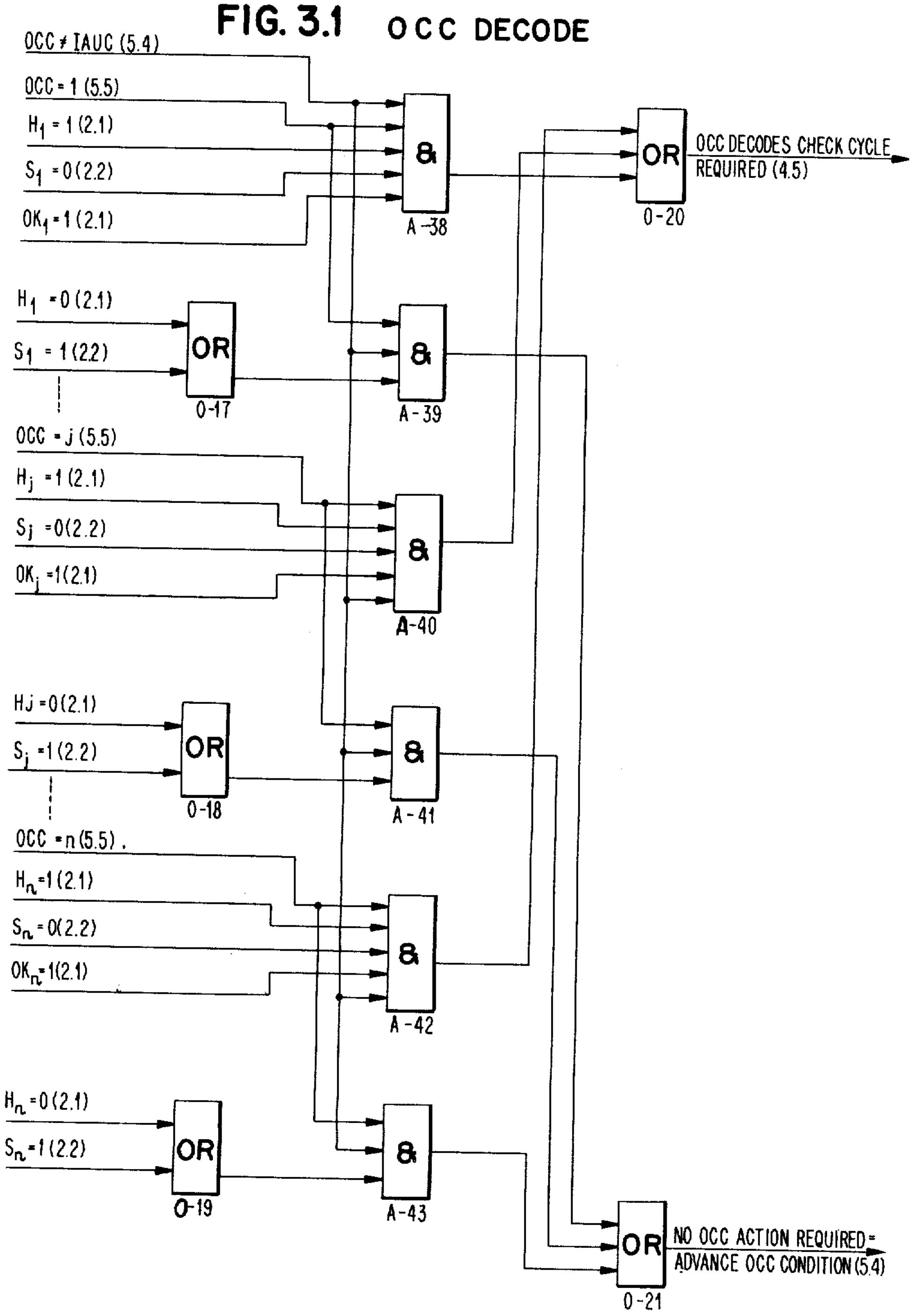

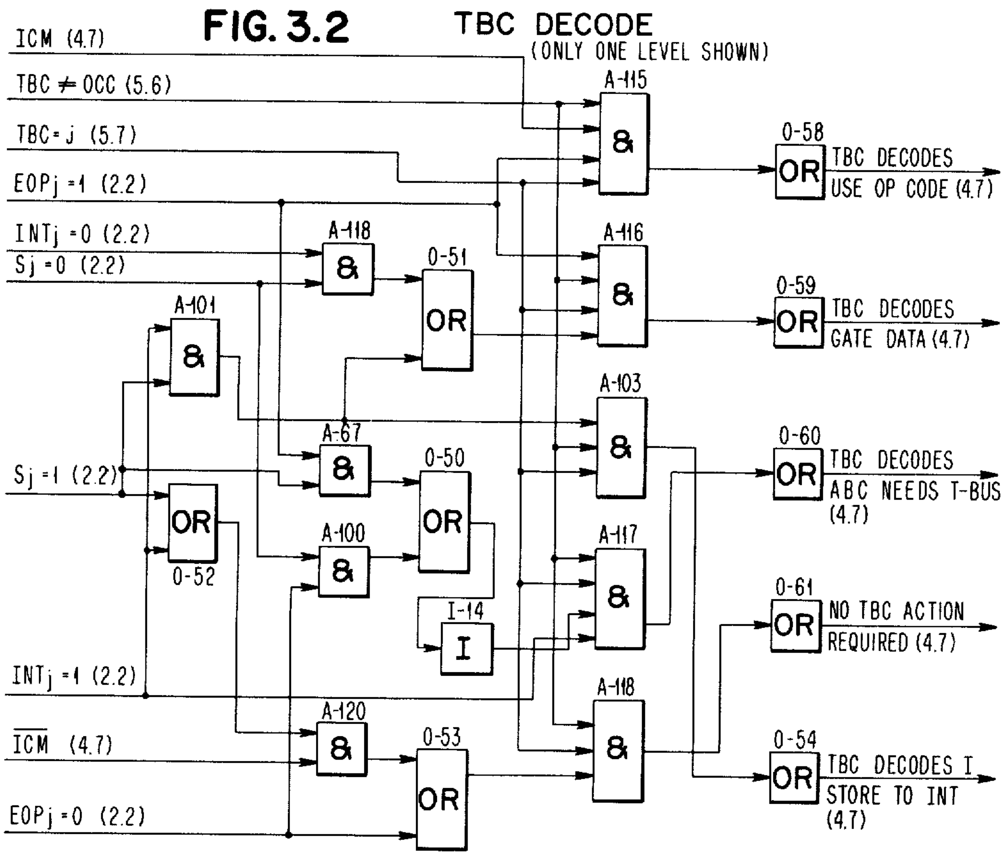
FIG. 3.2
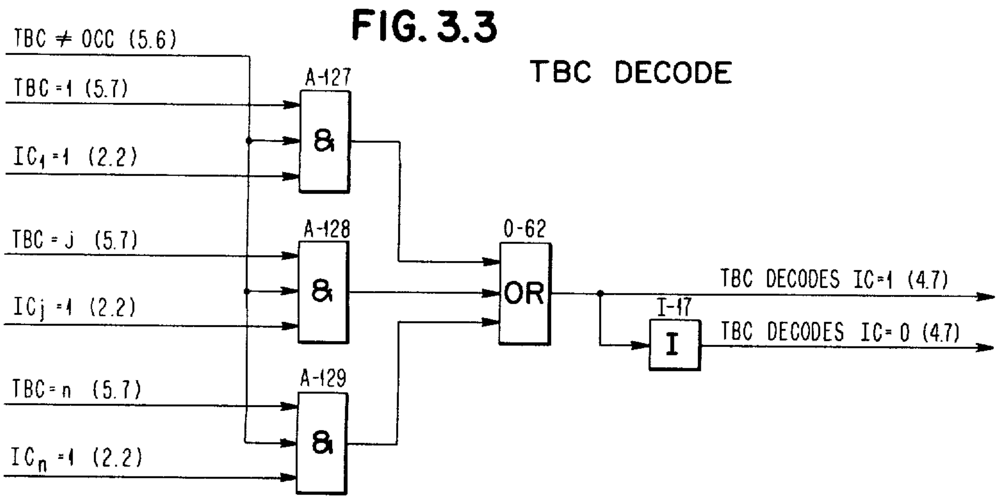
FIG. 3.3

FIG. 3.4
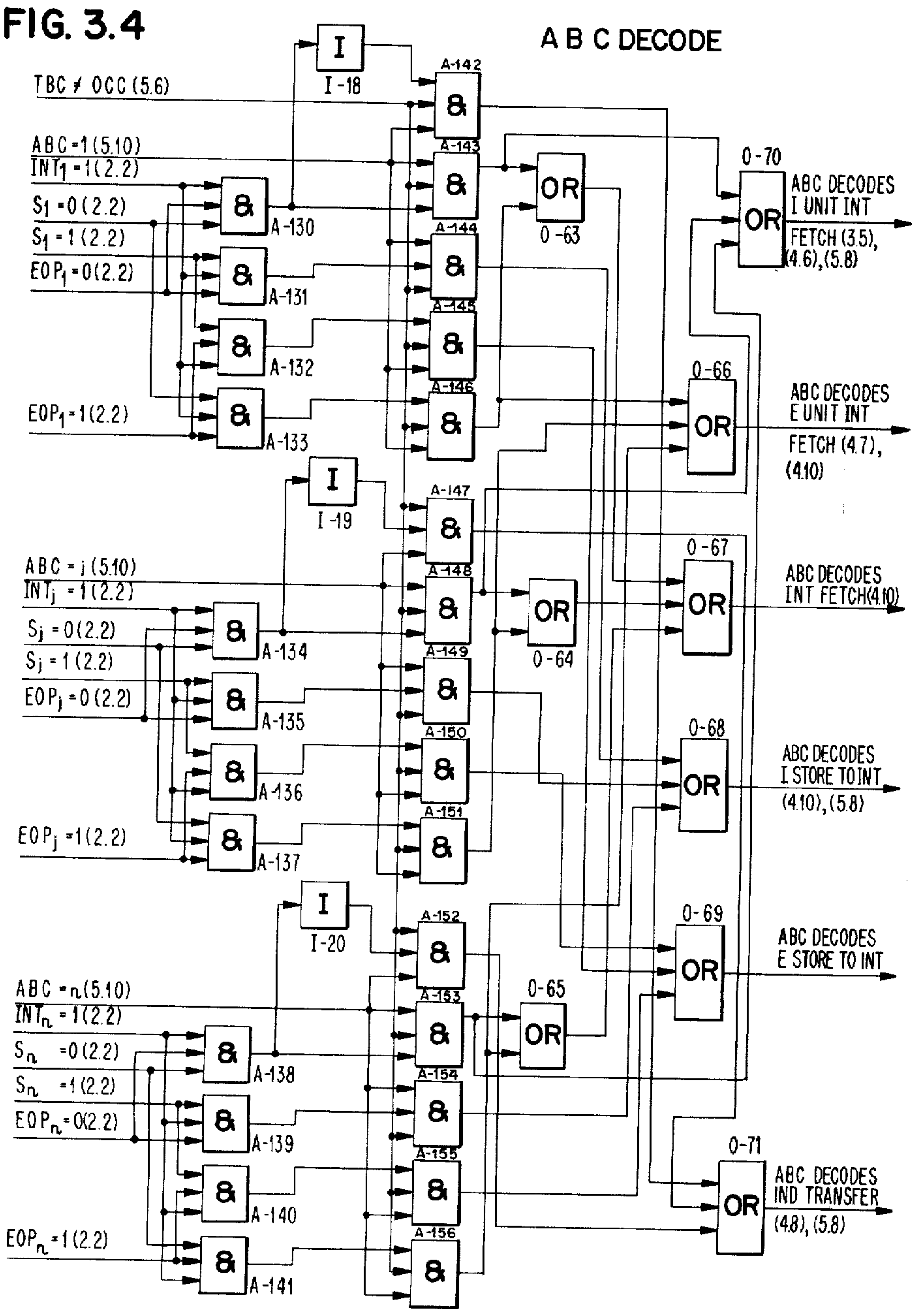

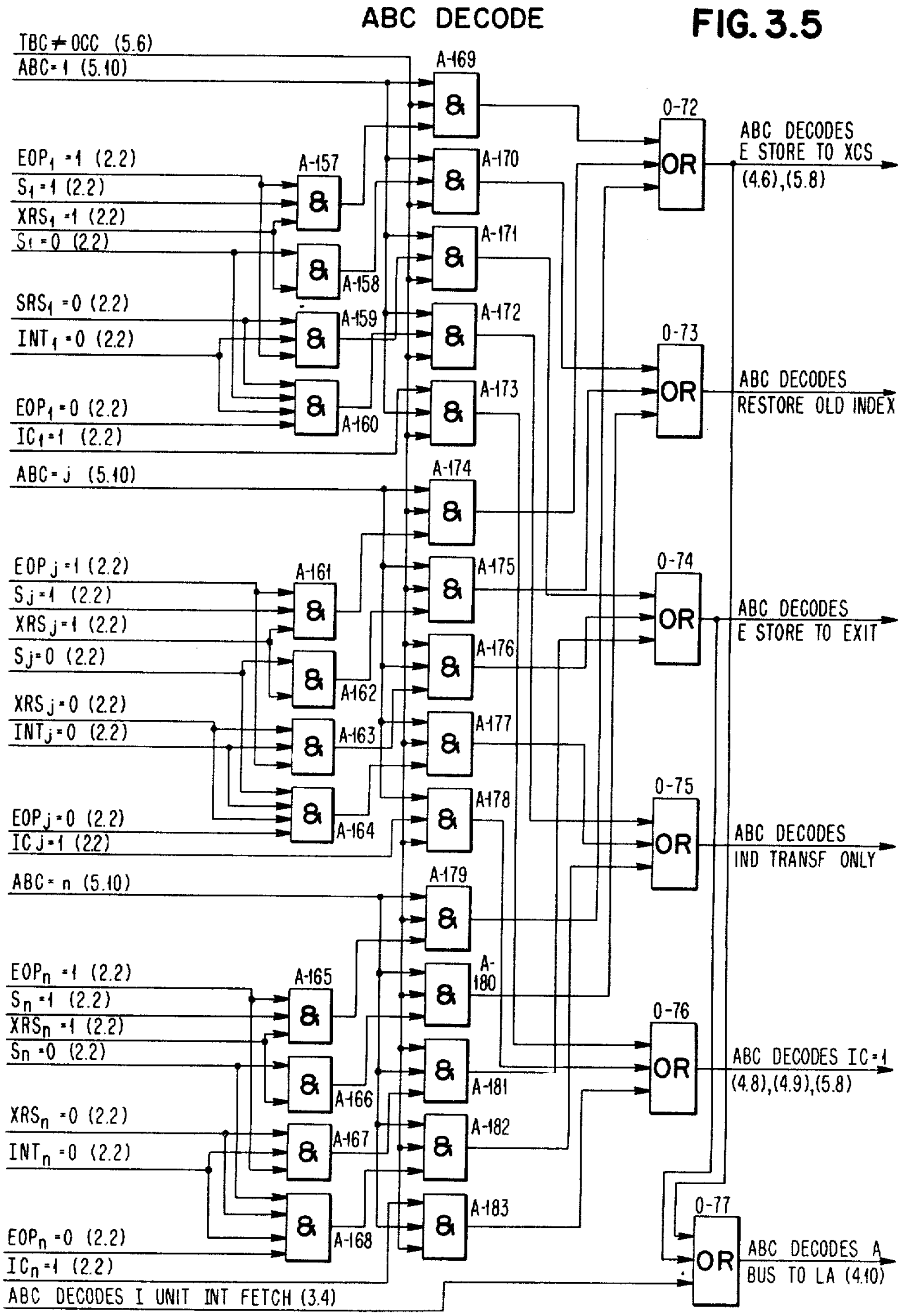
FIG. 3.5

FIG. 3.6
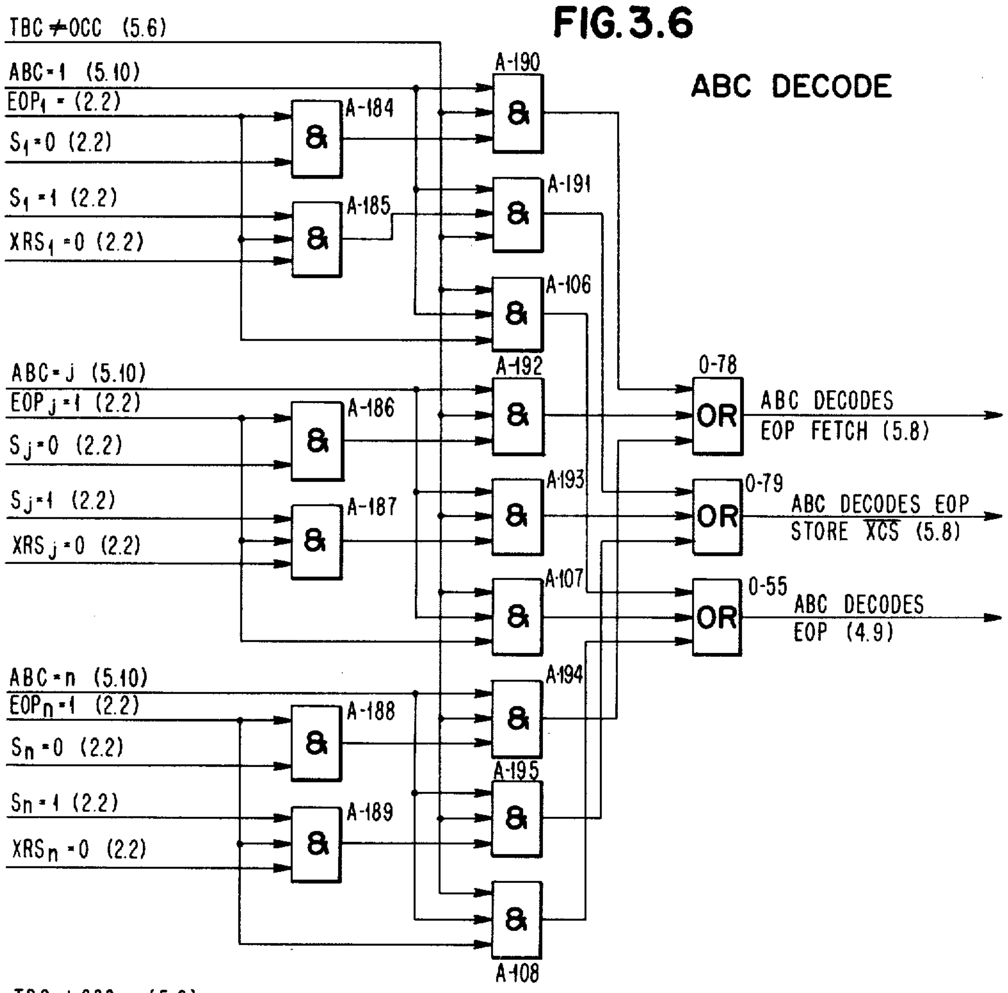
FIG. 3.8
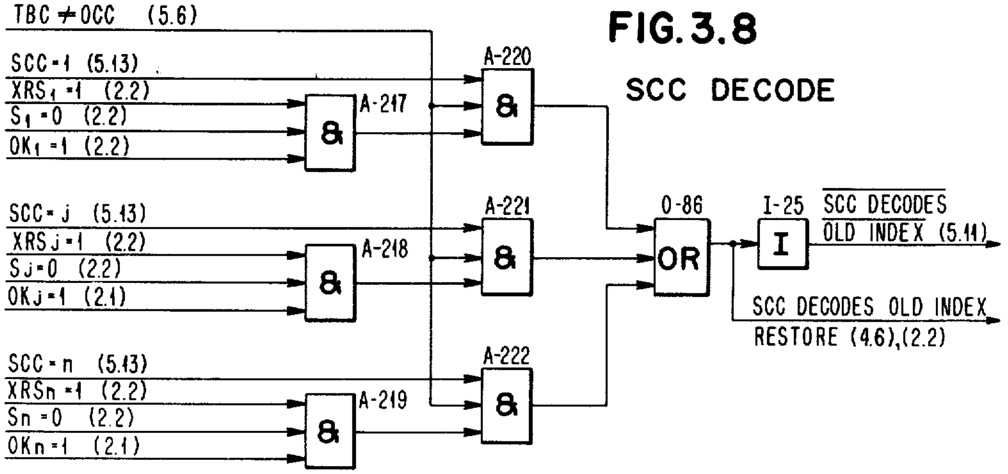

FIG. 3.7
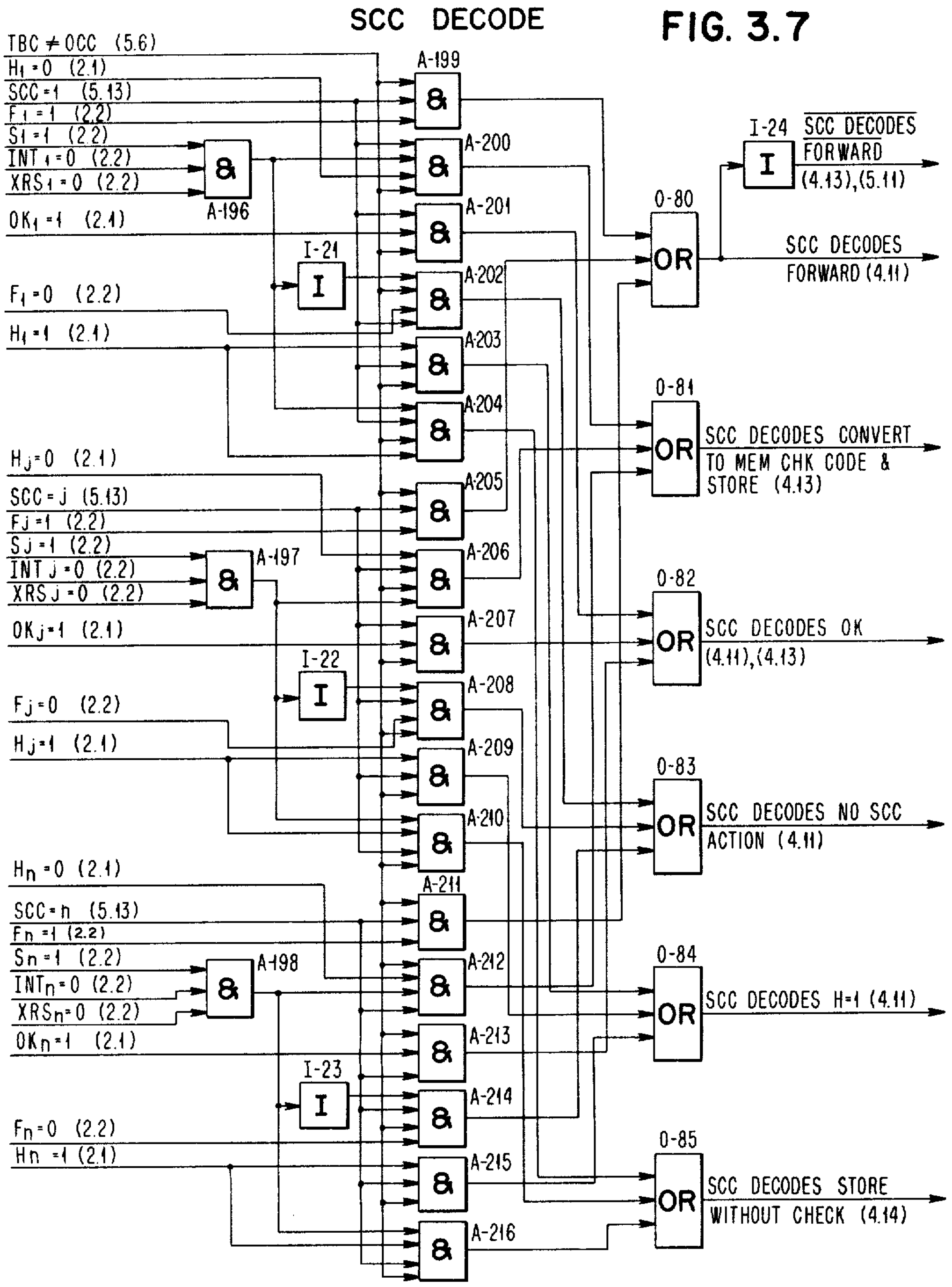

FIG. 4 TYPICAL TRIGGER POSITION OF LOOKAHEAD LEVEL (TWO OF N SHOWN)
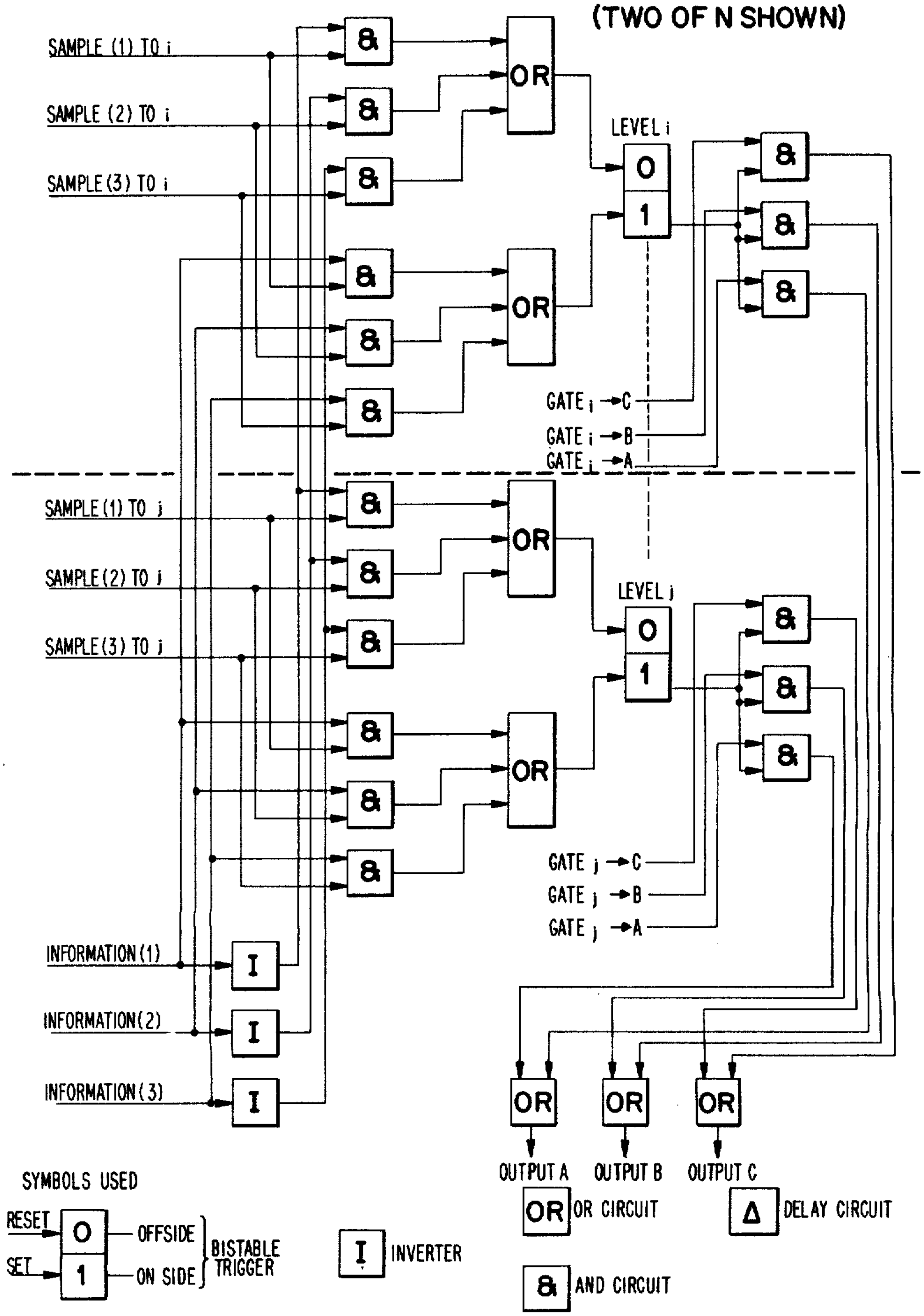

FIG. 4.1
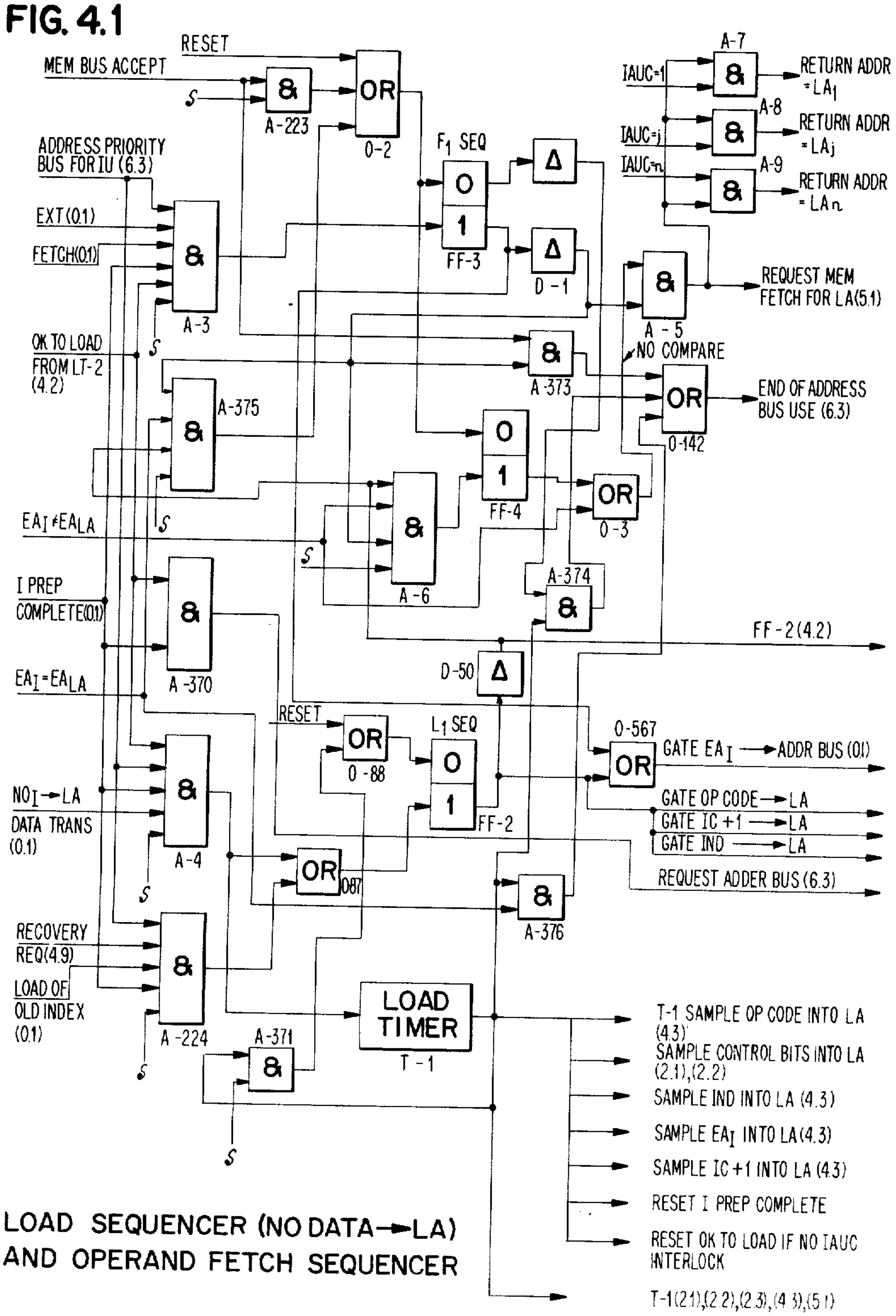
LOAD SEQUENCER (NO DATA → LA) AND OPERAND FETCH SEQUENCER

Nov. 10, 1964 R. J. BAHNSEN ETAL 3,156,897
DATA PROCESSING SYSTEM WITH LOOK AHEAD FEATURE
Filed Dec. 1, 1960 53 Sheets-Sheet 18
FIG. 4.2
LOADING INTERLOCK
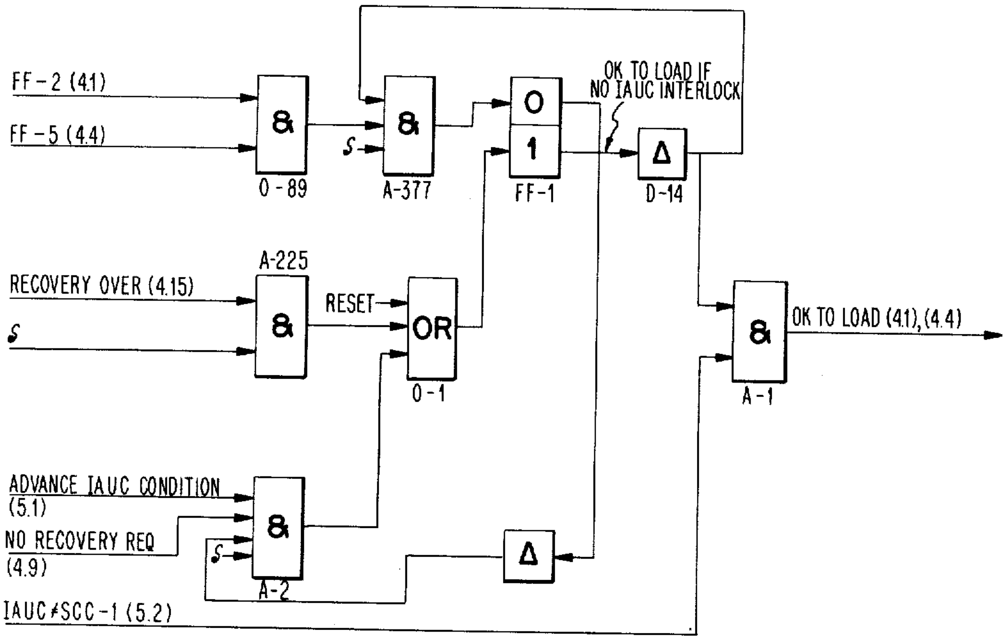
FIG. 4.3
SAMPLING INTO LA FIELDS (LEVEL j)
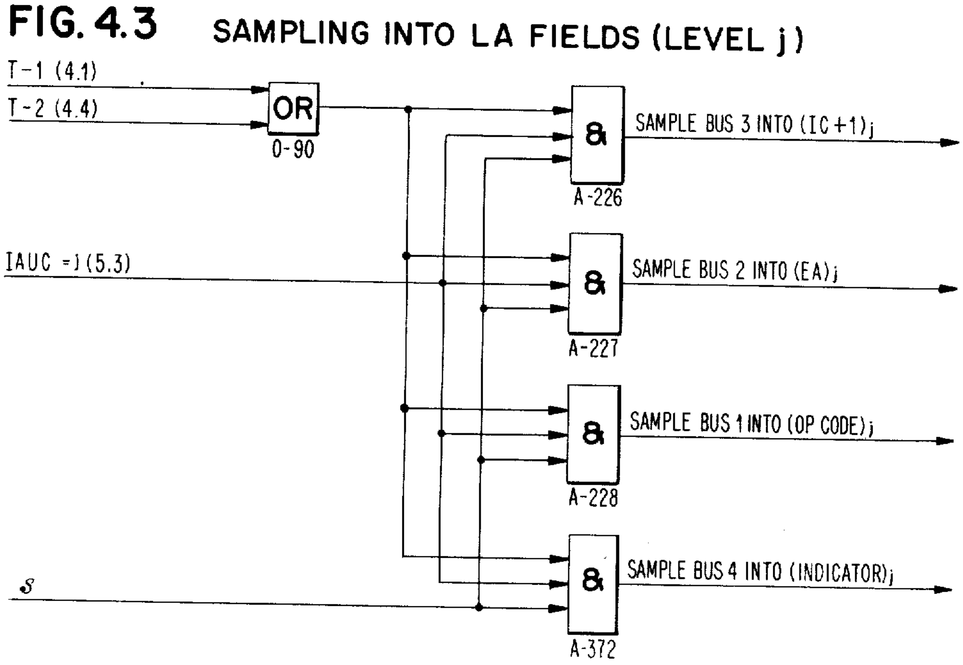

FIG. 4.4 LOAD SEQUENCER (DATA → LA)
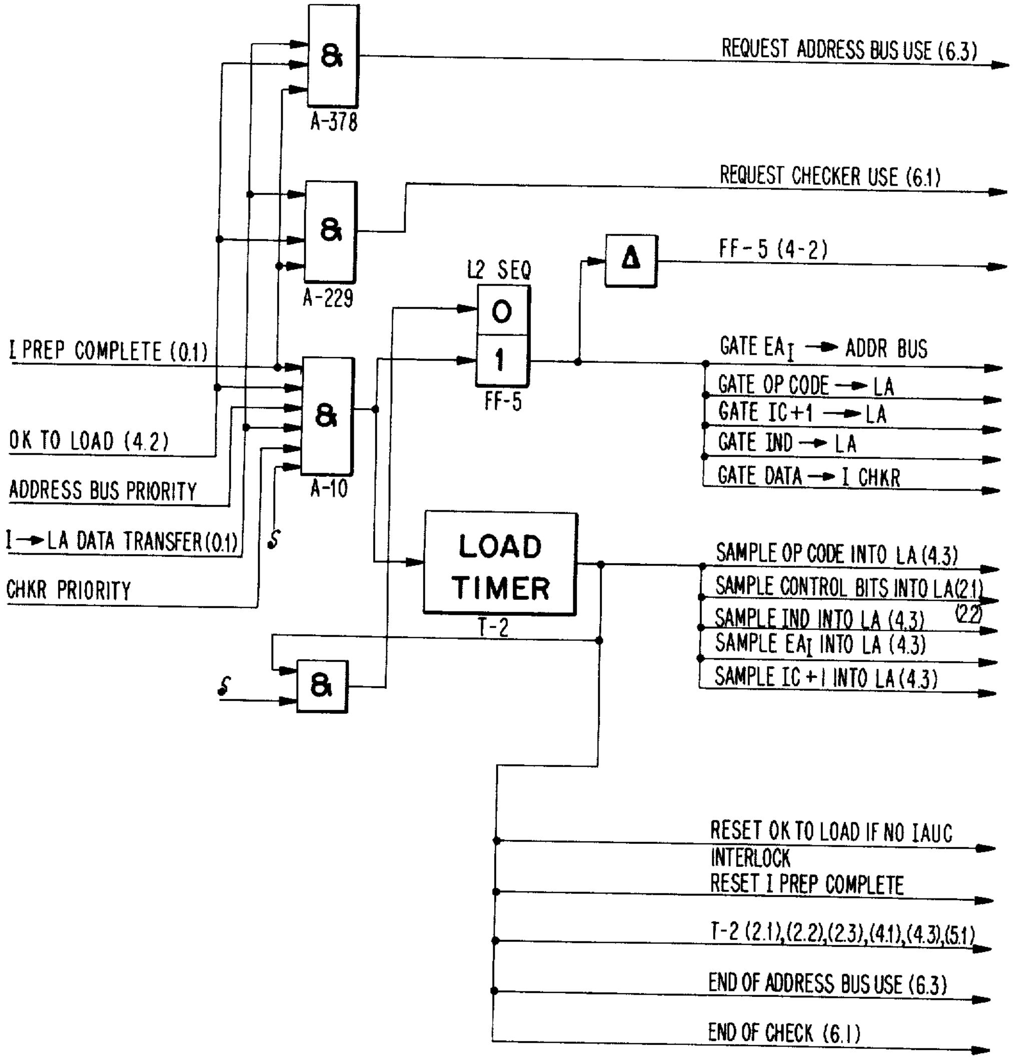

FIG. 4.5 MEMORY CODE CHECK TIMER
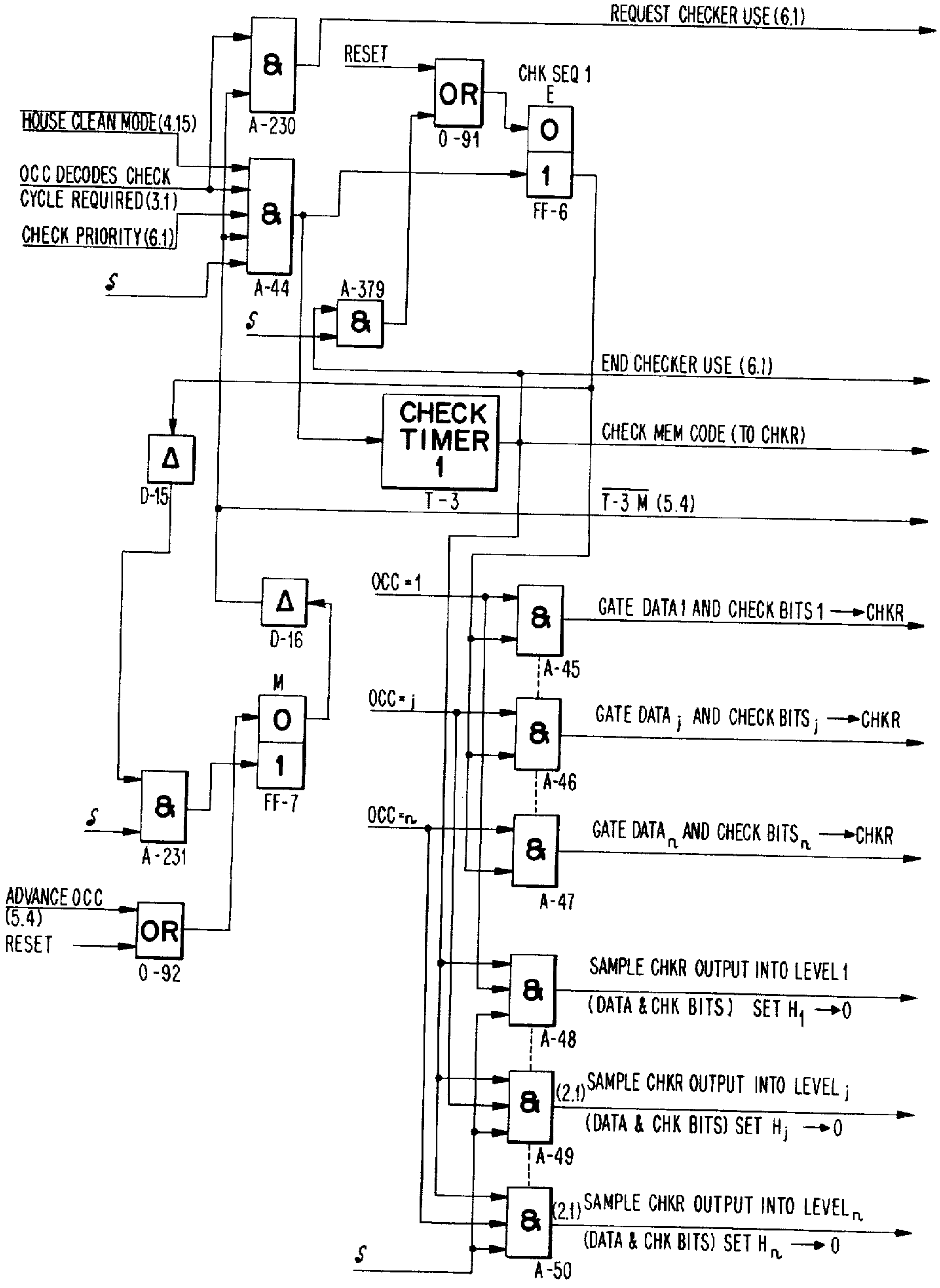

FIG. 4.6 ABC TRANSFER → I UNIT
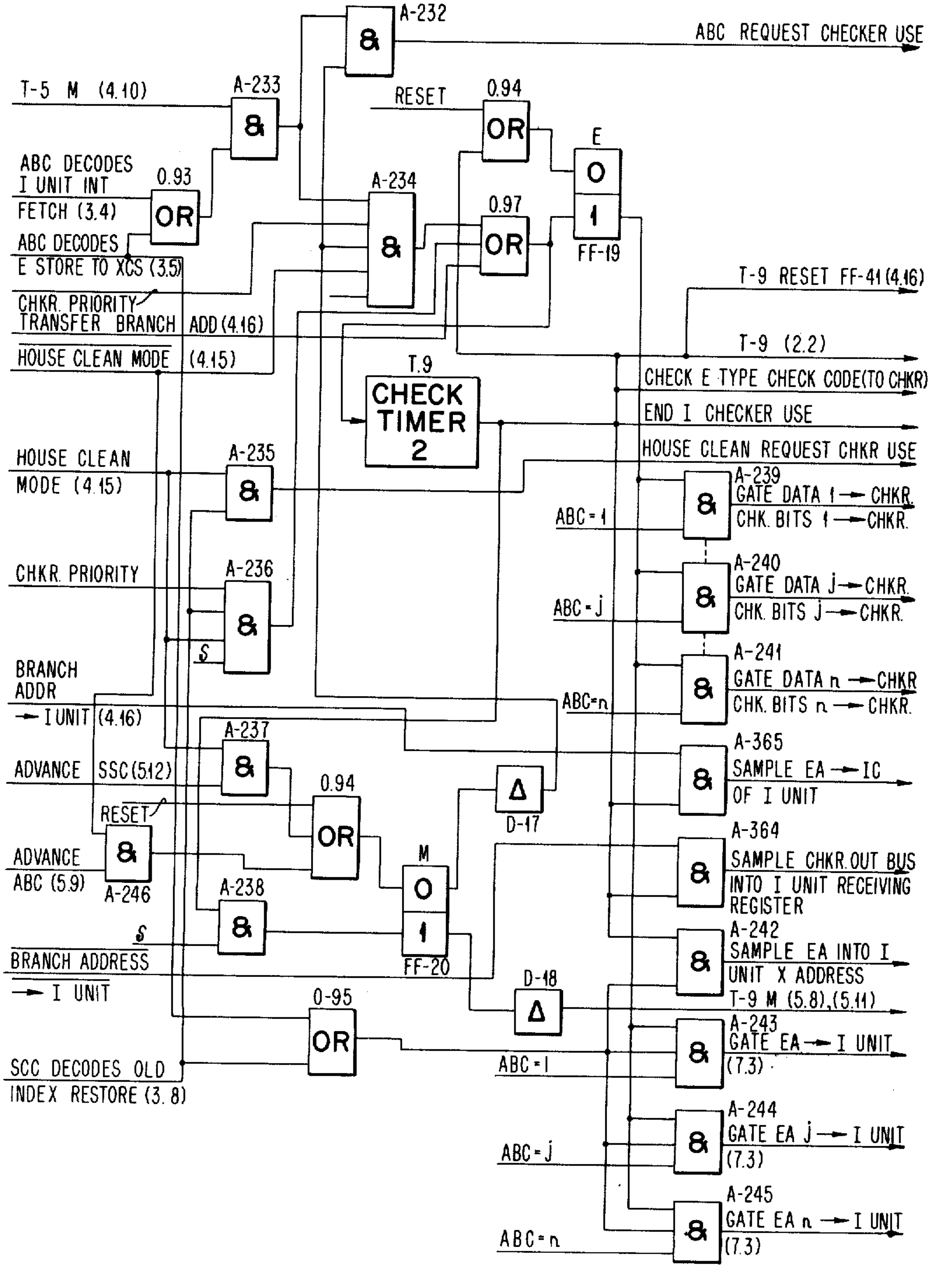

DATA PROCESSING SYSTEM WITH LOOK AHEAD FEATURE
Filed Dec. 1, 1960 53 Sheets-Sheet 22
FIG. 4.7
TRANSFER BUS TIMER
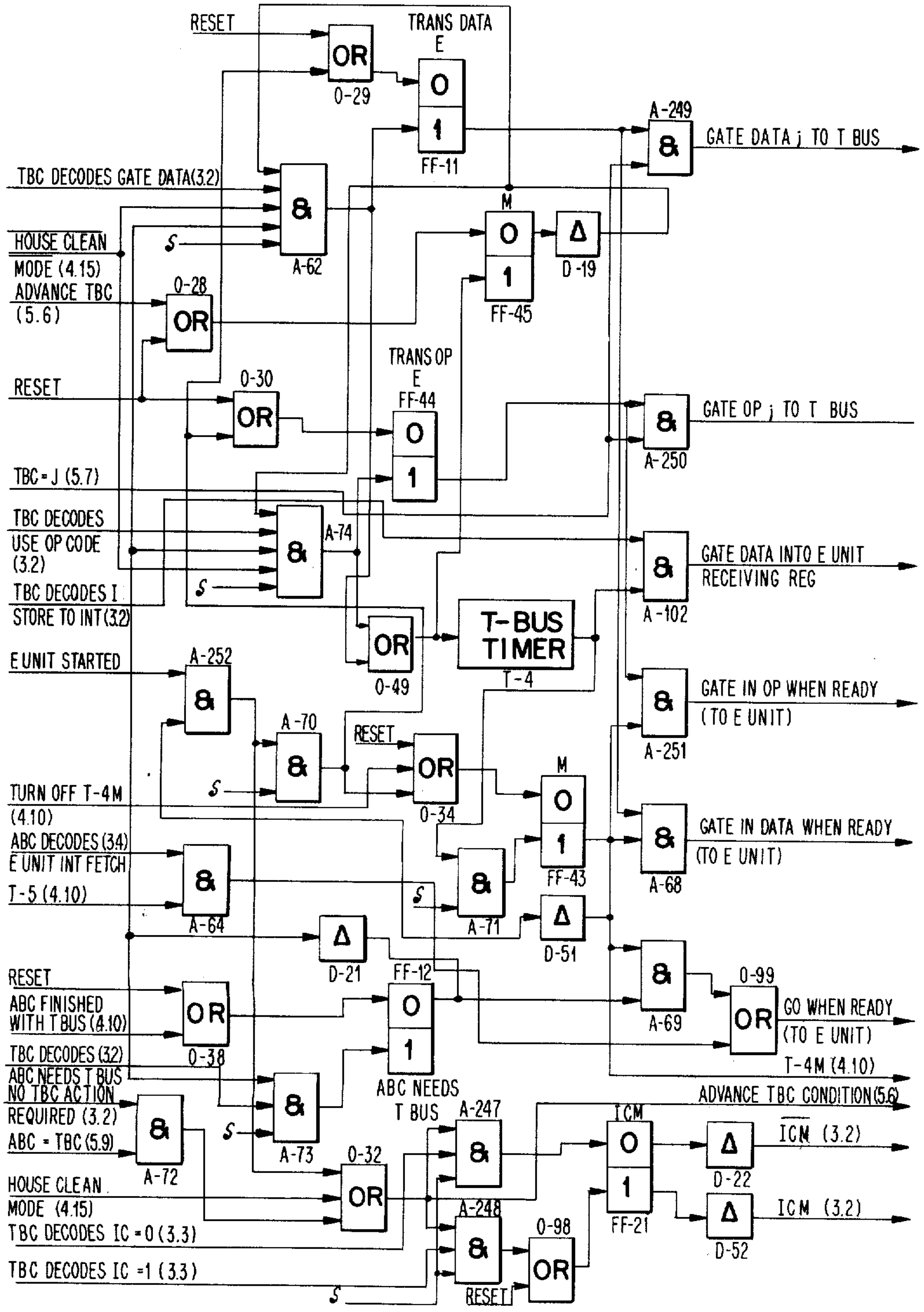

FIG. 4.8
INDICATOR TRANSFER
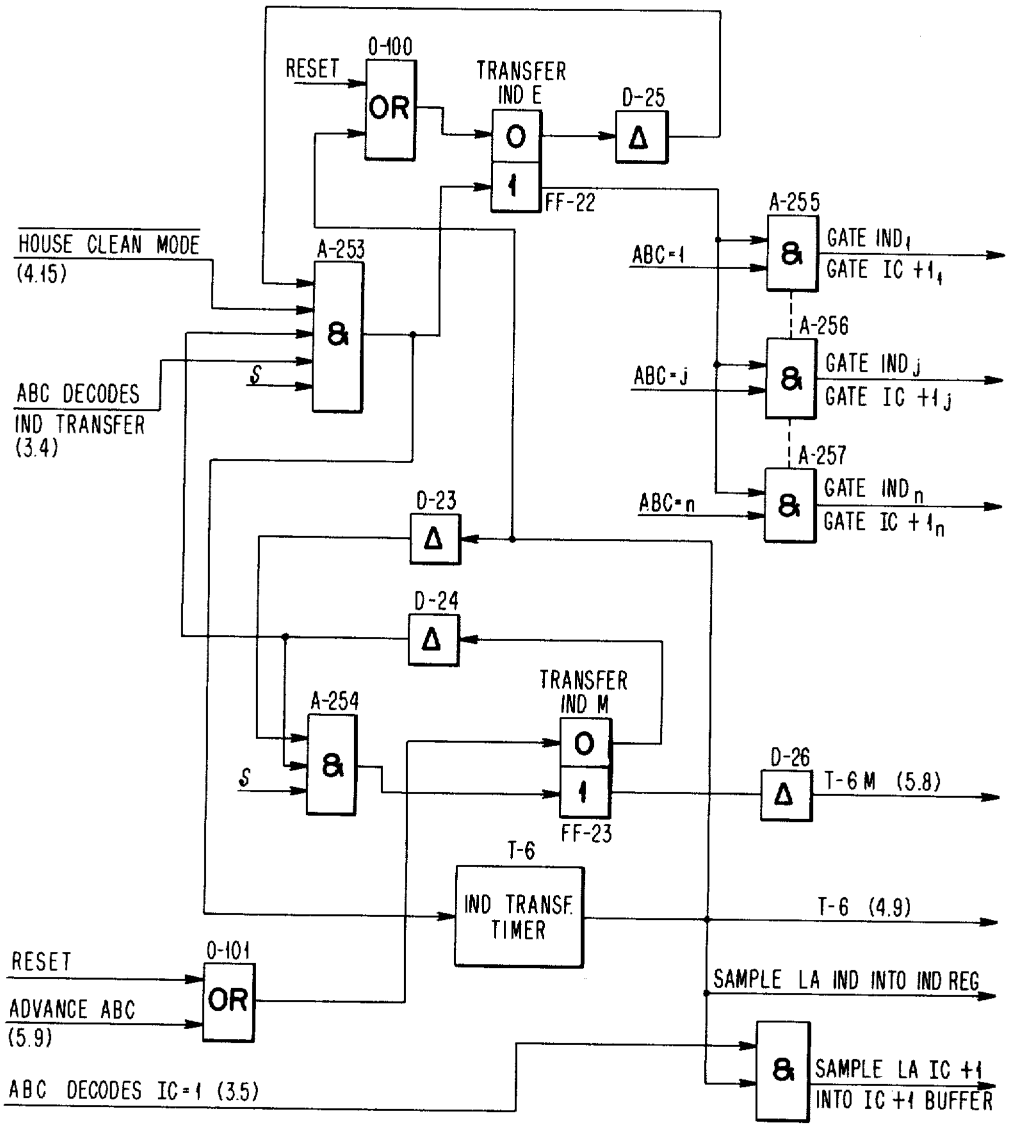

Nov. 10, 1964 R. J. BAHNSEN ETAL 3,156,897
DATA PROCESSING SYSTEM WITH LOOK AHEAD FEATURE
Filed Dec. 1, 1960 53 Sheets-Sheet 24
INTERRUPT TIMER
FIG. 4.9
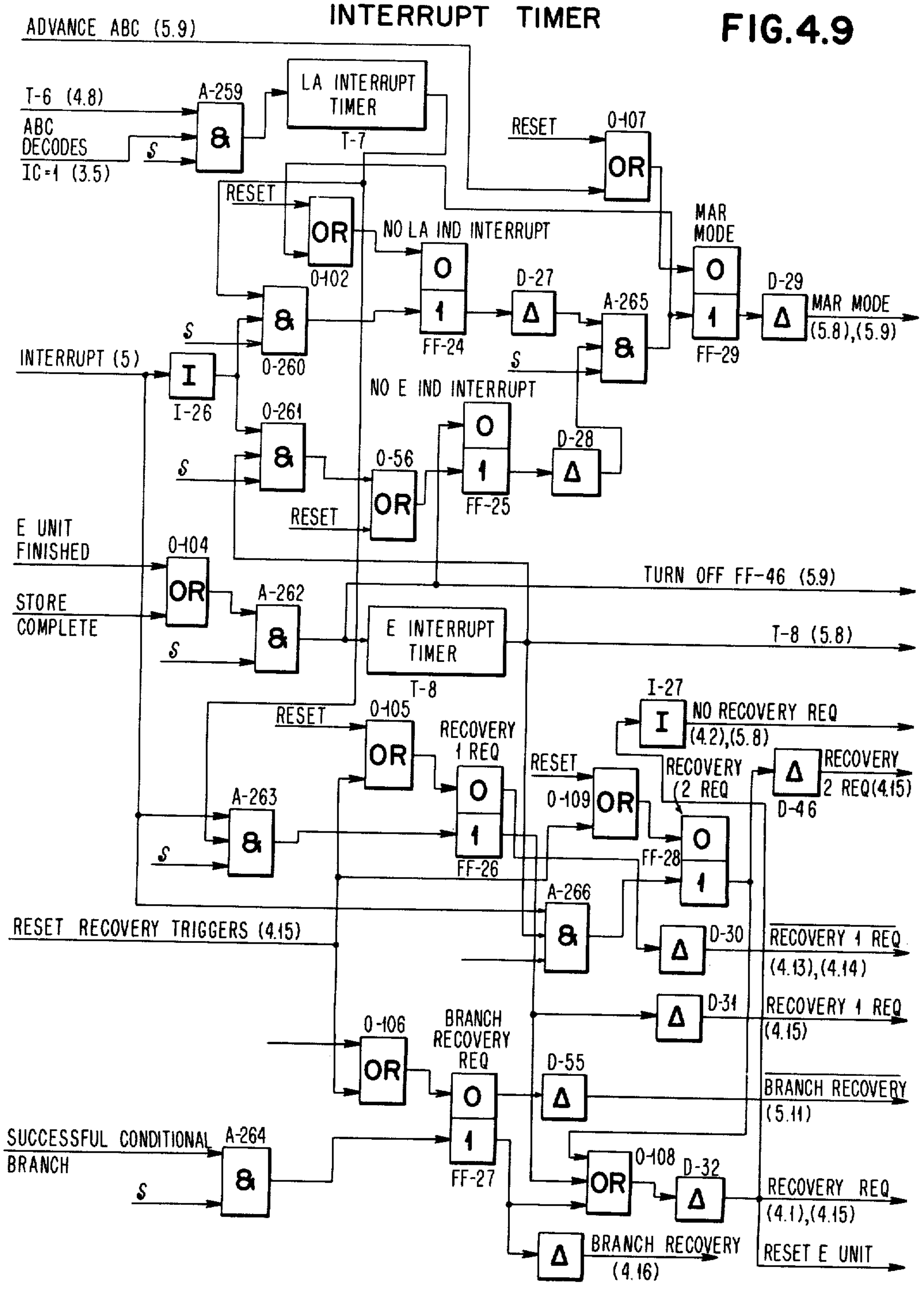

FIG. 4.10 A BUS TRANSFER
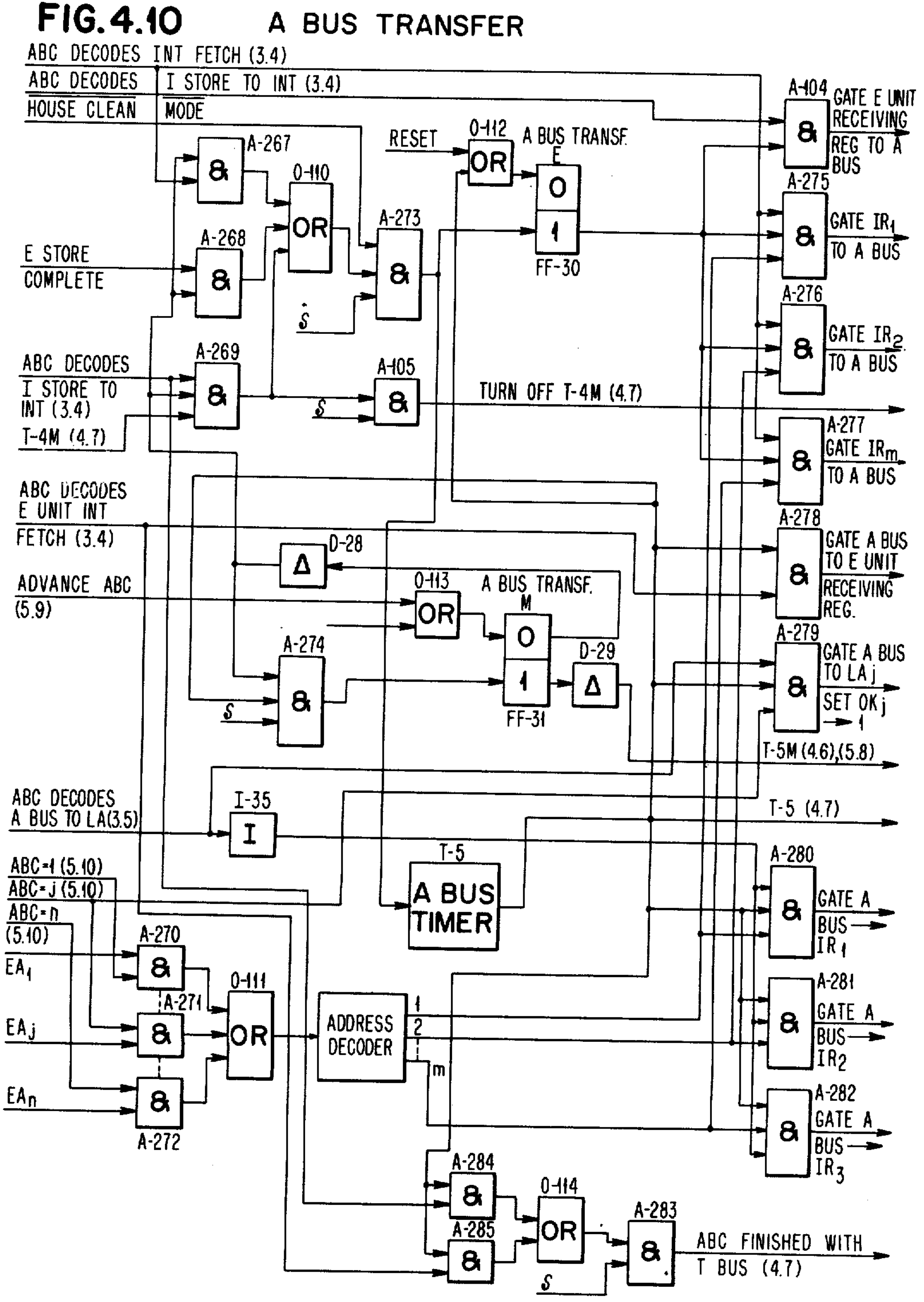

FIG. 4.11
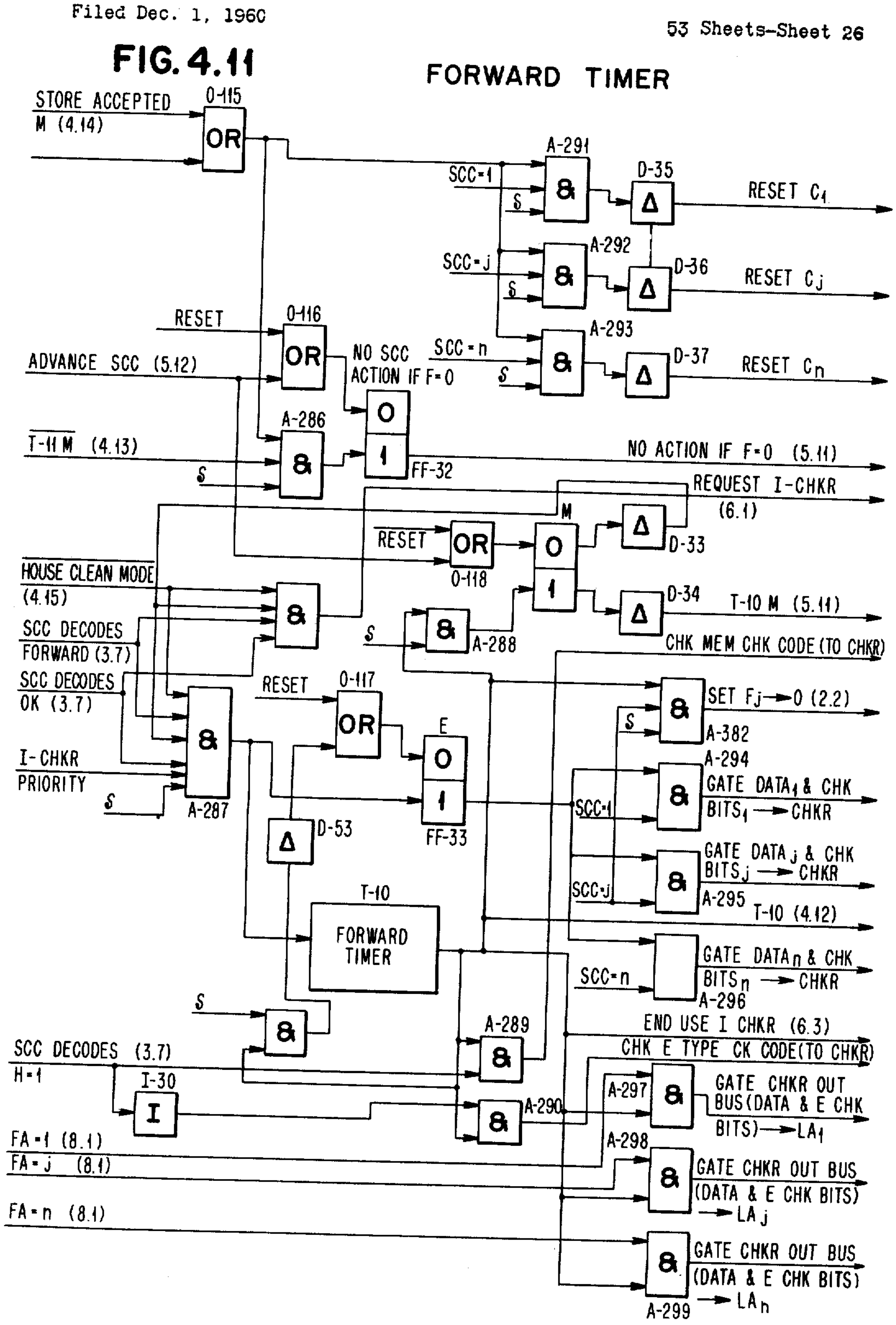

FIG. 4.16 BRANCH ADDRESS TRANSFER → I UNIT
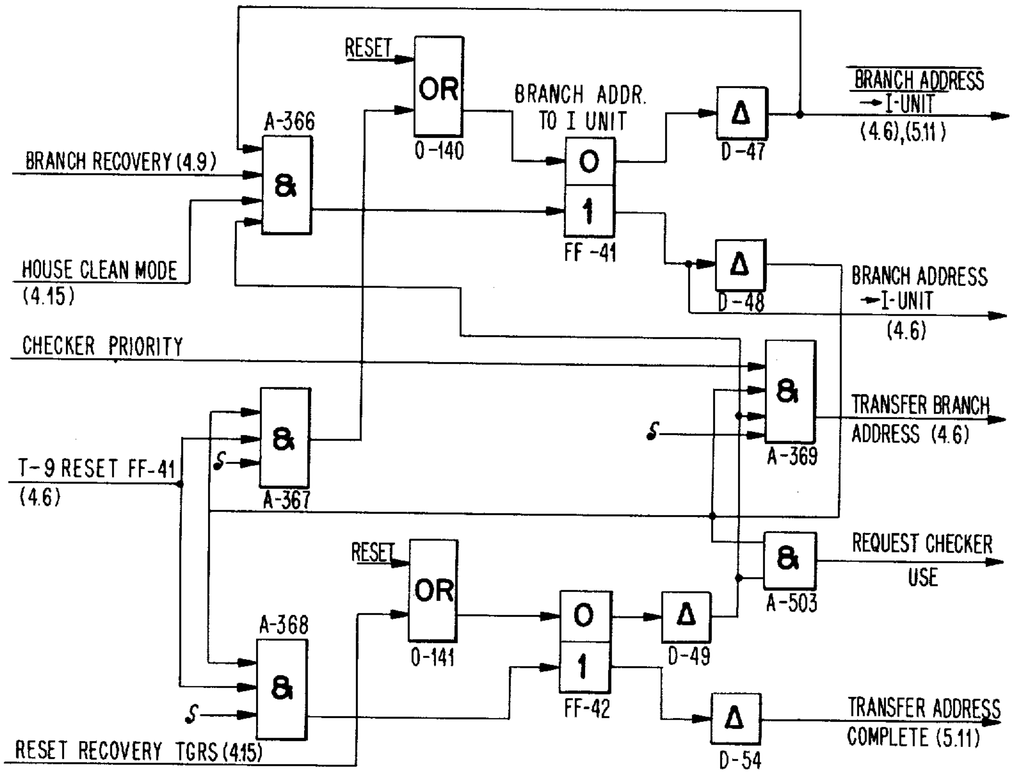
FIG. 4.12
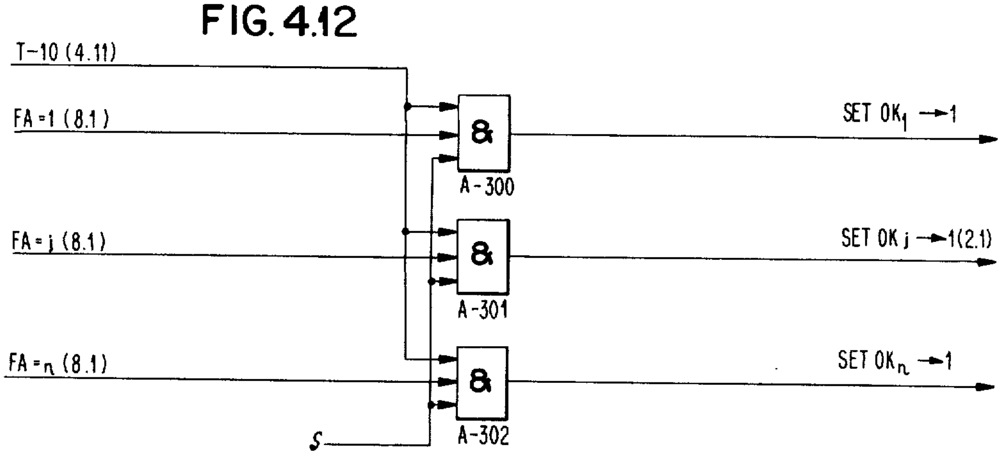

Nov. 10, 1964 R. J. BAHNSEN ETAL 3,156,897
DATA PROCESSING SYSTEM WITH LOOK AHEAD FEATURE
Filed Dec. 1, 1960 53 Sheets-Sheet 28
FIG. 4.13 STORE CHECK TIMER
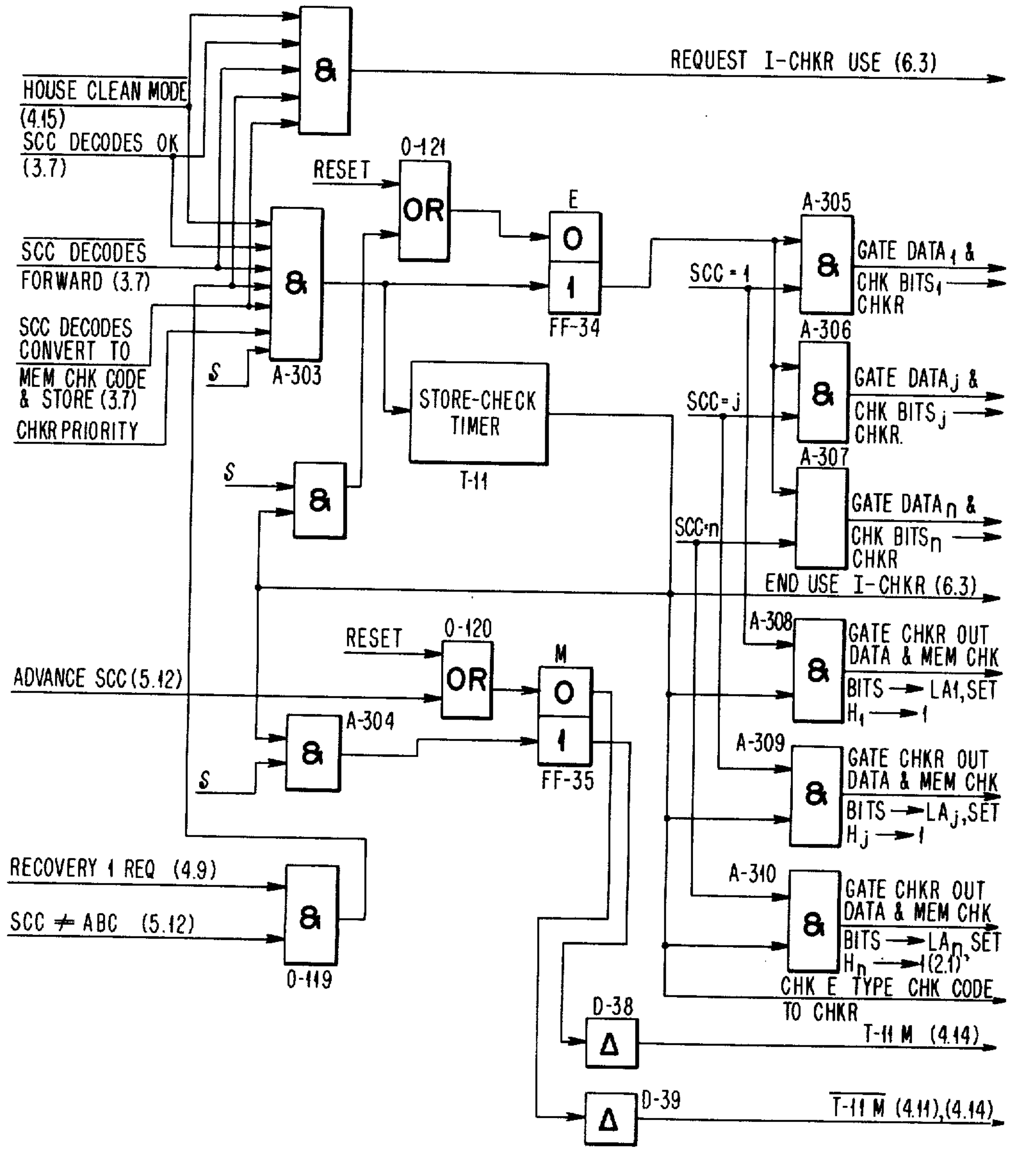

FIG. 4.14 STORE TIMER
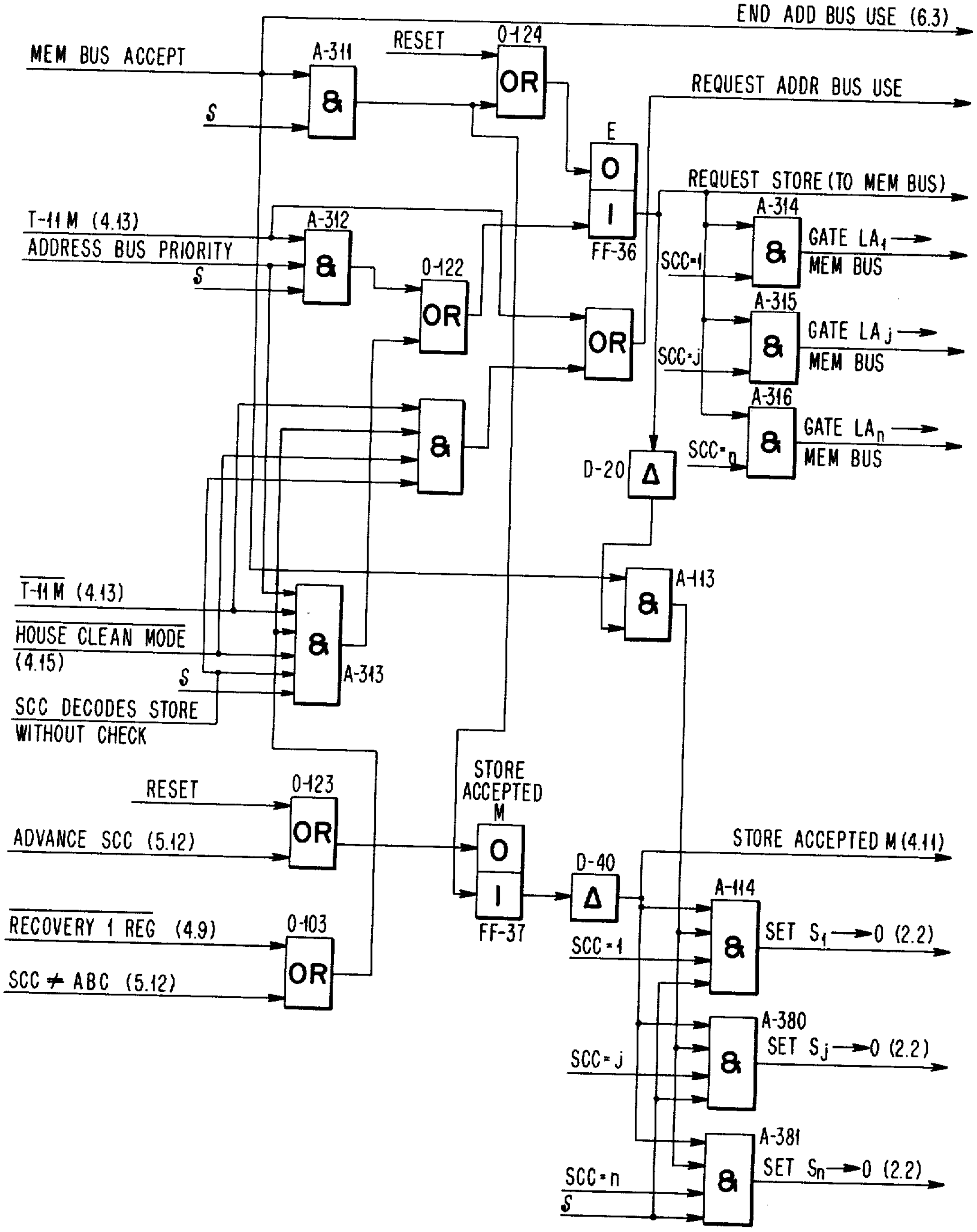

Nov. 10, 1964 R. J. BAHNSEN ETAL 3,156,897
DATA PROCESSING SYSTEM WITH LOOK AHEAD FEATURE
Filed Dec. 1, 1960 53 Sheets-Sheet 30
FIG. 4.15 HOUSE CLEAN
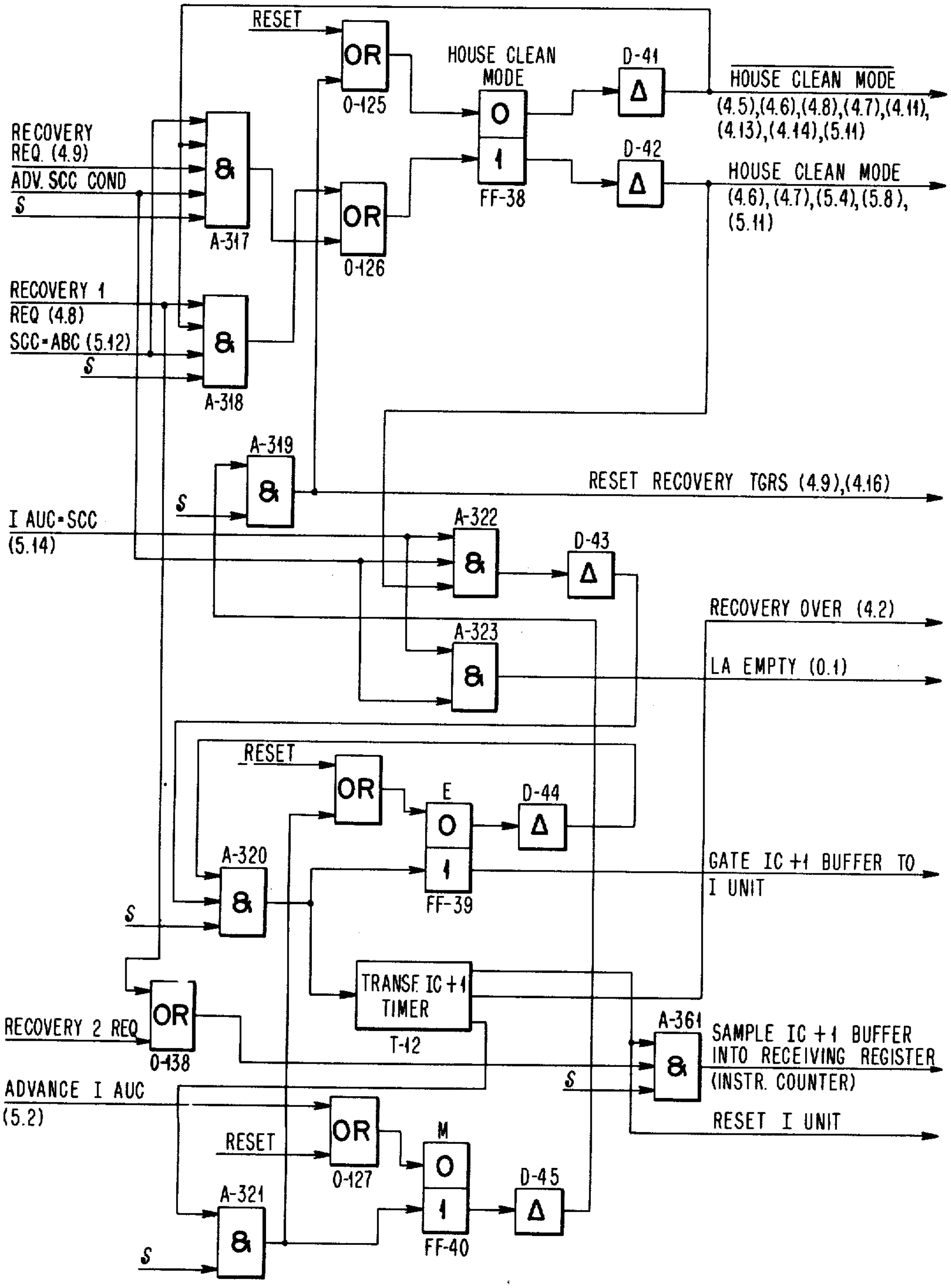

FIG. 5.1 I AUC ADVANCE CONDITION
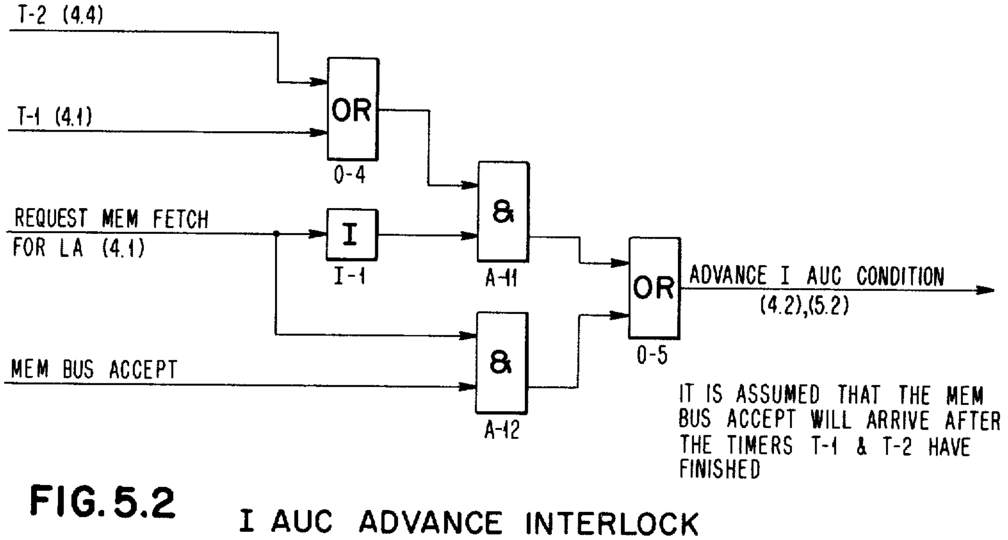
FIG. 5.2 I AUC ADVANCE INTERLOCK
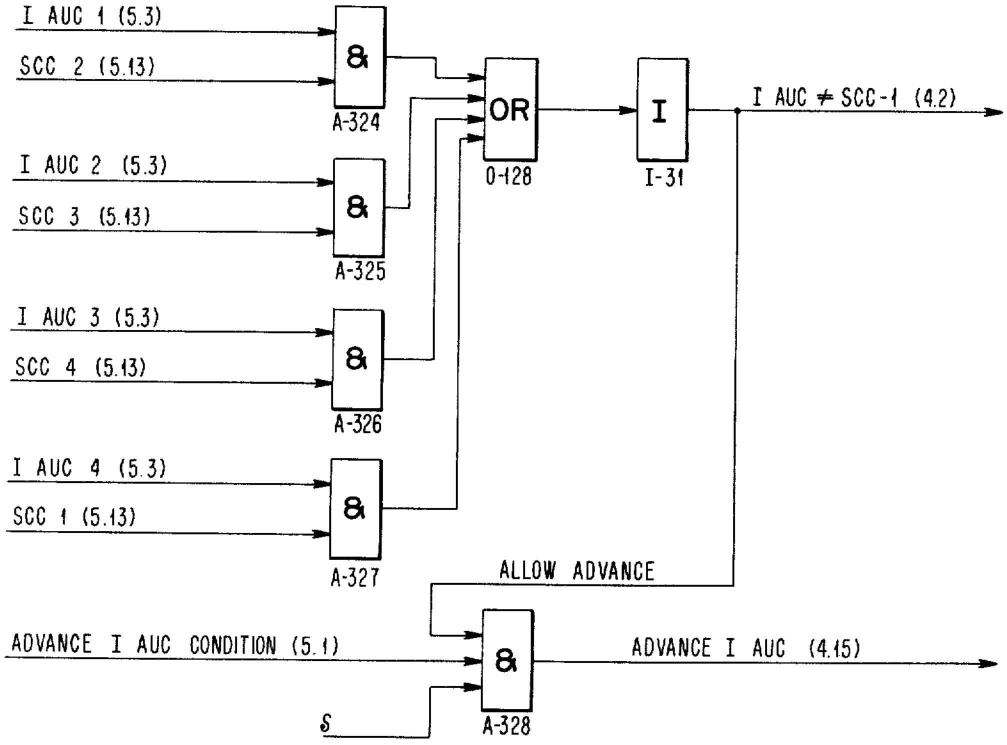

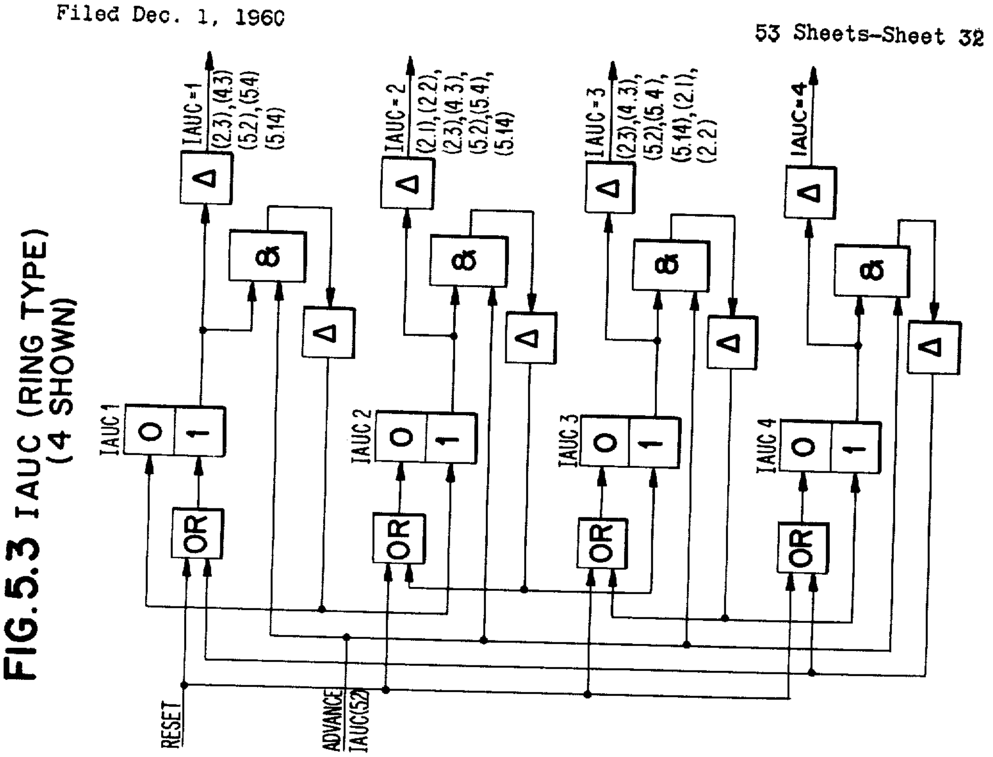
FIG. 5.3 IAUC (RING TYPE) (4 SHOWN)
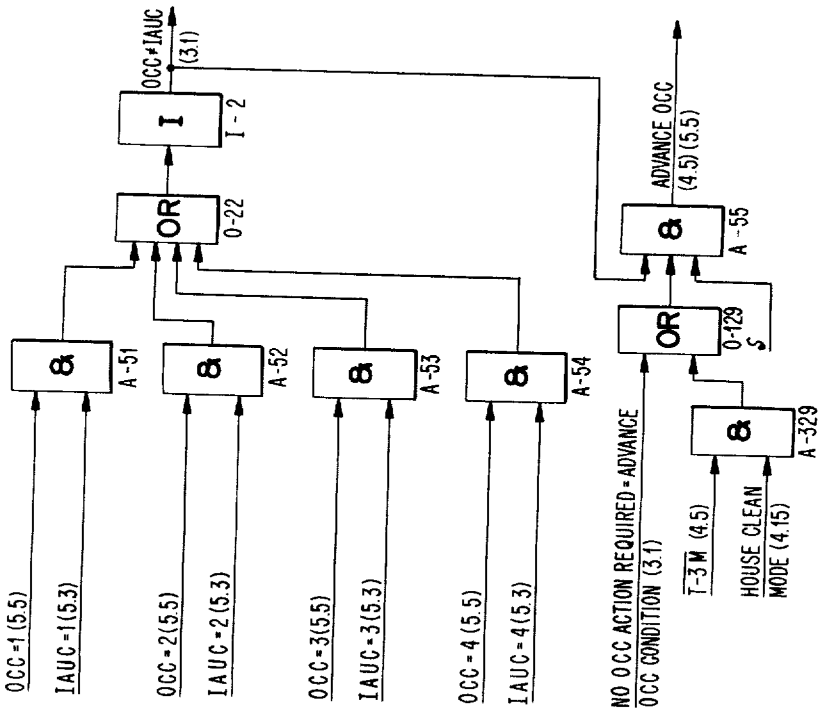
FIG. 5.4 OCC ADVANCE INTERLOCK Nov. 10, 1964 R. J. BAHNSEN ETAL 3,156,897
DATA PROCESSING SYSTEM WITH LOOK AHEAD FEATURE
Filed Dec. 1, 1960
53 Sheets-Sheet 33
FIG. 5.6
TBC ADVANCE INTERLOCK
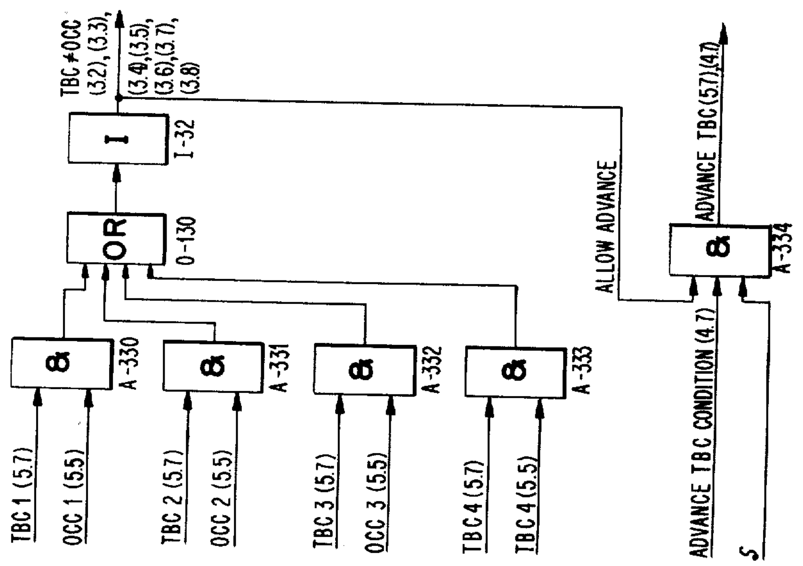
FIG. 5.5
OCC (RING TYPE) (4 SHOWN)
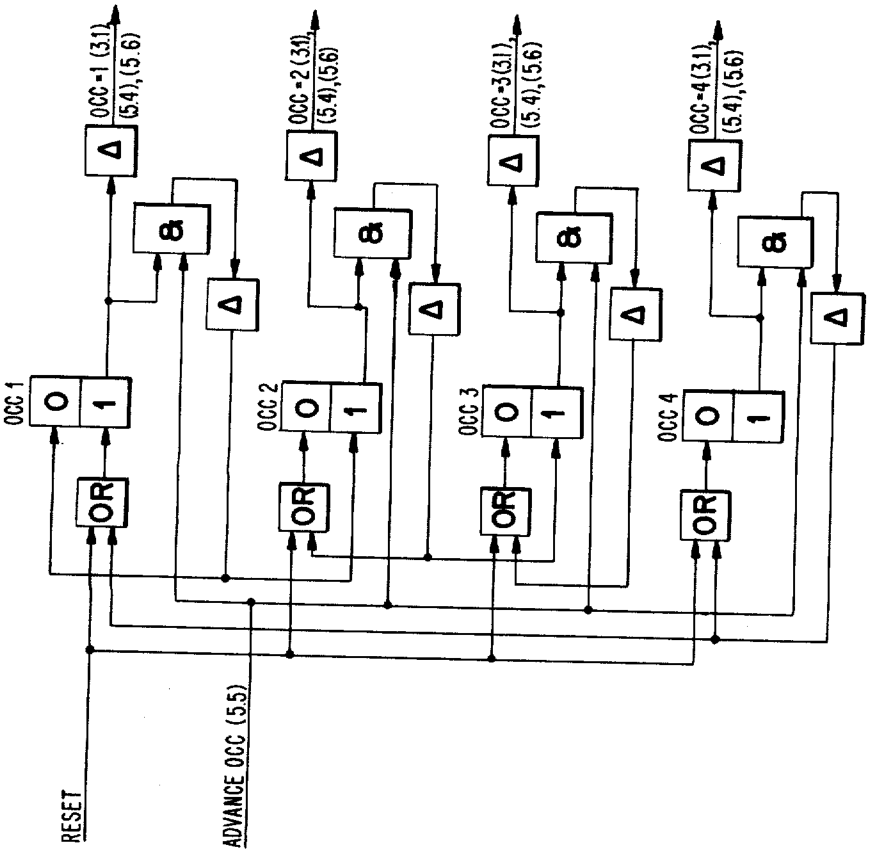

Nov. 10, 1964 R. J. BAHNSEN ETAL 3,156,897
DATA PROCESSING SYSTEM WITH LOOK AHEAD FEATURE
Filed Dec. 1, 1960 53 Sheets-Sheet 34
FIG. 5.7 TBC (RING TYPE) (4 SHOWN)
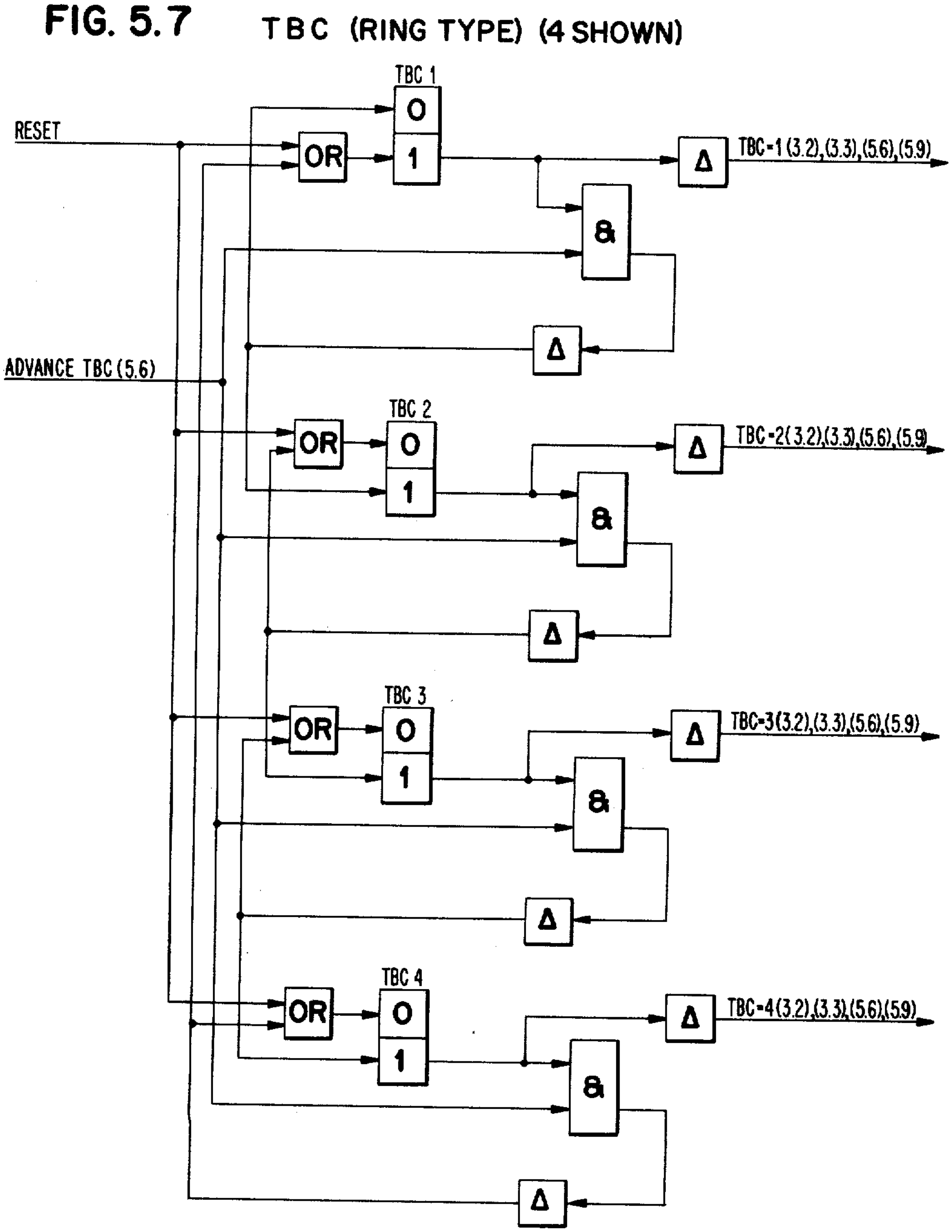

FIG. 5.8
ABC ADVANCE CONDITION
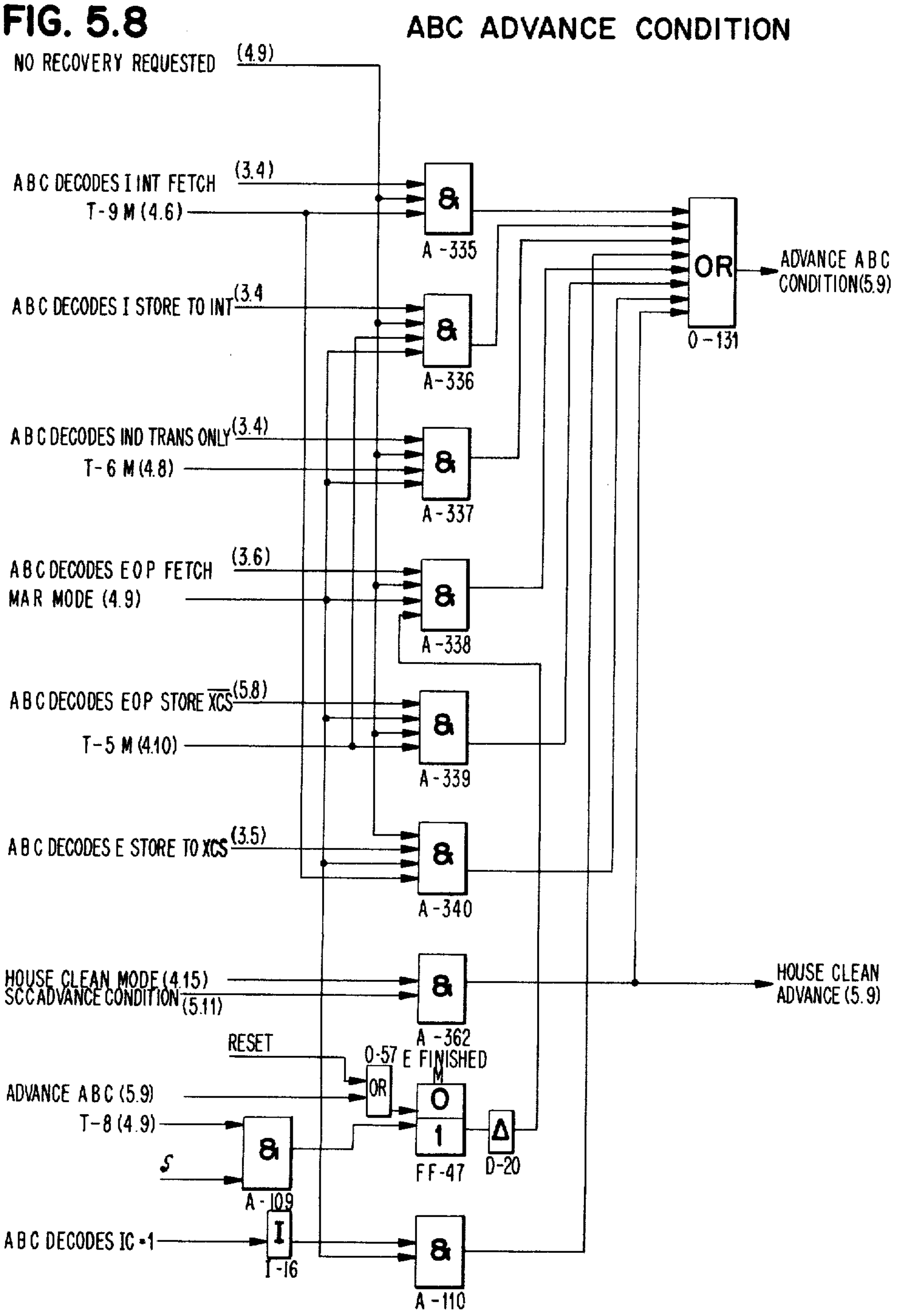

Nov. 10, 1964 R. J. BAHNSEN ETAL 3,156,897
DATA PROCESSING SYSTEM WITH LOOK AHEAD FEATURE
Filed Dec. 1, 1960
53 Sheets-Sheet 36
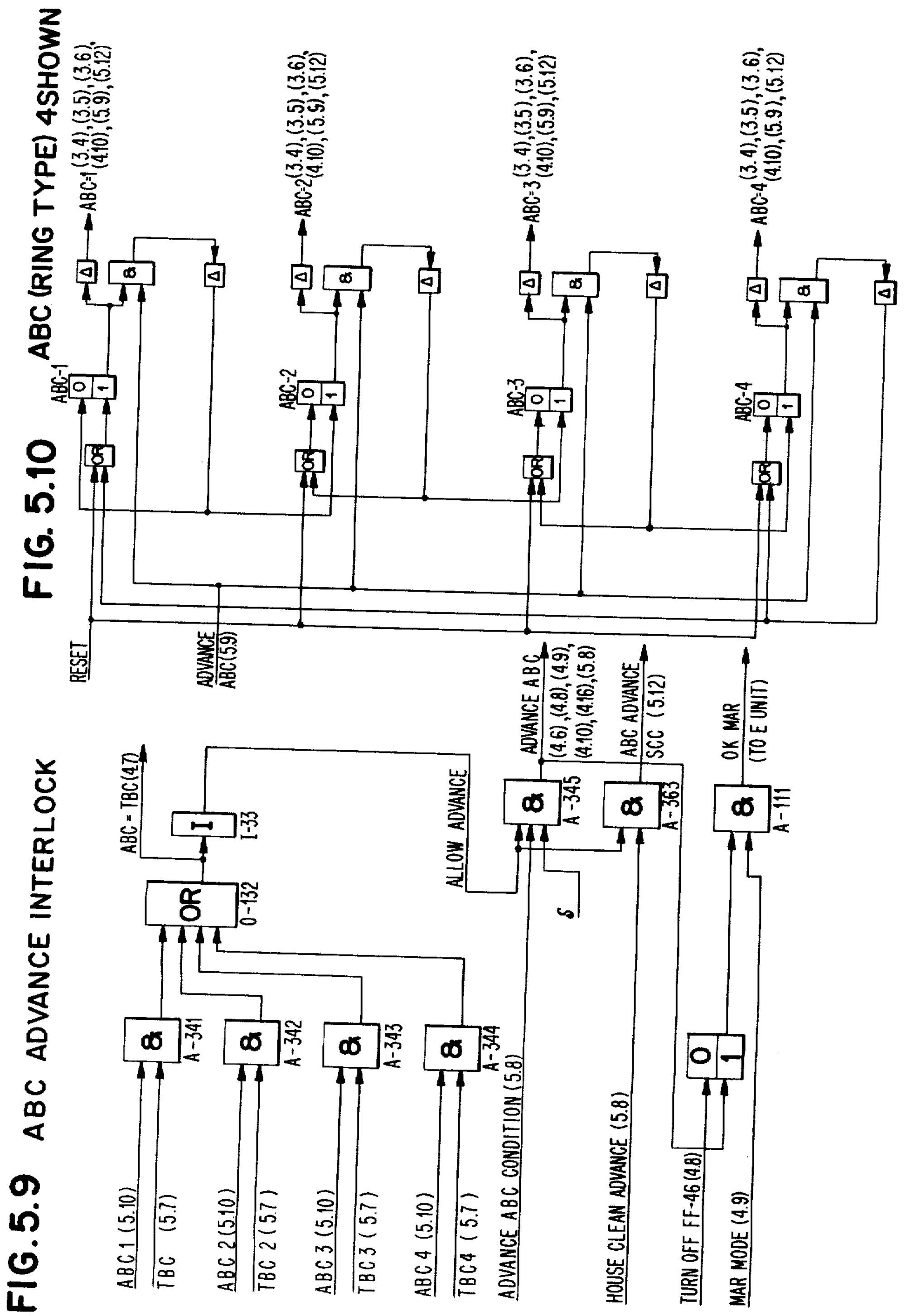
FIG. 5.10, FIG. 5.9

FIG. 5.11
SCC ADVANCE CONDITION
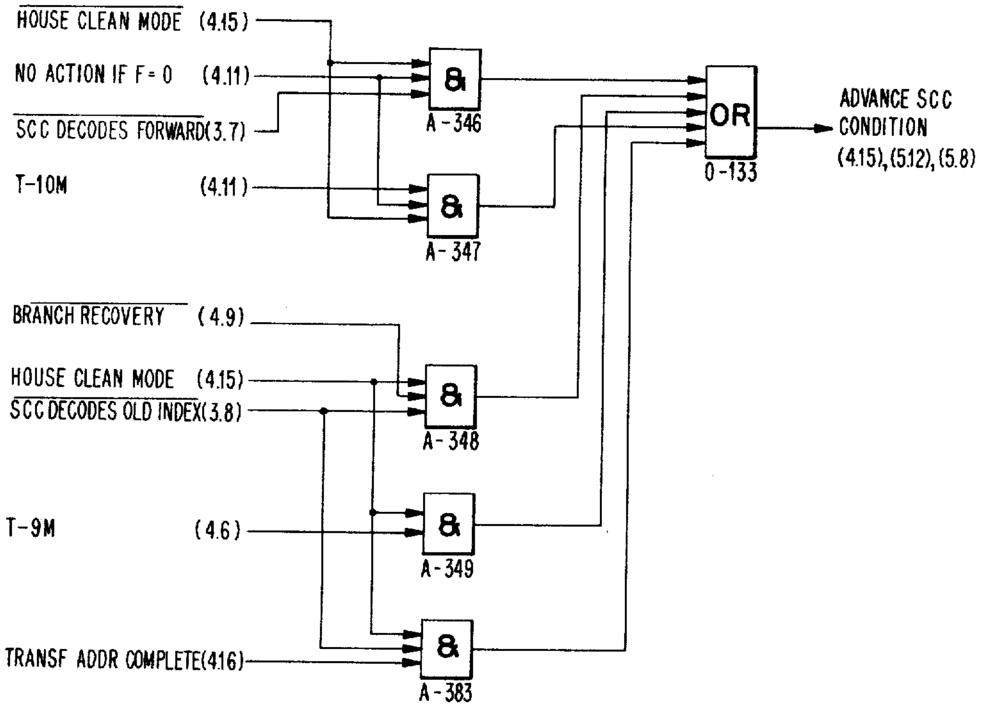
FIG. 5.12
ADVANCE INTERLOCK
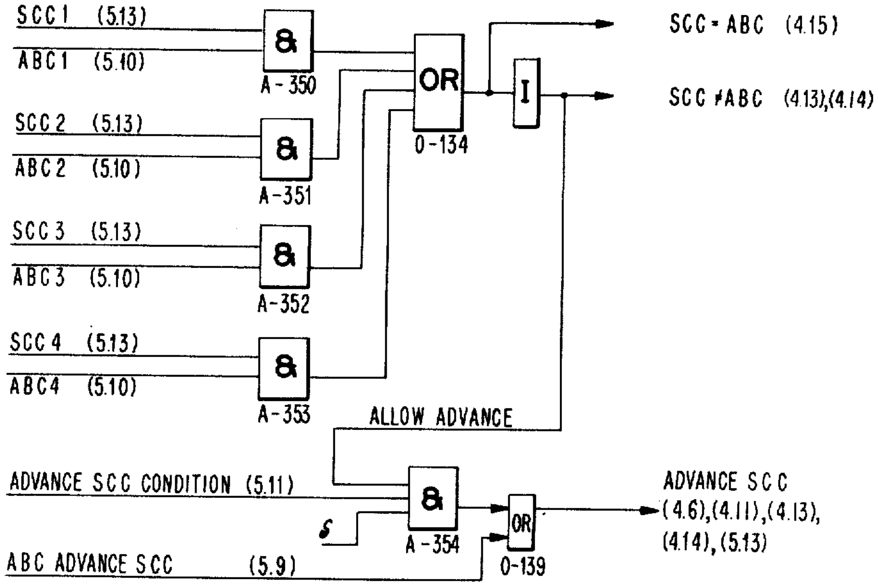

FIG. 5.13 SCC (RING TYPE) - 4SHOWN
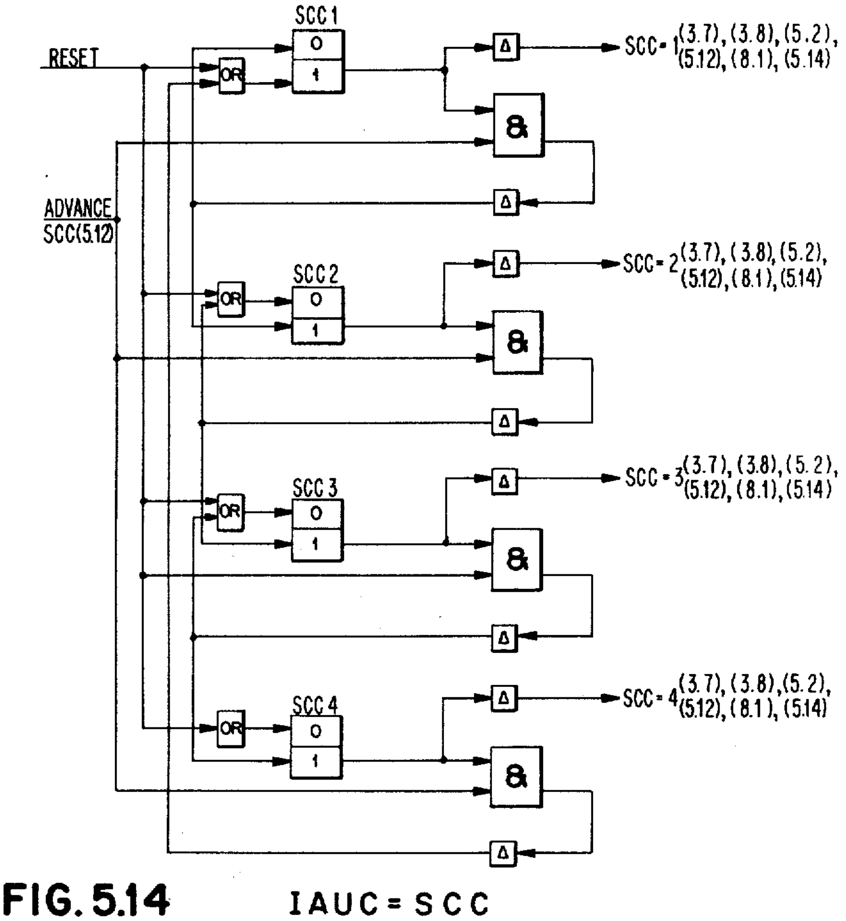
FIG. 5.14 IAUC = SCC
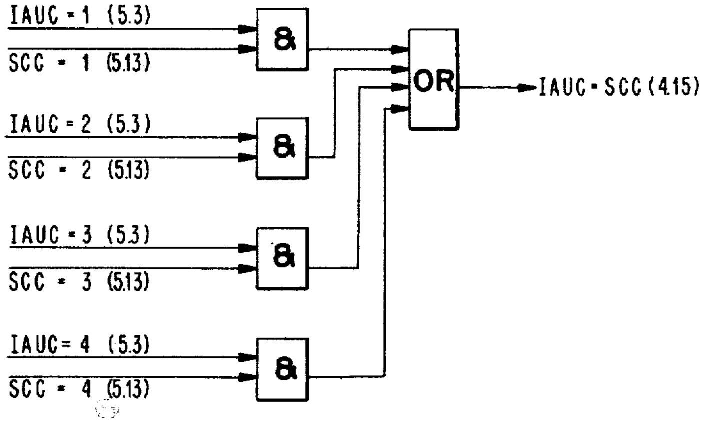

FIG. 8.1 FORWARDING ADDRESS
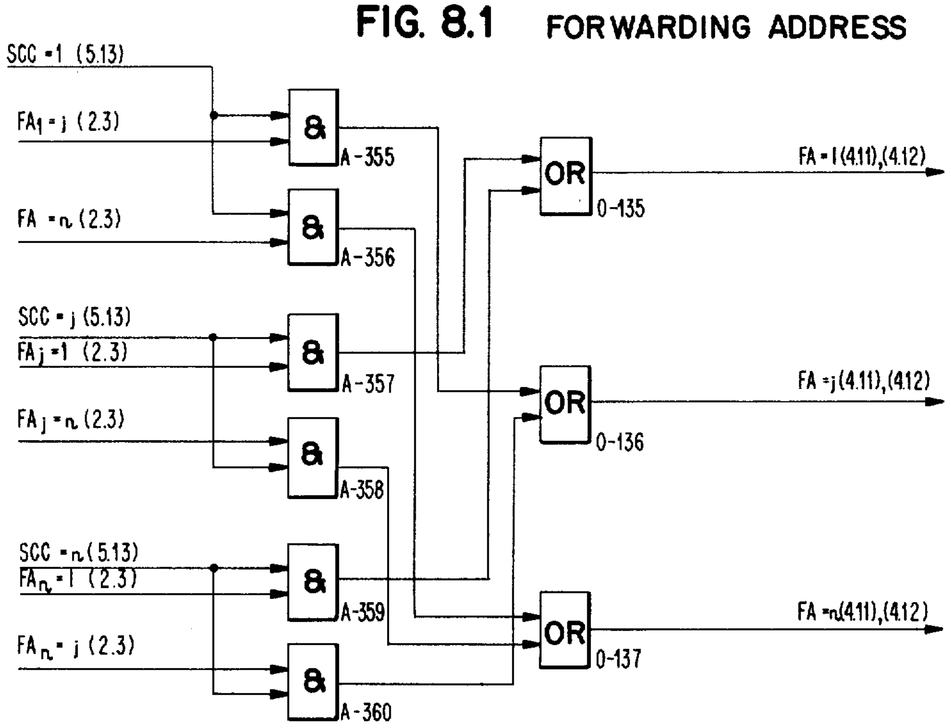
FIG. 6.1
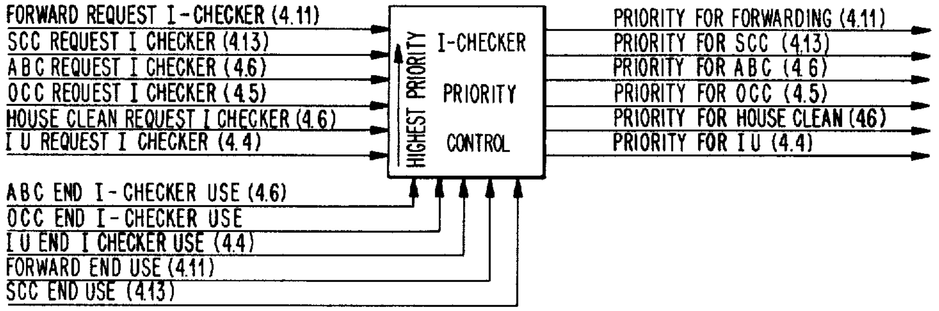
FIG. 6.3
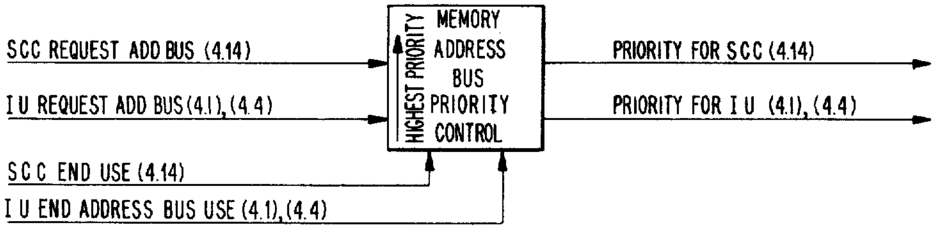

FIG. 6.2
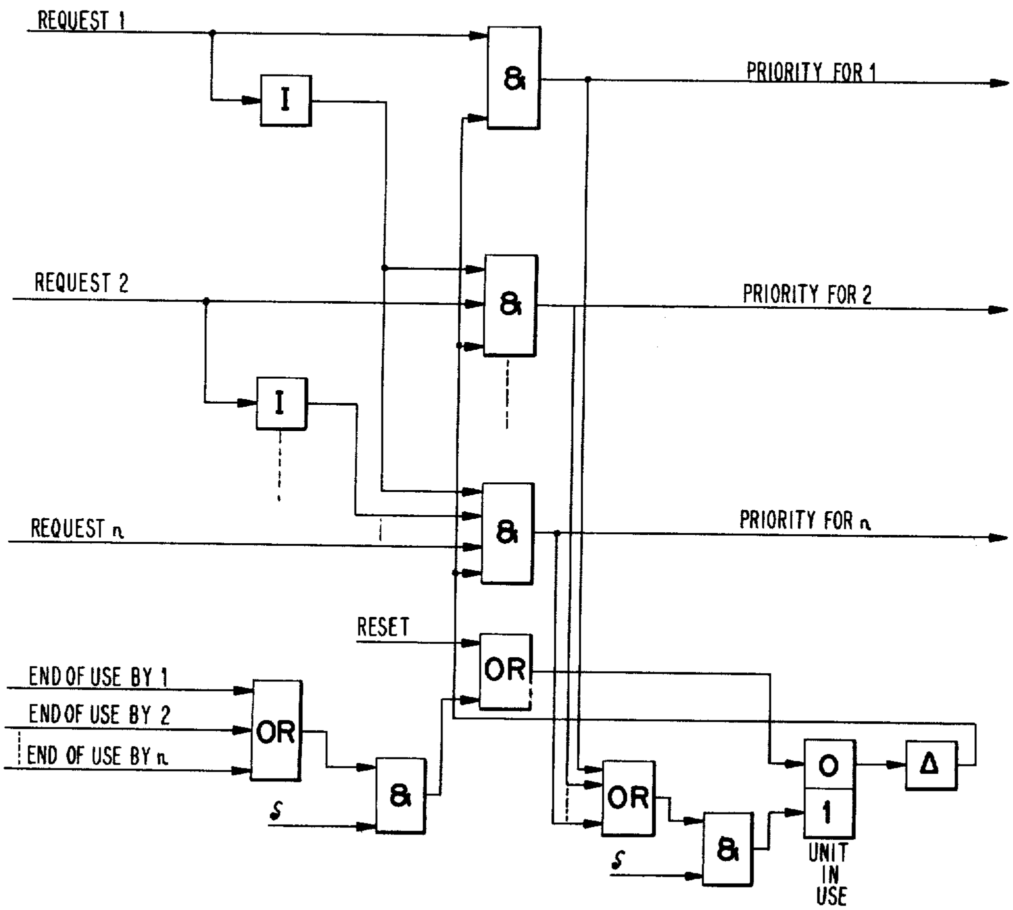

FIG. 7.1 ADDRESS COMPARISON (4 LA LEVELS SHOWN)
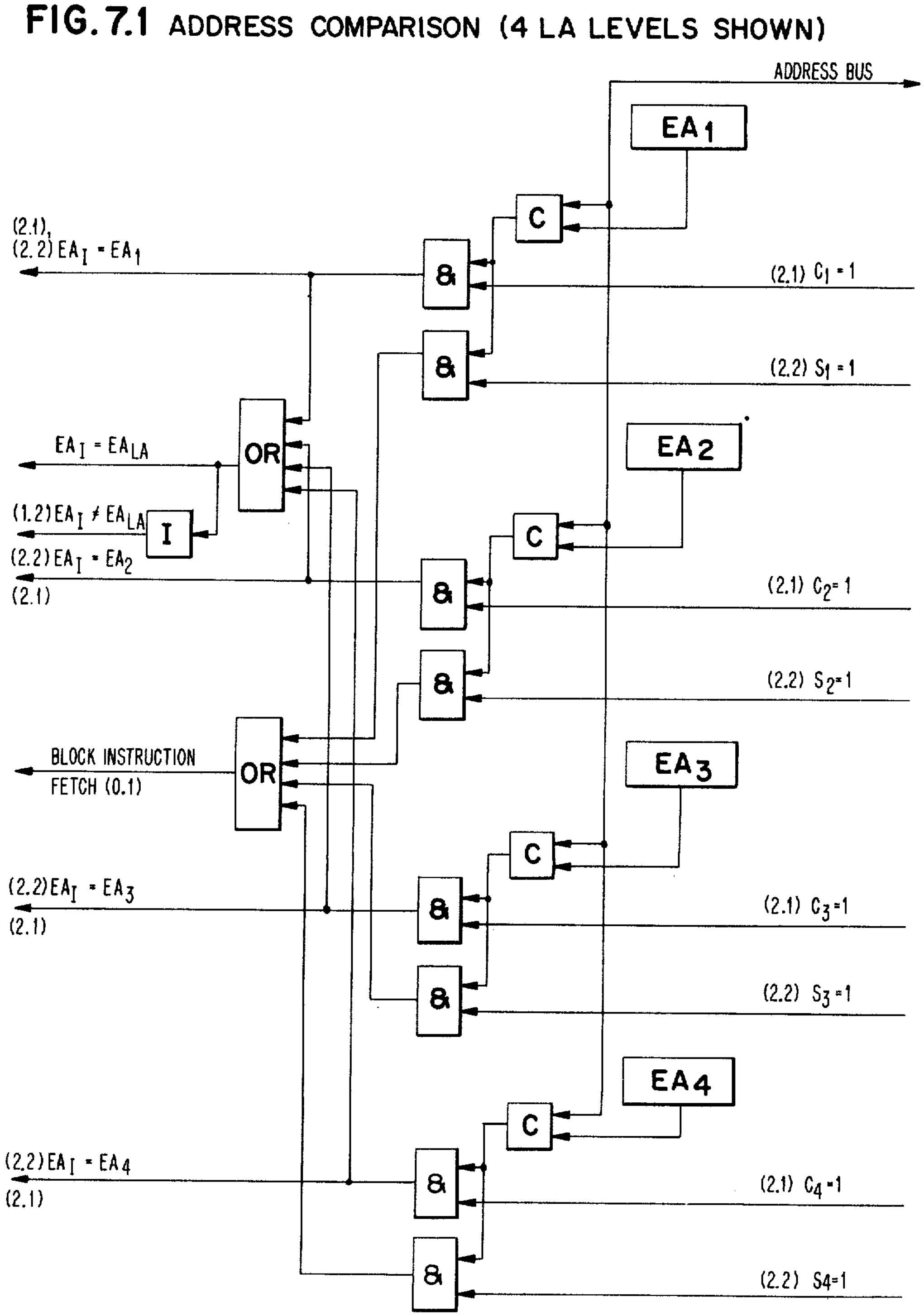

FIG. 7.2
DETAILS OF COMPARE CIRCUIT
(COMPARISON OF TWO n BIT FIELDS)
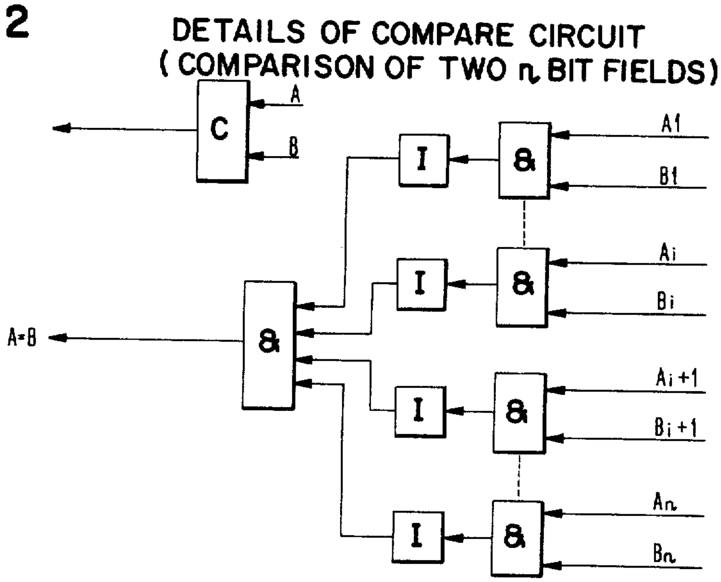
FIG. 7.3 INDEX ADDRESS COMPARE
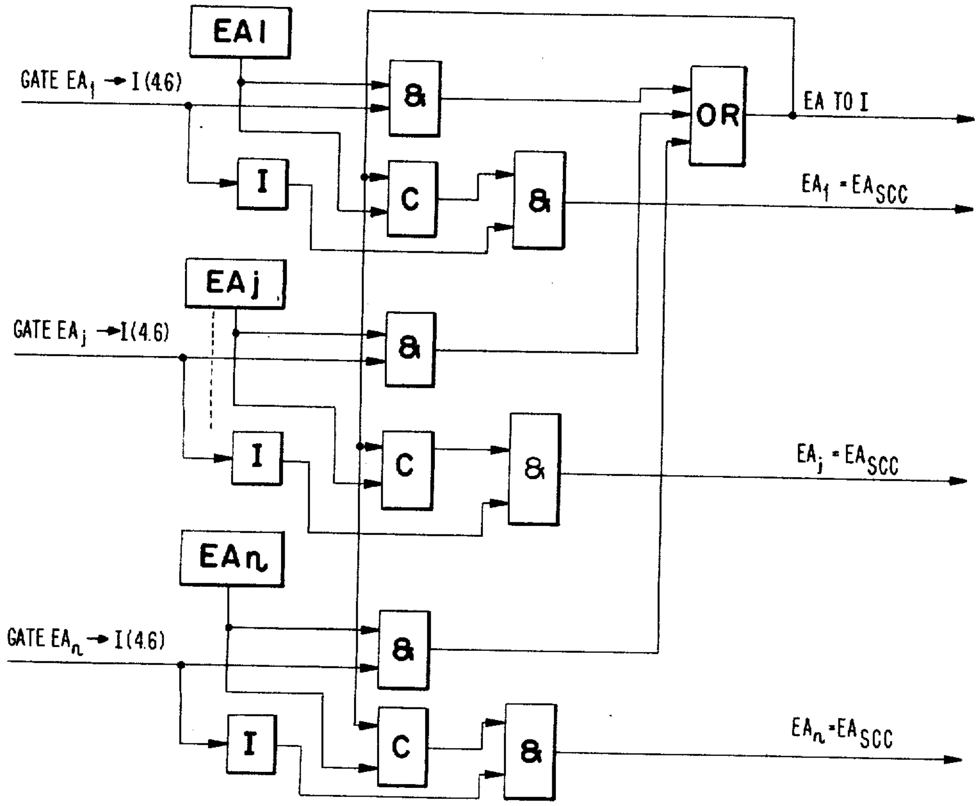

FIG. 9.1
TYPICAL TIMER
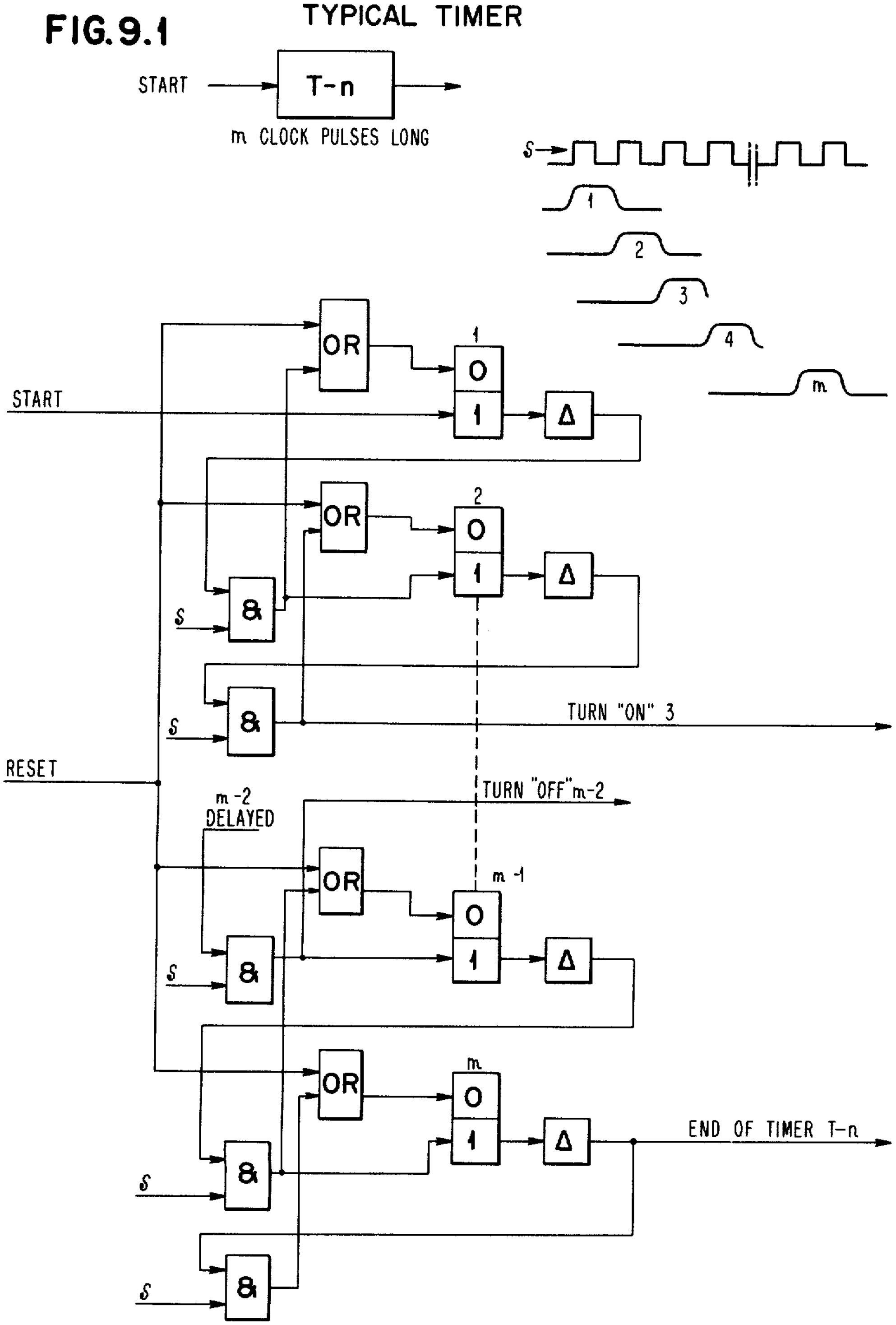

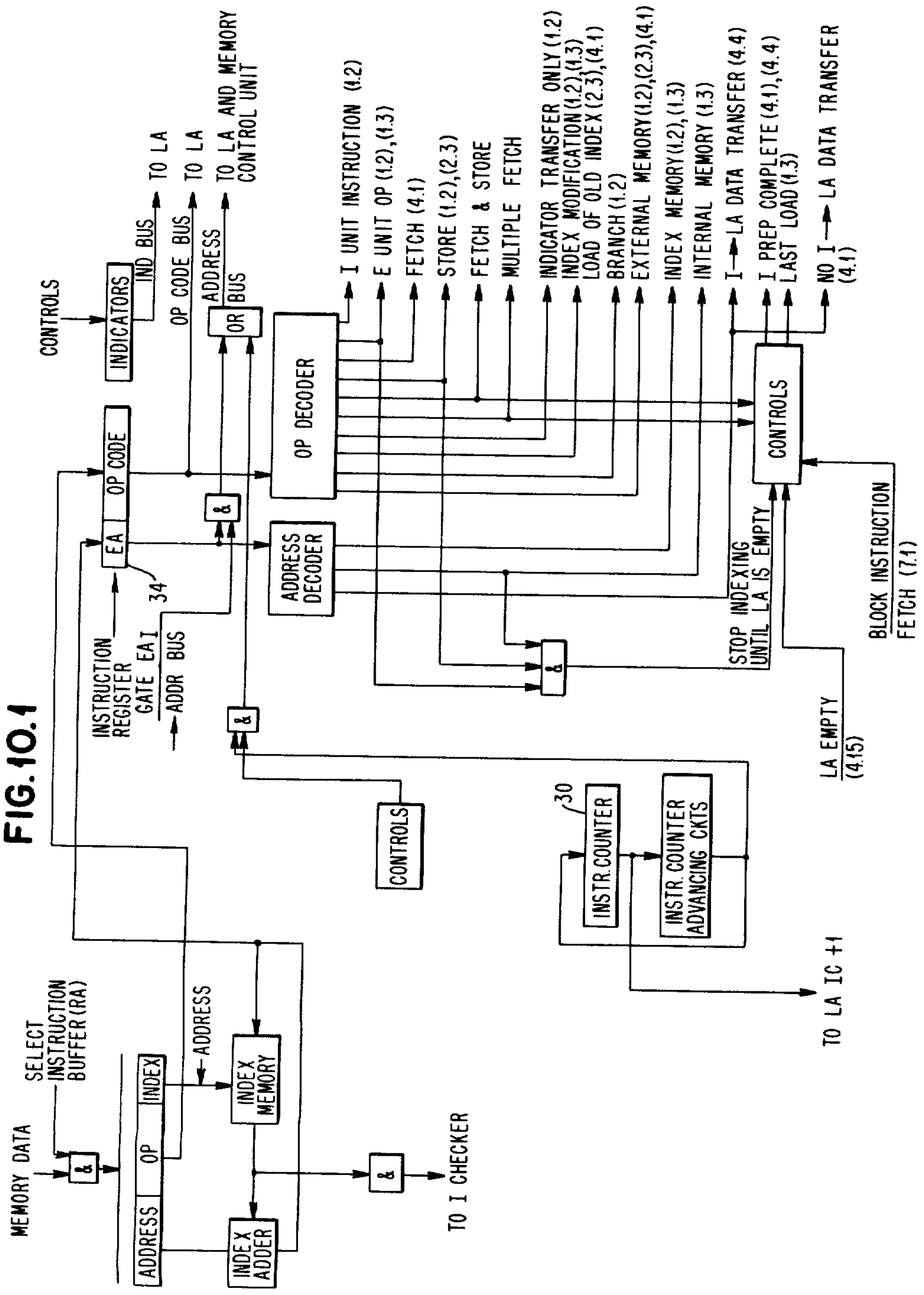
FIG. 10.1

FIG. 10.2 INSTRUCTION FETCHING
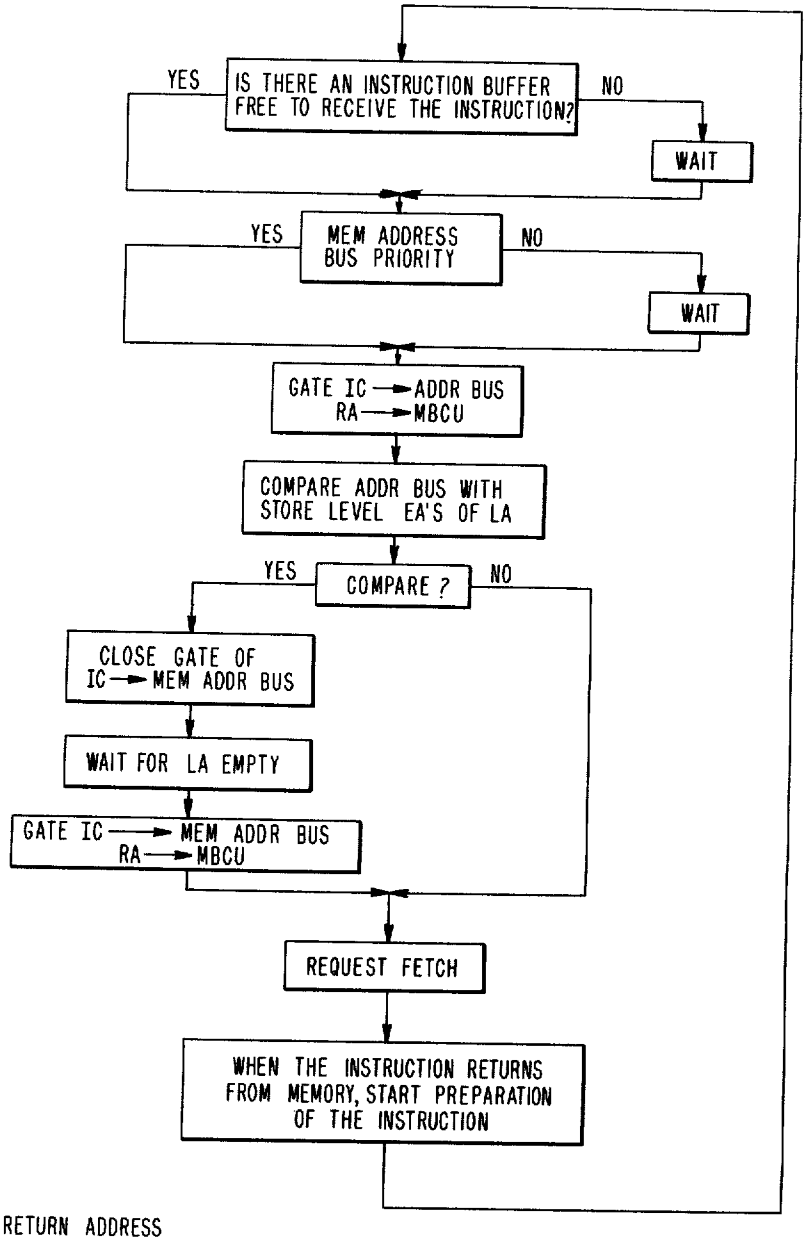
RA = RETURN ADDRESS
EA = EFFECTIVE ADDRESS
IC = INSTRUCTION COUNTER FIG. 10.3
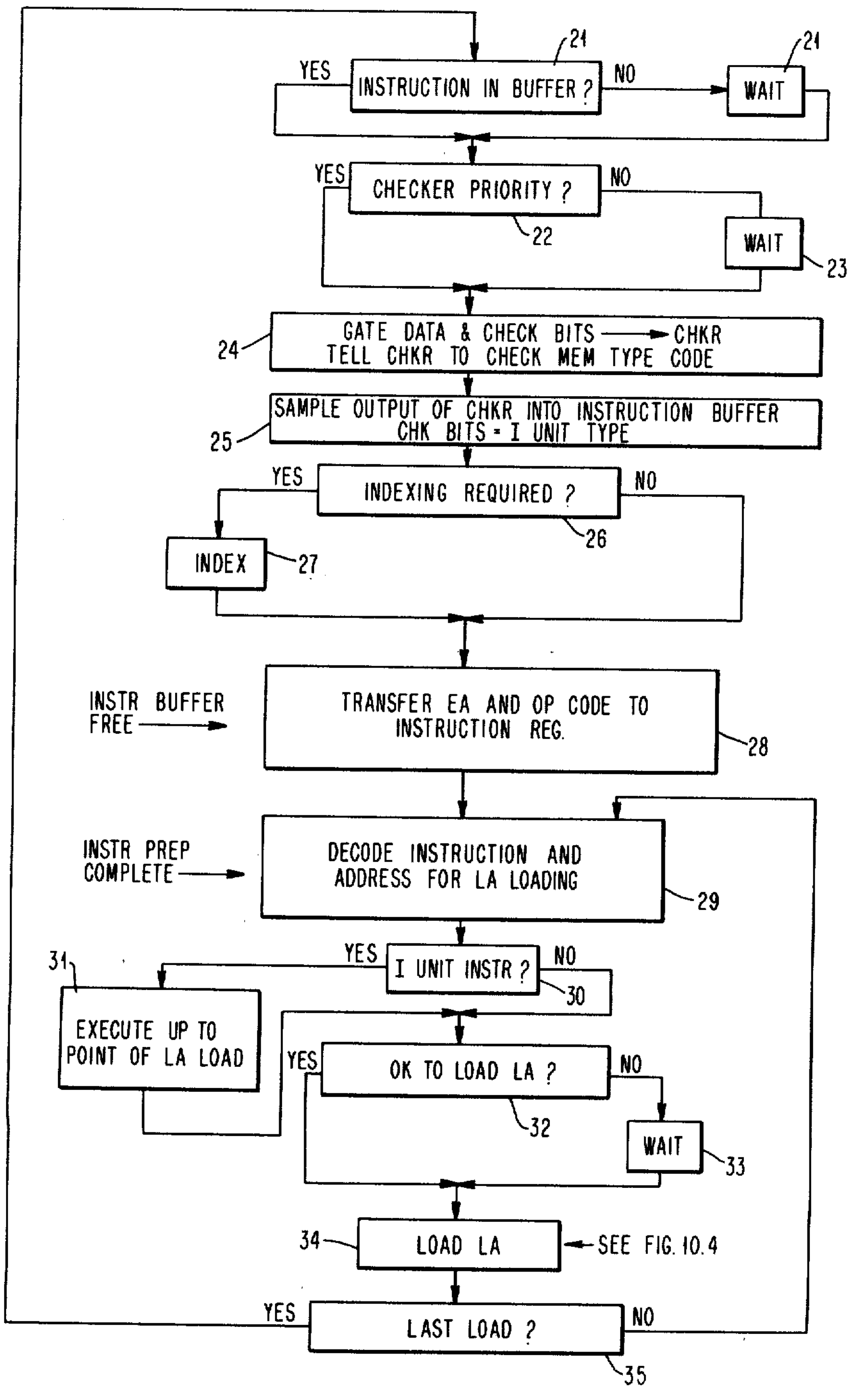

FIG. 10.4
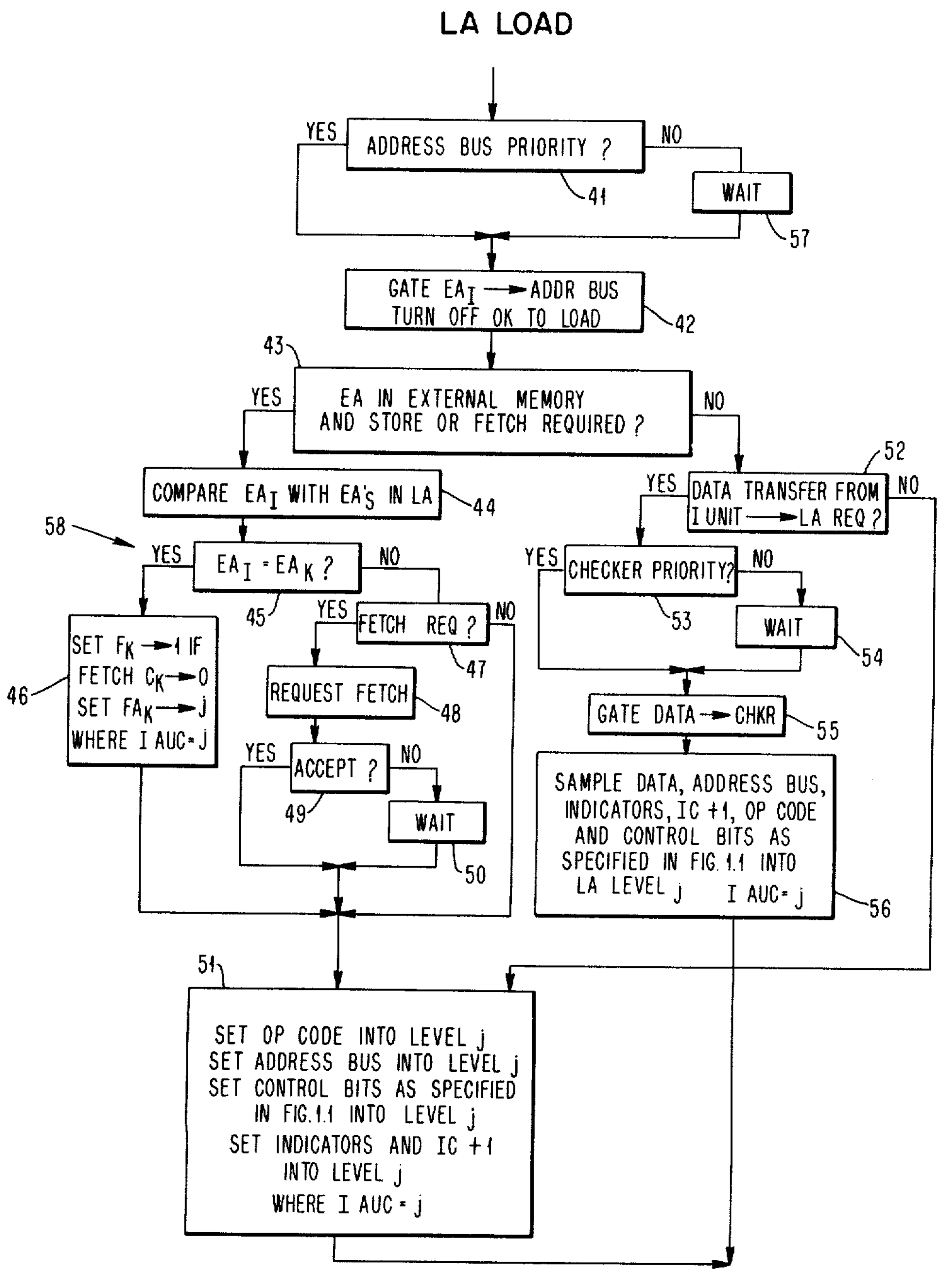

Nov. 10, 1964 R. J. BAHNSEN ETAL 3,156,897
DATA PROCESSING SYSTEM WITH LOOK AHEAD FEATURE
Filed Dec. 1, 1960 53 Sheets-Sheet 48
FIG. 10.6
OCC ACTION
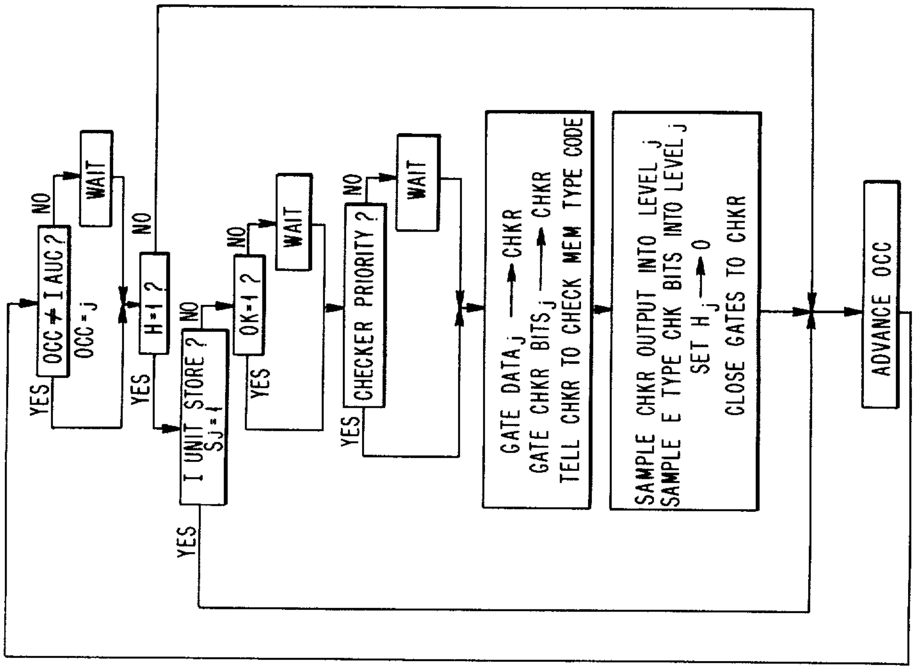
FIG. 10.5
I AUC ACTION
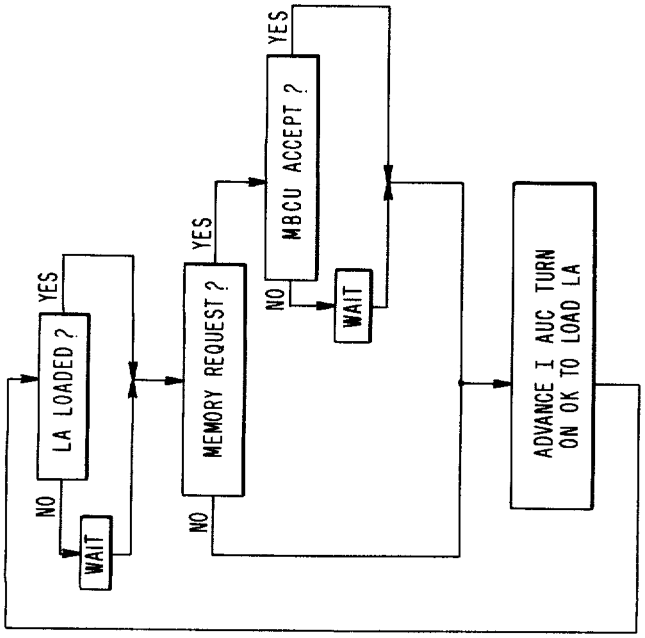

FIG. 10.7
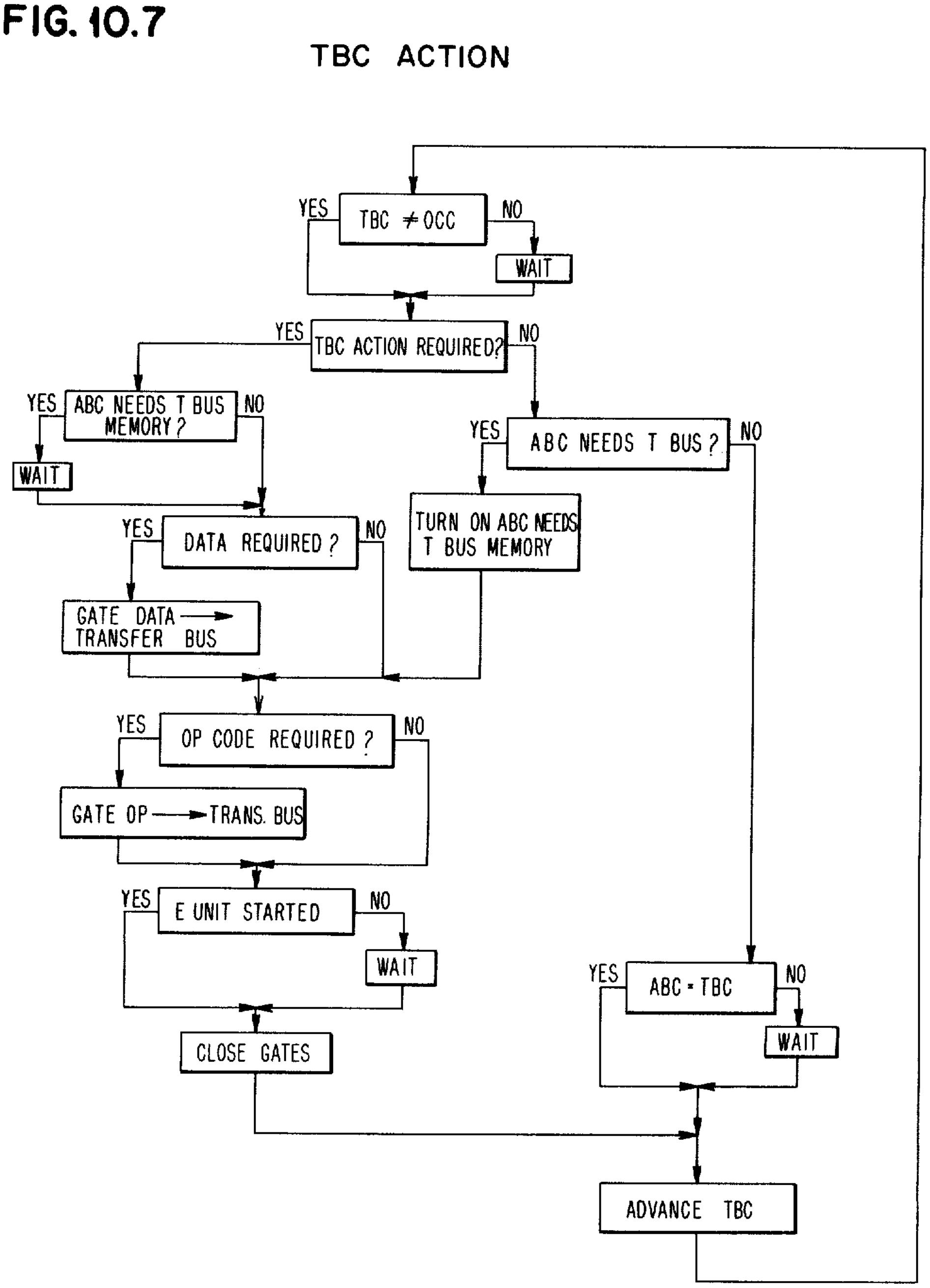

FIG. 10.8
INDICATOR TRANSFER & INTERRUPT TEST (ABC ACTION)
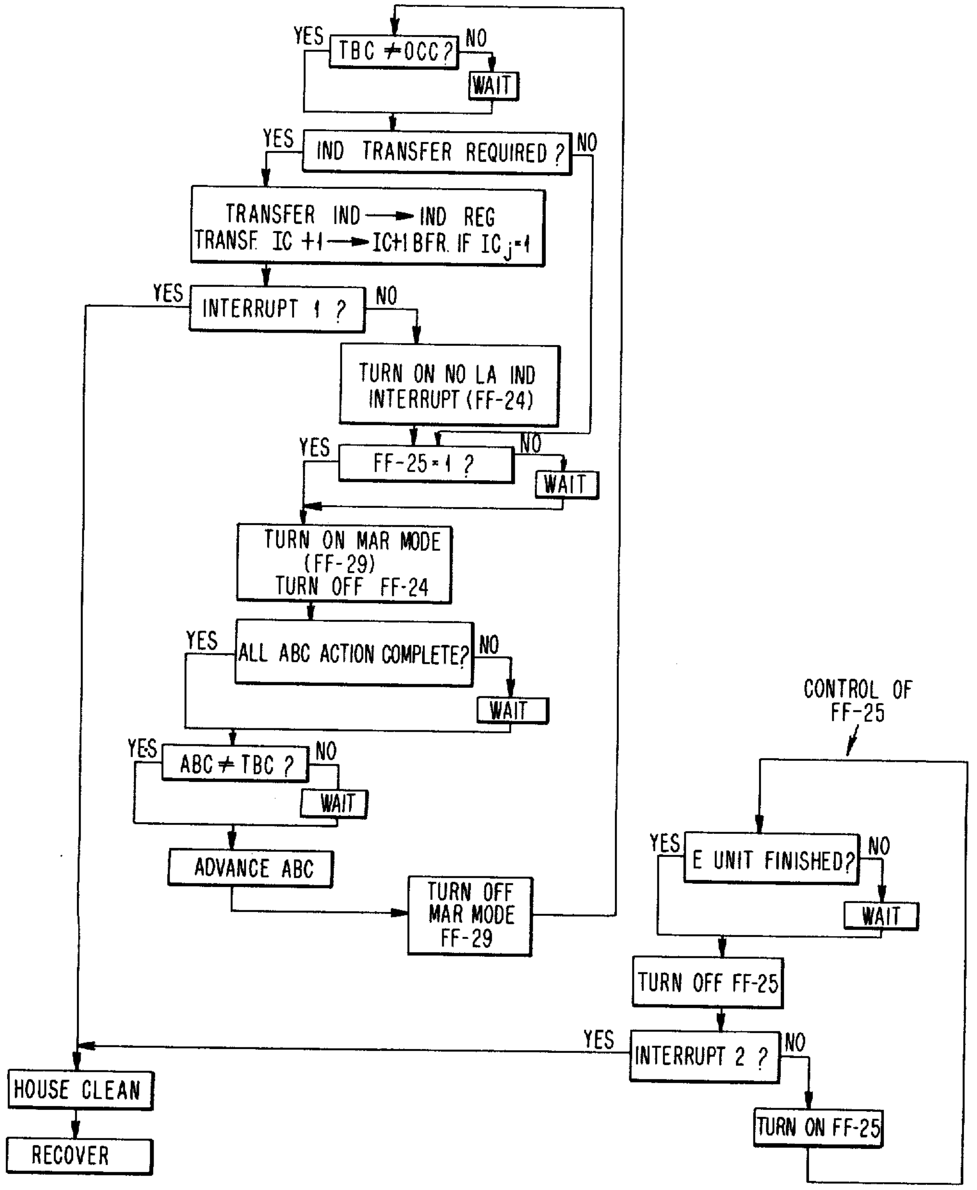

FIG. 10.9
INTERRUPT TEST AND MAR MODE
(NO INTERRUPT)
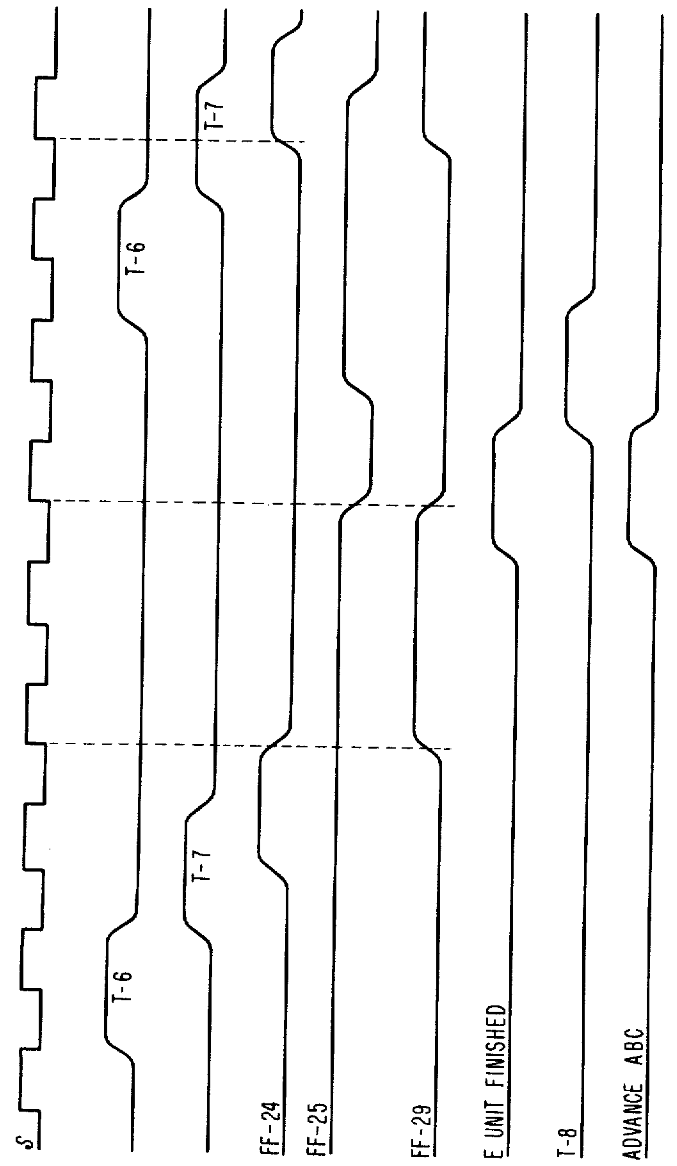

FIG. 10.10
SCC ACTION
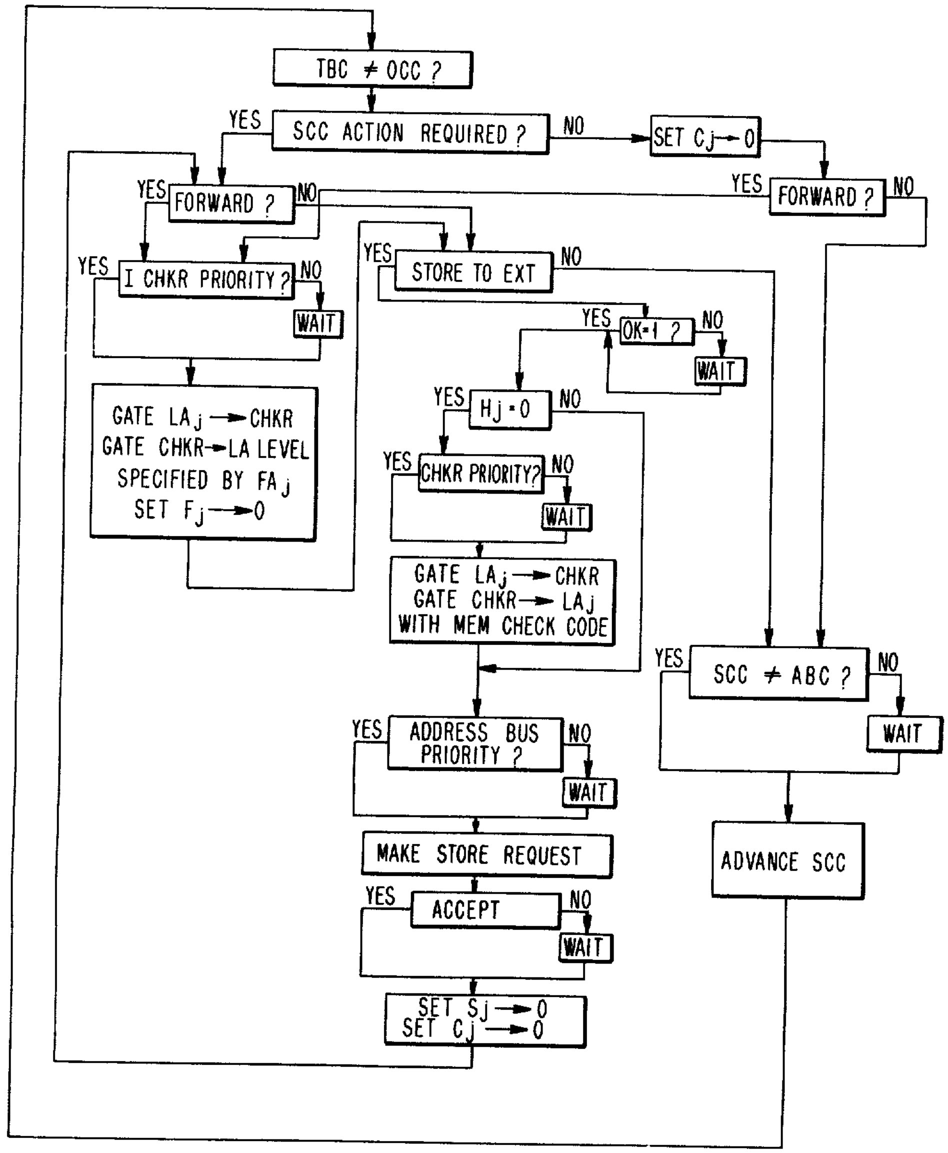

FIG. 10.11
HOUSE CLEAN ACTION
(ONLY WHEN A RECOVERY IS REQUIRED)
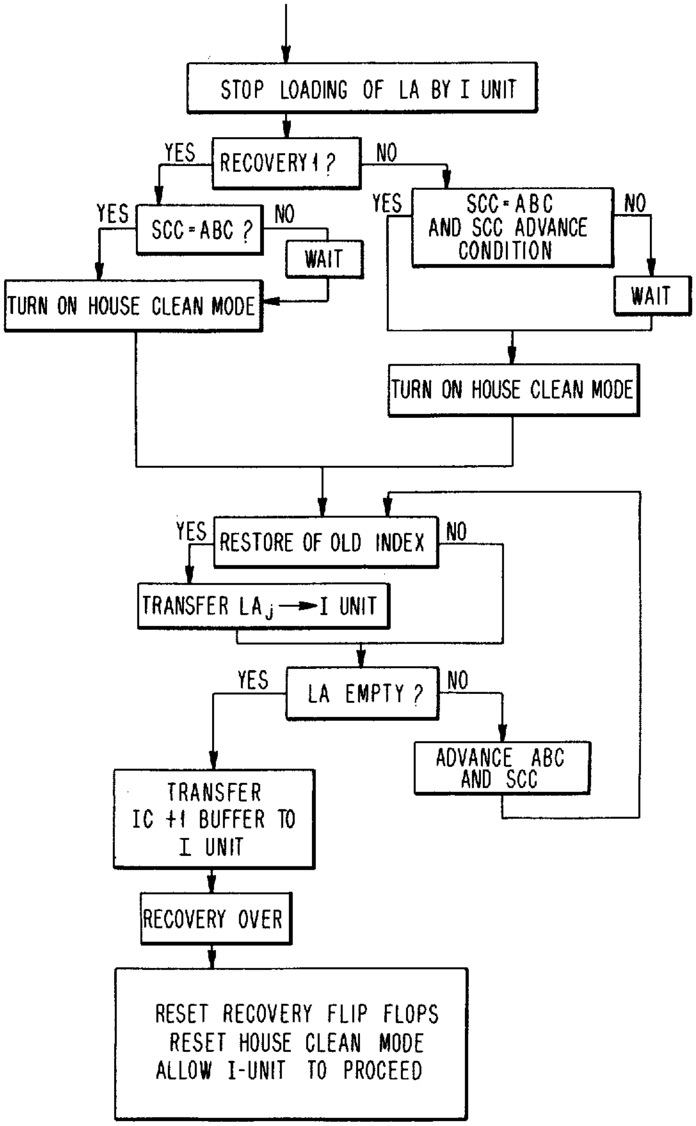

United States Patent Office 3,156,897
Patented Nov. 10, 1964

3,156,897
DATA PROCESSING SYSTEM WITH LOOK AHEAD FEATURE

Ralph J. Bahnsen, Cambridge, Mass., and Jules F. Dirac, Sea Isle, N.J., assignors to International Business Machines Corporation, New York, N.Y., a corporation of New York Filed Dec. 1, 1960, Ser. No. 73,005
14 Claims. (Cl. 340—172.5)

The present invention relates to a programming system for data processing machines, and more particularly, to a look ahead feature whereby several instructions may be withdrawn from a memory and processed in essentially sequential order so as to provide overlap between instructions, preparations, information transfers, and arithmetic operations.

In high speed calculators it is of prime importance that instructions be executed in a manner to obtain the highest time efficiency possible. In the usual case, however, much time may be lost due to the fact that the execution unit may be performing arithmetic operation in accordance with an instruction pulled out of memory and the next instruction may not be pulled out of memory until said operation is complete, although said next instruction may not involve an arithmetic operation. For instance, if the arithmetic unit is performing the addition of an operand pulled out of memory to the sum stored in an accumulator, memory stands idle while this addition takes place. If the next instruction, for instance, an index modification instruction in which data is modified in the instruction unit, and consequently not involving the arithmetic unit, time could be saved if this instruction could be withdrawn from memory and its execution initiated while said arithmetic operation is going on. This would increase the time efficiency of the calculator. A transfer instruction might also be withdrawn and executed during an arithmetic operation. To achieve this type of time efficiency, the calculator of this invention provides a look ahead feature. In accordance with this look ahead feature, a plurality of registers are provided to store instructions read out of memory and a priority control is employed to select an instruction for execution according to a predetermined allocation of priority to the different types of instructions handled by the calculator. In this manner the status of the calculator is periodically surveyed and instructions executed depending upon certain criteria to achieve the time efficiency.

Therefore, it is a principal object of this invention to provide a data processing system with a buffer storage unit the different levels of which may be processed under the control of a plurality of changeable addressing means so that at any given time a processing operation is performed on a given level by only one of the addressing means.

Another object of this invention is to provide the buffer unit with a plurality of interlocked ring counters which control the processing of the levels in the unit.

A further object of this invention is to provide a data processing system wherein a buffer unit is controlled by a plurality of changeable addressing means so that information stored in the buffer unit may be used when requested by an instruction, thereby avoiding the necessity of extracting the information from a main memory.

Still another object of this invention is to provide a data processing system wherein information may be transferred between levels of the buffer unit.

Another object of this invention is to provide a data processing system wherein means is provided for storing the address of the instruction following the instruction presently being executed so that if a system interruption occurs, the system will remember to start on the next instruction when the interruption is terminated.

Another object of this invention is to provide a data processing system having a buffer unit wherein old index words may be stored after an index modification operation, thereby rendering the old index available in the event that an interruption occurs after the modification has been effected but before the instruction holding the old index word has been executed.

Another object of this invention is to provide a data processing system wherein an instruction unit decodes the operation code of an instruction to generate control bits which are stored in the buffer unit.

Still another object of this invention is to provide priority control circuits for determining the priority of use of certain components and buses in this system.

Another object of this invention is to provide a data processing system wherein the buffer unit is emptied when a system interruption occurs.

Another object of this invention is to provide a data processing system including a buffer unit for holding data extracted from a memory, transferring the data to a checking unit for checking the data, and returning the data to the buffer unit.

Other objects of the invention will be pointed out in the following description and claims and illustrated in the accompanying drawings, which disclose, by way of example, the principle of the invention and the best mode, which has been contemplated, of applying that principle.

In the drawings:

FIGURE 4 shows the sampling gates and bistable triggers associated with two buffer registers;

FIGURE 5 shows the system interrupt mechanism;

Figure 1:
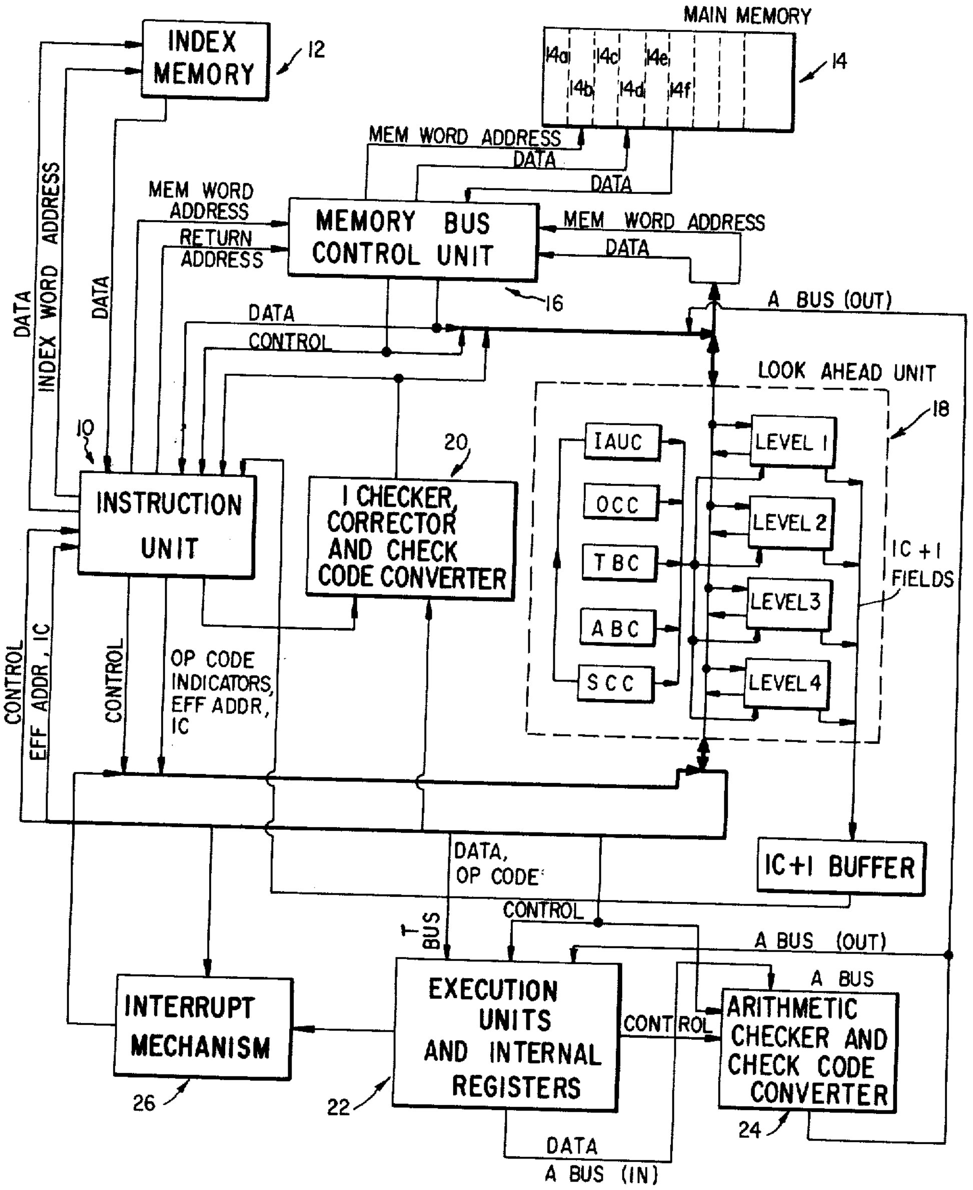
FIGURE 1 is a block diagram of a data processing system incorporating this invention.
Figure 2:
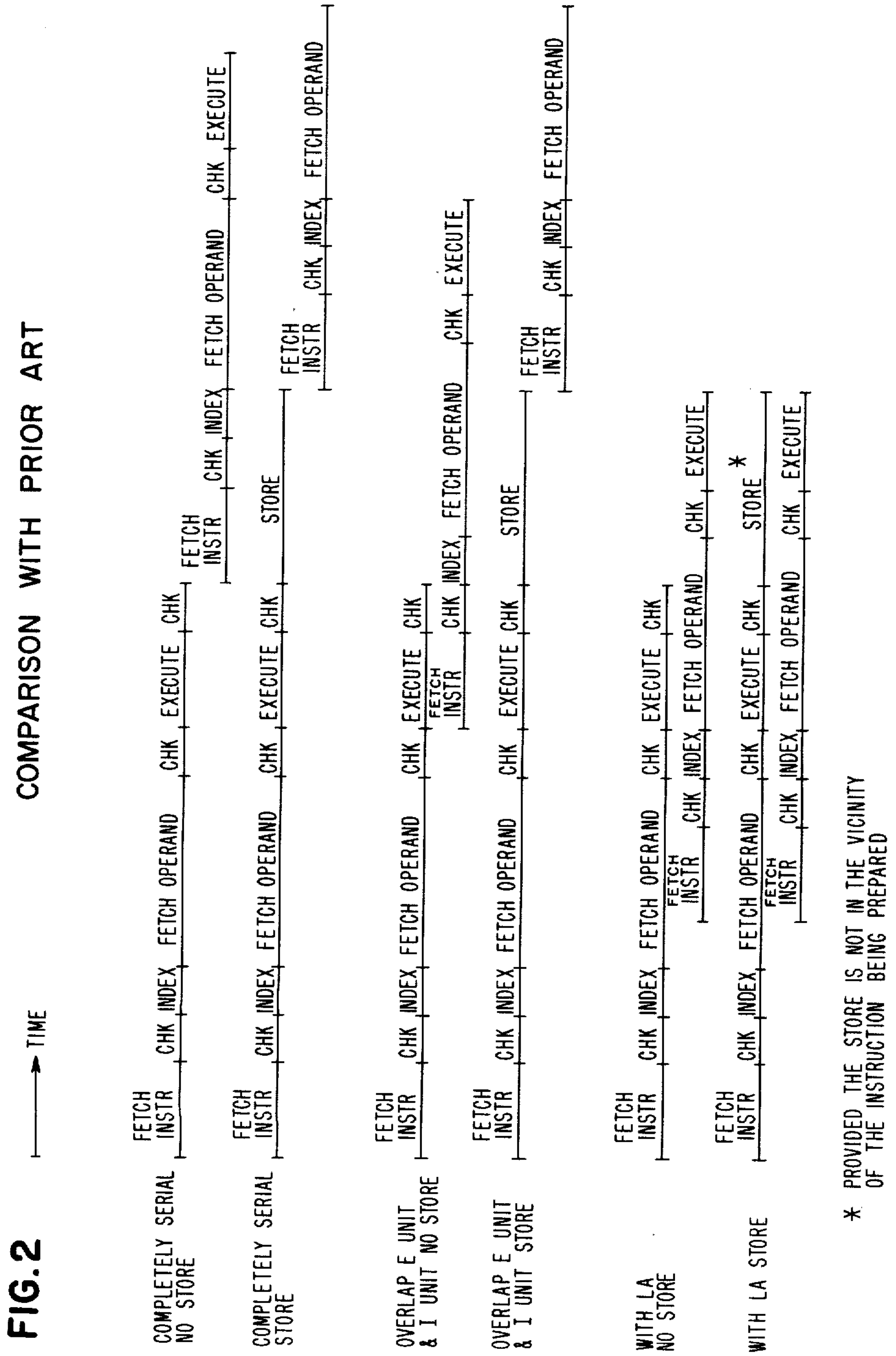
FIGURE 2 is a timing chart showing the overlap in system operations obtained with this invention.
Figure 3:
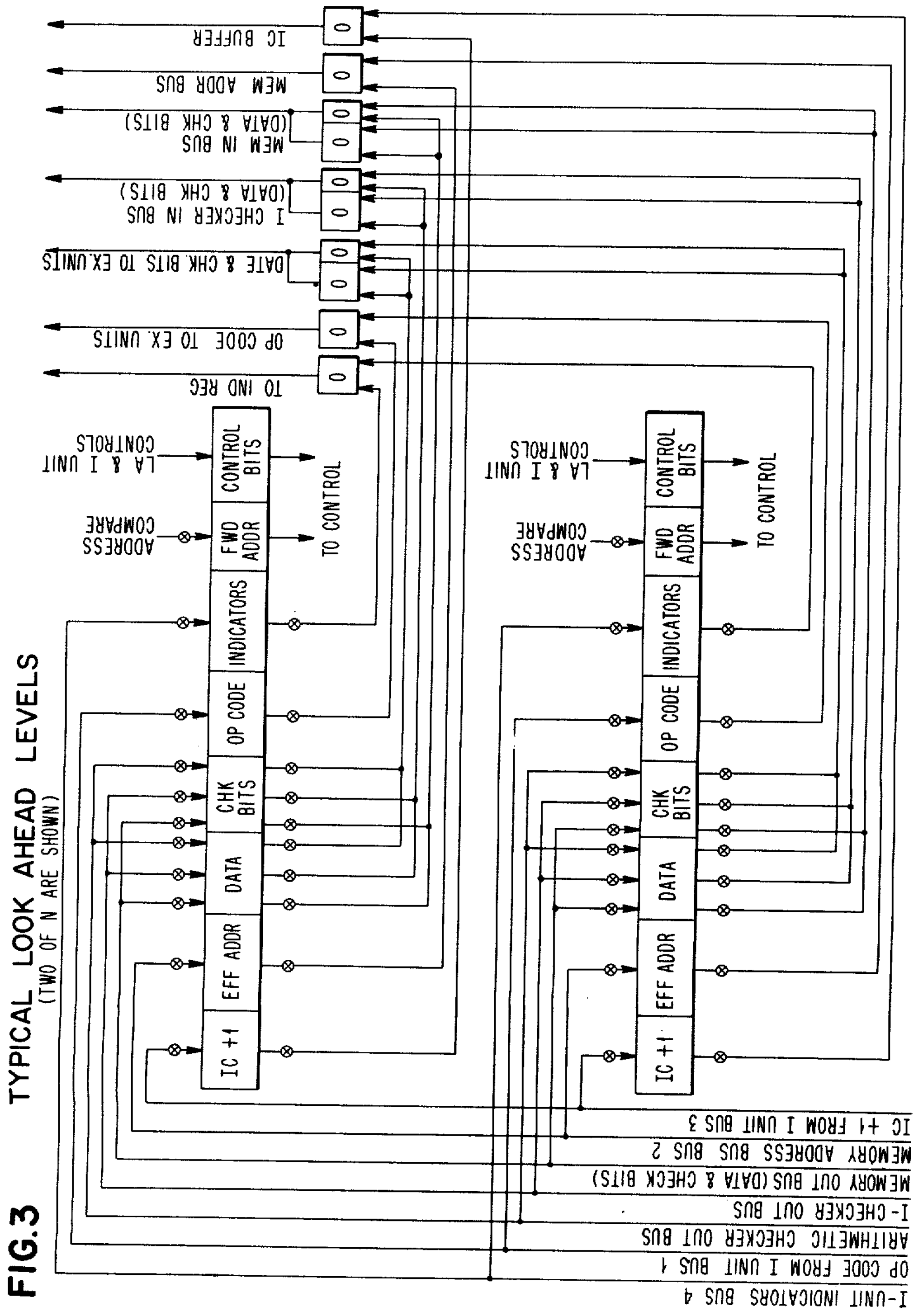
FIGURE 3 shows two typical buffer registers.

FIGURE 1.1 is a chart showing the loading code for the buffer registers;

FIGURES 1.2 and 1.3 show the logical circuits for the generation of the control bits for loading the buffer registers;

FIGURES 2.1 and 2.2 show the control bit triggers in a typical buffer register;

FIGURE 2.3 shows the logical circuit for setting up a forwarding operation;

FIGURE 3.1 shows a logical circuit for decoding the control bits for controlling the OCC;

FIGURES 3.2 and 3.3 show the decoding circuits necessary for controlling the TBC;

FIGURES 3.4, 3.5 and 3.6 show the circuits necessary for decoding the control bits for the ABC operation;

FIGURES 3.7 and 3.8 show the circuits necessary for decoding the control bits for the SCC operation;

FIGURE 4.1 shows the load sequencer and operand fetch sequencer circuits;

FIGURE 4.2 shows the loading interlock circuit;

FIGURE 4.3 shows the gates necessary for sampling into an LA buffer register;

FIGURE 4.4 shows another load sequencer circuit;

FIGURE 4.5 shows a memory code check timer circuit;

FIGURE 4.6 shows the circuits for an ABC transfer to the I-Unit;

FIGURE 4.7 shows the circuit for the transfer bus timer;

FIGURE 4.8 shows the logical circuits for an indicator transfer;

FIGURE 4.9 shows an interrupt timer;

FIGURE 4.10 shows the logical circuits for an A bus transfer;

FIGURES 4.11 and 4.12 show the forward timer circuits;

FIGURE 4.13 shows the store check timer;

FIGURE 4.14 shows the store timer circuit;

FIGURE 4.15 shows the logical circuits associated with the Houseclean Mode;

FIGURE 4.16 shows the logical circuit for a branch address transfer to the I-Unit operation;

FIGURE 5.1 shows the circuit for advancing the IAUC condition;

FIGURE 5.2 shows the IAUC advance interlock;

FIGURE 5.3 shows the IAUC counter;

FIGURE 5.4 shows the OCC advance interlock;

FIGURE 5.5 shows the OCC counter;

FIGURE 5.6 shows the TBC advance interlock;

FIGURE 5.7 shows the TBC counter;

FIGURE 5.8 shows the ABC advance condition circuits;

FIGURE 5.9 shows the ABC advance interlock circuits;

FIGURE 5.10 shows the ABC counter;

FIGURE 5.11 shows the SCC advance condition circuits;

FIGURE 5.12 shows the SCC advance interlock circuits;

FIGURE 5.13 shows the SCC counter;

FIGURE 5.14 shows the circuit for indicating when IAUC equals SCC for use in the recovery routine;

FIGURE 6.1 is a block diagram showing the determination of I-Checker priority;

FIGURE 6.2 is a typical logical circuit for determinin priority;

FIGURE 6.3 is a block diagram showing the determination of memory address bus priority;

FIGURE 7.1 shows the logical circuits for carrying out the address comparison operation;

FIGURE 7.2 shows the detailed components of one of the compare circuits shown in FIGURE 7.1;

FIGURE 7.3 shows the logical circuits for an index address compare operation;

FIGURE 8.1 shows the logical circuit for setting the forwarding address field in the buffer registers;

FIGURE 9.1 shows a typical timer circuit;

FIGURE 10.1 shows a block diagram of an instruction unit;

FIGURE 10.2 shows the flow diagram for an instruction and fetching operation;

FIGURE 10.3 shows a flow diagram for an instruction preparation operation;

FIGURE 10.4 shows a flow diagram for a look ahead buffer register loading operation;

FIGURE 10.5 shows a flow diagram of the IAUC action;

FIGURE 10.6 shows a flow diagram of the OCC action;

FIGURE 10.7 shows a flow diagram of the TBC action;

FIGURE 10.8 shows a flow diagram of the indicator transfer and interrupt test operation;

FIGURE 10.9 is a timing diagram for the interrupt test and MAR Mode operation;

FIGURE 10.10 shows a flow diagram of the SCC action; and

FIGURE 10.11 shows a flow diagram of the Houseclean action.

To aid in the finding of the descriptions of certain operations hereinafter to be presented, the following table of contents is included.

TABLE OF CONTENTS

Section I. Introduction
Section II. Environment
- A. Main Memory
- B. Memory Bus Control Unit (MBCU)
- C. The Look Ahead Unit
  - (1) IC+1
  - (2) OP CODE
  - (3) EFF AD DR or EA
  - (4) DATA
  - (5) CHK BITS
  - (6) INDICATOR
  - (7) FWD ADDR
  - (8) Control Bits
    - (*a*) OK
    - (*b*) C
    - (*c*) H
    - (*d*) S
    - (*e*) INT
    - (*f*) EOP
    - (*g*) XRS
    - (*h*) IC
    - (*i*) F
  - (9) Counters
    - (*a*) IAUC
    - (*b*) OCC
    - (*c*) TBC
    - (*d*) ABC
    - (*e*) SCC
- D. Instruction Unit
- E. E-Unit (Execution Unit)
- (F. The Arithmetic Checker (A-Checker)
- G. I-Checker
- H. IC+1 Buffer
- I. The Interrupt Mechanism Section III. General Description of System Operation
- A. Instruction Fetch (FIGURE 10.2)
- B. Instruction Preparation (FIGURE 10.3)
- C. LA Loading (FIGURE 10.4)
- D. OCC Action (FIGURE 10.6)
- E. TBC Action (FIGURE 10.7)
- F. ABC Action (FIGURE 10.8)
- G. SCC Action (FIGURE 10.10)

Section IV. Detailed Description of Operation
- A. Loading of OP CODE, EA, IC+1 and I-Unit Indicators
- B. Loading of OP CODE, EA, IC+1, I-Unit Indicators and DATA in Cases I*b*, IIB, V, VI of FIGURE 1.1
- C. Loading of Control Bits
- D. Advancing IAUC
- E. Set Up of Forwarding (FIGURE 2.3)
  - (1) Non-Store instruction being loaded
  - (2) Store type instruction being loaded
- F. Return of Operands Fetched From External Memory
- G. Checking of Fetched Operands—Function of OCC
- H. Details of Checking Operands Fetched From External Memory and OCC Action
- I. Transfer of Operands to the E-Unit—Function of TBC
- J. Details of TBC Action
- K. ABC Action
  - (1) Transfer of Internal Operands to Execution Units
  - (2) Transfer of Internal Operand to I-Unit
  - (3) Transfer of Indicators to the Indicator Register
  - (4) Transfer of Data to LA in E-Unit Store Type Operation to External Memory
  - (5) E-Unit Store to Internal Register
  - (6) Transfer of IC+1 field to IC+1 Buffer
  - (7) I-Unit Store-to-Internal Register TABLE OF CONTENTS—Continued (8) Check for "Interrupt" and "OK to Modify Addressable Registers"

L. Details of ABC Action
(1) Transfer of Indicators
(2) Transfer of E-Unit Internal Operands
(3) E-Unit Store-to-an-Internal Register
(4) E-Unit Store-to-External Memory
(5) E-Unit Store-to-Index Memory
(6) I-Unit Internal Store
(7) I-Unit Internal Fetch M. SCC Action N. Houseclean and Recovery Action O. Details of Houseclean Action

I. *Introduction*

The function of the Look Ahead Unit (LA) is to permit as much overlap as possible between the operation of the Instruction Preparation and Indexing Unit (I-Unit) and the Execution Unit (E-Unit) while maintaining the essentially sequential nature of a program. The LA-Unit also reduces the idle time of an E-Unit by permitting the fetching of memory operands prior to the time that they are needed. In addition, the I-Unit is permitted to modify index words by updating them and then to test these updated index words for index branching purposes even though the index modification has occurred prior to its program time. Such an operation is possible due to the ability of the LA-Unit to restore the machine to its "proper state" at any time if an exceptional condition should arise which requires some sort of program interruption. By the "proper state" it is meant that all addressable storage locations are in the condition they would be in if the machine operated in a purely serial or sequential fashion.

FIGURE 2 is a qualitative indication of the relative speed of a machine both with and without a Look Ahead Unit.

An essential feature of the LA-Unit is the elimination of memory fetches when the information to be fetched already exists elsewhere in the LA system. Such an arrangement eliminates memory cycles and thus makes the memory available for other uses as will be described below.

II. *Environment*

To describe the operation of the LA-Unit, its use in a typical computer or data processing machine will be described. FIGURE 1 shows such a machine which consists of an Instruction Unit (I-Unit) 10 with an Index Memory (XCS) 12 shown separately, a Main Memory 14, a Memory Bus Control Unit 16 (MBCU), the LA-Unit 18, an Instruction or I-Checker 20, Execution Units (E-Unit) 22 and an Arithmetic Checker 24. The machine may be assumed to be of the parallel transfer type.

II–A. *Main Memory*

The main memory 14 is preferably constructed of several separate memory units 14*a*, *b*, *c*, etc. so that successive memory requests may be made without the necessity for the complete memory cycle to be completed. For this reason, it is best to stagger the memory addresses so that the low order bits of the memory addresses will switch between the separate memory units. Thus, successive requests for consecutive addresses will start one memory unit for the first request and then another memory unit immediately following the first request.

II–B. *Memory Bus Control Unit (MBCU)*

The Memory Bus Control Unit 16 serves as the data and control link between the memories and the other units of the computer. It also has the ability to decode addresses to determine which memory contains the requested address. In addition, the Memory Bus Control Unit 16 contains priority circuitry to avoid conflicts resulting from more than one request for a given memory.

The operation of the Memory Bus Control Unit is as follows. If one of the computer units wishes to fetch a word from memory, it sends to the MBCU signals representing a fetch request, the memory address of the word, and a return address. These signals are maintained by the requesting unit until there is some response from the MBCU. The MBCU, upon decoding the requested address, determines whether the memory containing that word is busy. If the memory is not busy and there is no request for that same memory from some other unit with a higher priority, an "accept" signal is returned to the fetching unit. The MBCU also starts a read cycle in the appropriate memory. The return address is stored by the MBCU until the memory cycle is completed. The "accept" signal which was returned to the fetching unit allows the fetching unit to release its request and other lines to the MBCU, thus permitting the MBCU to proceed to other work. When the memory cycle is completed, the data from the requested word is sent through the MBCU data path. The MBCU, using the return address it has stored, sends a select pulse to sample the output of the MBCU data bus into the register in the E-Units as specified by the return address.

If the requested memory were initially busy or a higher priority request existed, the requesting unit would have to wait until the memory was not busy before an "accept" signal is returned from the MBCU.

In the case of an instruction containing a store-in-memory request, rather than a fetch-from-memory request, the store request, memory word address and data to be stored are supplied to the MBCU. The request is analyzed as in the previous case for priority. If the requested memory is not busy, an "accept" signal is sent to the requesting unit. The data is then sent to the memory and a write cycle is started in the memory.

In the particular environment shown in FIGURE 1 only the I-Unit 10 makes fetch requests, while only LA-Unit 18 makes store requests.

II–C. *The Look Ahead Unit*

The LA-Unit 18 consists of a number of buffer registers or levels and the controls which permit simultaneous operation of the E-Unit 22 and I-Unit 10.

The LA-Unit can hold both data and Operation (OP) codes as well as other information in its registers. The general operation is as follows. After the I-Unit 10 has prepared an instruction, it transfers the OP code portion thereof to one level of LA-Unit 18. At the same time the Effective Address (EA) in the instruction is also loaded into the LA-Unit buffer register of this level. I-Unit 10 also initiates a fetch request for the data or operand at the Effective Address of the instruction. The return address supplied with the fetch request is the address of the LA-Unit level into which the OP code has been loaded. After loading the OP code and initiating the fetch request, the I-Unit is free to proceed to the next instruction. When the preparation of the next instruction is completed, it OP code may be loaded into the next level of LA. A fetch is requested for the operand, and the cycle continues as with the first instruction.

The LA-Unit 18 supplies OP codes and operands or data one at a time to the E-Unit 22. Each time E-Unit 22 finishes an operation from one level of LA-Unit, LA-Unit supplies the E-Unit with the OP code and operand from its next level.

Each buffer register contains a number of fields or sections. These fields of two typical LA-Unit levels are shown in FIGURE 3 and are defined as follows:

(1) IC+1—This field holds the address of the instruction which follows the instruction buffered in this level.

(2) OP CODE—This field holds the OP code for eventual use by the E-Unit 22. The OP code is loaded into the LA register by the I-Unit.

(3) EFF ADDR or EA—This field is the effective address of the operand specified in the instruction buffered in this level of LA. The EFF ADDR is loaded into the LA level by the I-Unit.

(4) DATA—This field contains the operand for the instruction buffered in this LA level. If the instruction is of the fetch type with an address in an external memory, the data will be supplied by the MBCU. If the instruction is of the fetch class with an address in XRS, the data will be supplied by the I-Unit 10 via the I-Checker 20. Operands which are in internal addressable registers associated with E-Unit 22 do not use the DATA field of the LA register. In operations of the store type with an EA which does not specify an internal register, the data will be supplied by the E-Unit (for E-Unit type stores) or the I-Unit (for I-Unit type stores).

(5) CHK BITS—This field contains the check bits which cover the information in the DATA field. The CHK BITS may be of either the Memory Check Code type or the E-Unit Check Code Type. The check bits may come from either memory 12 or 14, the I-Checker 20 or the Arithmetic Checker 24.

(6) INDICATORS—This field contains indicators (Index result indicators, error indicators, etc.) which may be set by either I-Unit 10 or LA 18. These indicators must be buffered in LA to permit the setting of an Indicator Register at the proper program time. When E-Unit 22 starts on the instruction buffered in a particular level of LA, the indicators are transferred into the Indicator Register.

(7) FWD ADDR—This field is the Forwarding Address. It has the following purpose. Assume that an instruction requesting a store to some memory address, say 1000, presently exists in LA. Further assume that the E-Unit has not yet executed this instruction. Now, if the I-Unit should prepare a subsequent instruction which requires a fetch from, rather than a store to, address 1000, the wrong information would be obtained from this address if the fetch were executed immediately. To avoid this occurrence, the EA in each instruction is compared with the EA fields already buffered in LA. If there is no match or comparison, the fetch is made normally. If there is a comparison, the fetch is blocked, and instead of fetching the requested data from memory, the data word is transferred from the LA level which compares with the EA of the fetch instruction being loaded into LA. Such a transfer is accomplished by setting a forwarding address into the level compared with. This forwarding address will specify the address of the LA level presently being loaded. A control bit, called the F bit, is set in the level compared with to indicate that forwarding is necessary from this level. The forwarding mechanism is used not only to prevent fetching incorrect data from a location, because a previous store to the location has not yet been executed, but it also avoids memory fetches whenever the data required already exists in the LA system.

(8) CONTROL BITS (one of each type for each LA level).

(*a*) OK—This bit is used to indicate whether the data in the level of LA is OK for use. When this bit is a "1," it indicates the data is OK. When the bit is a "0" it indicates the data is not OK. This bit is set to "0" when the I-Unit loads an instruction requiring the fetch of a word from an external memory. When the word returns from memory and enters a level of LA, the OK bit for this level is set to "1." If the I-Unit supplies the data during a loading of LA, it sets the OK bit to "1" at the time of loading. Otherwise, the OK bit is set to "0" during loading.

(*b*) C—This bit, when a "1," permits the EA field for this level to be compared with the EA of the instruction being loaded by the I-Unit. If the C bit is a "0," its EA field is not allowed to cause an equal comparison with the EA of the instruction being loaded. This bit prevents the possibility of attempting to make an equal comparison or match with several EA fields in LA, all of which may have the same value. Each time a load is made into a level, say level *j*, and an equal comparison is discovered with the EA field of some other LA level, say level K, the C bit of level *k* is set to "0." Thus, an equal comparison may only be made with one level of LA at any given time.

(*c*) H—The H bit when a "1," indicates that the check bits exist in the Memory Check Code form. When the H bit is a "0," the check bits are in the E-Unit Check Code form.

(*d*) S—This bit when a "1," indicates that this level of LA contains a store type of instruction.

(*e*) INT—When the INT bit is a "1," the operand referred to in the instruction is in one of the internal addressable registers.

(*f*) EOP—This bit, when a "1," indicates that the E-Unit is required to take part in carrying out the instruction buffered in this level of LA.

(*g*) XRS—This bit, when a "1," indicates that a store into one of the Index Registers in memory 12 may take place. There are two cases where this bit is set to a "1" by the I-Unit. One case is an E-Unit store instruction specifying an Index Register as the store location. The other case is in the loading of an old index value or word into LA. This latter case will be discussed below.

(*h*) IC—When this bit is "1," it indicates that this level of LA is the last level assoicated with a given Instruction Counter value. This bit is necessary since some instructions may require more than one fetch or may require a fetch and a store (Add-to-Memory). Thus, more than one level of LA may be used in the execution of a single instruction.

(*i*) F—This bit, when a "1," indicates that the data in this level is to be forwarded from this level into the LA level specified by its forwarding address.

FIGURE 1.1 indicates the manner in which control bits are set when the I-Unit loads an instruction into LA. This chart covers several types of instructions capable of being handled by the Look Ahead system.

FIGURE 4 shows a typical register position of an LA level. The triggers or flip-flops are of the bipolar latching type and may comprise vacuum tubes or other electronic devices, transistors or other semiconductor devices, magnetic cores or any suitable bistable device.

(9) Counters.

To determine which level of LA is to be used for various control functions, a number of counters are employed in the LA controls. The value in the counter specifies the level of LA. The description of the main purpose of these counters is given below:

(*a*) IAUC—The IAUC (Indexing Arithmetic Unit Counter) is used to specify which level of LA is to be loaded by the I-Unit. After the level is loaded the IAUC is advanced provided it is not interlocked with the SCC (Store Check Counter). The interlocking will be described later.

(*b*) OCC—The OCC (Operand Check Counter) specifies which level of LA is to use the I-Checker 20 for the purpose of checking an operand. After the check has been accomplished, the OCC is advanced. This advance is contingent upon the condition of no interlock with the IAUC.

(*c*) TBC—The TBC (Transfer Bus Counter) specifies the LA level which is to supply the OP CODE and DATA to the E-Unit 22. After the E-Unit has received the OP CODE and DATA, the TBC is advanced provided it is not interlocked with the OCC.

(*d*) ABC—The ABC (Arithmetic Bus Counter) is used to specify the LA level involved with transfer over the Arithmetic Checker Bus (A Bus). The ABC also is used for program interruption interrogation functions. The ABC is advanced after completion of instructions (modification of addressable internal registers) by the E-Unit. The advance of the ABC depends upon the condition of no interlock with the TBC.

(*e*) SCC—The SCC (Store Check Counter) is used to specify the LA level involved in checking operands and converting to the Memory Type Check Code. The SCC also designates the level which is used in gating data to the MBCU during the store. The SCC is used in forwarding also. If forwarding is required, as indicated by the F bit being set to "1" in the level specified by SCC, the data of this level is transferred to the level designated by the forwarding address. The transfer is accomplished by means of the I-Checker. After a store request has been accepted, or if no store or forwarding action is required, the SCC is advanced. The advance is allowed to take place if there is no interlock with the ABC.

Counters of the ring type are shown in FIGURES 5.3, *5.5, 5.7, 5.10 and 5.13*. In each of these figures, four levels of LA are assumed. Each counter will have a single "1" in one of the flip-flops. The other three flip-flops in the counter will contain "0's." If the "1" is in position *j* of the counter and an advance pulse occurs, the "1" will advance to position $j+1$.

The counters are interlocked so that no counter can pass any other counter. This is accomplished by preventing the advance of the OCC if IAUC=OCC. TBC is prevented from advancing if OCC=TBC. ABC is not allowed to advance if TBC=ABC; SCC cannot advance if ABC=SCC. If IAUC=SCC−1, the IAUC is not allowed to advance. The interlock circuits are shown in FIGURES 5.2, 5.4, 5.6, 5.9 and 5.12.

Other control areas of LA will be discussed in the description of the detailed operation of the LA Unit.

II–D. *Instruction Unit*

The I-Unit 10 must have several features to operate effectively with the LA-Unit 18. It must have sufficient storage to permit the buffering of instructions to avoid being held up by slow memory access time. In this regard, the use of half word instructions is helpful. Furthermore, the I-Unit must be able to keep track of the address of the instruction which follows the one being loaded into LA. The reason for this will be given when program interruption is discussed. The I-Unit must also have storage room for any indicators it may want to test (such as index count="0," index value="0," etc.).

The I-Unit makes all fetch requests. Fetches for instructions result in the fetched data returning to the I-Unit. Fetches for operands for the E-Unit result in the data returning to the LA. When a store instruction already exists in LA, the I-Unit must be sure that it does not fetch from the location which that store will affect. When the I-Unit attempts to make a fetch for an operand from an external memory, it first compares the EA in the instruction with the EA fields already buffered in LA. If no comparison is detected, the fetch is made for the word from memory at that EA. If a comparison is detected, the fetch request is blocked and the forwarding operation is set up.

If the instruction counter value which is used for fetching an instruction is the same as an EA field in a level of LA containing a store instruction, it is necessary to block the fetch request of the instruction until the store instruction has been executed.

If the I-Unit loads into LA an instruction which requires the E-Unit to store into an Index Register, the I-Unit processing is halted until this store has been completed. This arrangement is required so that the indexing activity of the I-Unit will not use an index word which is not correct (i.e. the proper word has not yet been stored in the index register to correspond with the time sequential order of previous instructions).

The I-Unit, before loading LA, must be able to distinguish the various types of instructions and decode the memory areas involved in the execution of the instructions. The instructions loaded into LA must be elementalized; for example, an "Add-to-Memory" instruction must be broken down into two instructions for LA loading purposes. A fetch type of instruction is first loaded into LA, followed by a store type instruction in the next level of LA. With each of these loads, the appropriate control bits must be sent to LA as indicated in the chart shown in FIGURE 1.1. Furthermore, the loading of LA may be delayed if the LA-Unit is not ready to accept the load. Thus, the I-Unit must be able to wait for an "OK to Load LA" signal before loading LA.

Since the I-Unit is ahead of the E-Unit in the program, special attention is paid to Index Modification type instructions. The I-Unit actually performs the Index Modification before its program time. However, the old index value (the value before modification) is always loaded into LA for this type of instruction. Thus, a program interruption will necessitate the return of the old index to the index register if the interruption occurs in an instruction which precedes the Index Modification instruction. The return of the old index to its index register is accomplished by the LA controls.

II–E. *E-Unit* (*Execution Unit*)

The Execution Units (E-Units) perform the non-indexing and non-branching type of instructions; that is, they perform mainly arithmetic operations. The start of the E-Unit is controlled by a signal from LA. When LA has an OP CODE and DATA (if DATA is necessary) ready, a START WHEN READY signal is sent to the E-Unit involved. The system described assures one E-Unit but there may be more than one. The OP CODE field can distinguish between the E-Units. Thus, only the E-Unit involved receives the START WHEN READY signal from LA in the case of more than one E-Unit.

Before the E-Unit is allowed to complete its operation (modify addressable registers) it must wait for a signal "OK to modify addressable registers" (OK MAR) from LA. This signal is a result of LA's testing the status of the interrupt mechanism. When the E-Unit does complete its operation, it sends a FINISHED signal to LA. The E-Unit contains several registers some of which may be addressable. The method of getting data into or out of these registers may be by direct lines to the E-unit via the Arithmetic Checker Bus (A Bus). The A Bus is assumed to be the only data path from the E-Unit to LA.

II–F. *The Arithmetic Checker* (*A-Checker*)

The A-Checker 24 is used to verify the results of the E-Unit operations. It also provides a main data path (the A-Bus) of the system. The A-Bus is the connecting link between the E-Unit and LA. It also is the data path used for transferring the contents of the internal addressable registers from one location to another.

II–G. *I-Checker*

The I-Checker 20 is a checking unit which is shared by the I-Unit and by LA. It has the ability to check memory type check codes, I-Unit type check codes and E-Unit type check codes. When the I-Checker is supplied with data and check bits to be checked, it must also be supplied with a signal indicating the type of code to be checked. The I-Checker generates bits corresponding to the three check codes. The unit using the I-Checker decides which type of code to sample into the receiving register. Since the I-Checker is shared by the I-Unit and by LA, there must be a priority system to govern its use.

II–H. *IC+1 Buffer*

The IC+1 buffer register is set from the IC+1 field of each LA level after the LA level reaches its program execution time. In the event that the instruction being loaded into LA is a Branch type instruction, the IC+1 field of LA is loaded with the address to which the I-Unit is branching.

II–I. *The Interrupt Mechanism*

The Interrupt 26 consists of a Mask Register and an Indicator Register, whose bits are set by LA and by the E-Unit. When an Indicator bit is a "1" and its corresponding Mask bit is a "1," a program interruption is required; that is, the computer is forced to fetch an instruction from a location reserved for interrupt purposes. However, before this instruction is fetched, LA must first finish accomplishing all stores which have already been completed by the E-Unit but which have not yet altered memory. LA must also restore all index words to their old values if index modification has taken place in instructions which followed the instruction causing the interruption.

In addition, the contents of the IC+1 buffer register are transferred to the Instruction Counter of the I-Unit as stated previously. The IC+1 buffer contains the address of the instruction which follows the instruction which caused the interruption. If the instruction stored in the location reserved for interrupt purposes is a "Store Instruction Counter in Location *x* and then Branch to Location *y*," it will be possible to resume the original program after the interruption program (starting at location *y*) is complete. FIGURE 5 shows the logical circuitry comprising Interrupt Mechanism 26.

III. *General Description of System Operation*

We will now follow an instruction completely through the system shown in FIGURE 1 to describe the operaton of the LA-Unit in the system. To illustrate the system operation, consider an "Add-to-Memory" instruction. This instruction involves fetching the operand specified by the Effective Address (EA) of the instruction, adding this operand to the contents of an internal accumulator register in the E-Unit (assuming a single address machine) and storing the result back into the location specified by the Effective Address of the instruction. The accumulator register itself is not altered by the instruction.

III–A. *Instruction Fetch (FIGURE 10.2)*

The I-Unit 10 fetches the instruction in the normal fashion by fetching the instruction word from the address specified by the value in the Instruction Counter 30, assuming there is an instruction buffer 32 free to receive the instruction and memory address bus priority exists. Before making the fetch request, however, the I-Unit must compare the instruction word address with the EA fields of the LA levels containing store instructions, in order to prevent fetching an instruction from a word which is to be altered by a store operation. If there is an equal comparison or match between the instruction word address and the EA of a store level of LA, no fetch is made by the I-Unit for the instruction. Instead, the I-Unit waits for a signal indicating that LA is empty (that is, all instructions buffered in LA have been completed), at which time the I-Unit may proceed to fetch the instruction.

In the normal case, however, there is no comparison between the instruction address and the EA's in any of the LA store levels. Under this circumstance, the I-Unit 10 inititates a memory fetch by sending a "fetch request" to the MBCU 16. The word address in IC 30 and the return address RA are also sent to the MBCU. If the memory containing the requested word is not busy, an "accept" signal is sent to the I-Unit. If the memory is busy, the accept signal is not sent by the MBCU until the memory cycle has finished and the memory becomes not busy. The "accept" signal terminates the gating of Instruction Counter 30 and the return address to the MBCU. It also turns off the request line.

When the instruction word leaves memory, it goes through the MBCU data path eventually arriving at the input to the receiving registers. A select pulse is sent from the MBCU to the register specified by the return address which the MBCU has memorized. After the instruction is gated into the instruction buffer 32 (this is the register which receives instructions from memory; see FIGURE 10.1), the instruction preparation may begin. A logical flow diagram showing this instruction fetching cycle is shown in FIGURE 10.2. However, no detailed logic structure is shown for this cycle, inasmuch as it does not form a part of the present invention.

III–B. *Instruction Preparation (FIGURE 10.3)*

The instruction preparation consists of checking the Memory Check Code and generating the I-Unit type Check Code, decoding the instruction, indexing the instruction if necessary and setting up conditions necessary for loading LA. A flow diagram for this cycle is shown in FIGURE 10.3. However, no detailed structure is shown for this cycle inasmuch as it does not form a part of the present invention.

Checking the instruction is performed in the I-Checker by gating the instruction word to the I-Checker (provided the priority exists for this checker use) with an indication that the memory type code is to be checked. The output of the I-Checker is then sampled back into the instruction word buffer 32. An I-Unit check code is also sampled into the buffer 32 along with the instruction word.

If instruction indexing is required, the indexing is now performed. After the indexing, the OP CODE and Effective Address are transferred to the instruction register 34 where the instruction is decoded for loading LA. In the case under consideration, namely an "Add-to-Memory," the instruction is classified as an E-Unit fetch type followed by an E-Unit store type. The control bit configuration for the loading of LA is given by the chart in FIGURE 1.1.

III–C. *LA Loading (FIGURE 10.4)*

If LA has a buffer level available for loading, the I-Unit loads LA with the fetch level. This loading is accomplished in the following manner (see the logical flow diagram in FIGURE 10.4). If memory word address bus priority exists, the EA of the instruction is gated to the address bus. If the EA specifies an external memory, the address bus is compared with the EA fields of the LA registers which have a C bit equal to "1." If there is a comparison, and if the level being loaded is a fetch type, a forwarding cycle is set up as indicated in block 45 of FIGURE 10.4. If there is no comparison and a fetch is required; a fetch request is made to MBCU with the IAUC value specifying the return address. After the fetch has been requested, or if no fetch is required, or if there was a "compare," the fields of LA are set as indicated in block 51 of FIGURE 10.4 and the IAUC specifies the level which is being loaded.

If the EA of the instruction does not specify external memory 14, it may specify index memory 12. In this case a data transfer is required from the I-Unit 10 to LA-Unit 18. This transfer is made through the I-Checker 20. This condition is represented by the path through blocks 43, 52, 53, 55 and 56 of FIGURE 10.4.

If the EA of the instruction specifies an internal register in E-Unit 22, the level of LA specified by the IAUC is loaded as indicated in block 51 of FIGURE 10.4.

After LA has been loaded, the IAUC is advanced to the next LA level (see FIGURE 10.5). Upon receiving a signal from LA indicating that it is OK TO LOAD, the I-Unit proceeds to load the store level of LA. Such a procedure provides the "elementalizing" of an "Add-to-Memory" operation. This loading proceeds in exactly the same manner as described for the fetch level. The only exception is the following. In the case of a comparison (blocks 44, 58 and 46 of FIGURE 10.4), the F bit of the level compared with is not set to "1" in order to prevent forwarding into the level which is to be stored. The *Ck* BIT however, is set to "0" as in the fetch case to prevent the possibility of having more than one LA level compare with the address bus. After LA has been loaded with the store level, the IAUC is advanced again.

III–D. *OCC Action* (*FIGURE 10.6*)

The loading of the fetch level of LA specified by the "Add-to-Memory" instruction advances the IAUC. The fact that the IAUC is not at the same level of LA as the OCC indicates that the I-Unit has loaded this LA level. If the control bits in the LA level at which the OCC stands indicates a fetch level which has a memory type check code (S=0, H=1), the OCC waits for the OK bit to be set to a "1." If the OK bit is a "1" (the OK bit is set to "1" on an external fetch by the select pulse from MBCU which gates the data into the LA level), the memory check code is checked and the E-Unit type check code is generated. This function is accomplished by gating the data and check bits from the level specified by OCC to the I-Checker (provided there is priority for this use of the checker). An indication is given to the I-Checker that it should check the Memory Type Check Code. At the end of the check cycle, the data is sampled back into the level specified by the OCC and H is set to "0." Also sampled into this same level are the E-Unit type check bits. After this function has been performed, the OCC is advanced. The OCC would also advance if there were no checking action required at this level as is the case with the store level.

III–E. *TBC Action* (*FIGURE 10.7*)

If a fetch level does not specify an internal register (INT=0), the TBC provides both the data and the OP CODE to the E-Unit in the following manner. Assume that TBC value corresponds to the *j* level of LA. If TBC≠OCC, thereby indicating that the level has been loaded and checked, and $EOP_j=1$, $S_j=0$, $INT_j=0$, and $OK_j=1$, the data is gated from the level specified by TBC to the E-Unit. The OP CODE of level *j* is gated to the E-Unit if TBC≠OCC and if this is the first level containing an E-Unit instruction. When the data has reached the E-Unit, a signal is sent to the E-Unit indicating that the data and OP CODE are available for E-Unit use. When the E-Unit has finished its previous work, it will sample the OP CODE and DATA into the internal registers in the E-Unit. At this time a signal is sent from the E-Unit to LA indicating that the E-Unit has started, thereby allowing the TBC to advance. The TBC would also advance if no action were required by the TBC; i.e., if there is no requirement of a transfer of DATA or OP CODE from LA to the E-Unit. Thus, the store level of the "Add-to-Memory" instruction would be skipped over by the TBC since no data transfer to the E-Unit is required for the store. In addition, in this "elementalizing" of an "Add-to-Memory" operation the store level is not the first level of an E-Unit instruction, thus, no OP CODE is required to be transferred to the E-Unit.

III–F. *ABC Action* (*FIGURE 10.8*)

The ABC handles the transferring of the indicators and IC+1 fields of LA to the Indicator Register and IC+1 buffer register, respectively. After the previous instruction has been completed, the transfer of these fields will be effected from the LA level specified by the ABC. After the transfer of the indicators, a test is made to determine if a type 1 interrupt is to occur due to these indicators. If an interrupt is to occur, the E-Unit is prevented from finishing the instruction it is currently working on. A recovery is initiated to reset the E-Unit and the I-Unit controls, restore old index values, and return the Instruction Counter 30 to its proper value. If no interrupt is to occur, the E-Unit is allowed to complete its operation (i.e. modify addressable registers). When the E-Unit signals that it is finished, another test is made to see whether a type 2 interrupt is to occur. If no interrupt is to occur, the ABC is advanced. If an interrupt is to occur, a recovery routine is entered.

The ABC is also used to specify the level to which data is to be transferred from the E-Unit in store type operations. When the E-Unit signifies that it has finished its portion of the store instruction, a transfer of data is initiated over the A-Bus to the LA level specified by the ABC.

Internal register transfers to or from the E-Unit are also a function of the ABC. If the "Add-to-Memory" instruction specifies an internal register as holding the operand, the following would occur. Assume the ABC is standing at level *j*, the fetch level of the "Add-to-Memory" instruction. The fact that $INT_j=1$ and $S_j=0$ indicates an internal fetch. The contents of the register specified by $EA_j$ are gated to the A-Bus and sampled into the E-Units internal data register. After this transfer, the normal indicator transfers and interrupt test are made. In the event of no interrupt, the ABC is advanced to a count of *j*+1 which corresponds to the store level of LA. Here again, the indicators are transferred to the indicator register, and the interrupt test is made. The IC+1 field is also transferred to the IC+1 buffer. When the signal that the E-Unit is finished with its portion of the store is received, the transfer of the E-Unit data is made over the A-Bus to the internal register specified by $EA_{j+1}$. Then another interrupt test is made, and the ABC is advanced.

III–G. *SCC Action* (*FIGURE 10.10*)

If the store level refers to external memory, conversion from the E-Unit to the Memory Type Check Code is required and is performed by the SCC. If SCC=*j* and if $S_j=1$, $INT_j=0$, $XRS_j=0$, a store to external memory is called for. If $H_j=0$, the check code must be converted to the memory type code by means of the I-Checker. At the end of the check cycle, $H_j$ is set to 1. With $H_j=1$, $S_j=1$, $INT_j=0$, and $XRS_j=0$, the level specified by OCC is ready for storing. The store is accomplished by gating $EA_j$ to the address bus, provided there is priority for this, gating the DATA to the MBCU and sending a store request to MBCU. If the memory containing the word at $EA_j$ is not busy, an "accept" signal is sent from MBCU to LA. The "accept" allows the SCC to advance if no forwarding is required. It also ends the gating of the DATA and address to MBCU.

Forwarding is required if $F_j=1$, and the DATA in LA level *j* is gated to the I-Checker, provided priority exists for this transfer. If $H_j=0$, the checker is told to check the E-Unit type of code. If $H_j=1$, the checker is told to check the Memory type of code. At the end of the check cycle, the output of the checker is sampled into the LA level specified by the forwarding address $FA_j$. After the forwarding is complete, the SCC is advanced.

It should be remembered that the system described is not the only one that may be used. This system was chosen to illustrate that the LA-Unit may be employed in systems of almost any complexity. The implementation would be considerably simplified if there were no internal registers that were addressable. Also the interrupt mechanism adds to the complexity of this system. Further simplication may be made by using only one EA register in LA rather than one EA field for each LA level. Such arrangement, however, requires that the number of store type instructions in LA at any given time be limited to one.

IV. *Detailed Description of Operation*

The operation of LA will now be covered in detail for each type of instruction as given in the chart of FIGURE 1.1. The diagrams showing the implementation of the system have numbers in parentheses appearing on lines entering a figure which gives the figure number from which the line came. For lines leaving a figure, the destination figure or figures are given by the numbers in parentheses near the line name. The clock (or sample) pulses are designated by δ. All information transfer is assumed to be in parallel, however, the invention may also be adapted for serial operation, or a combination of both.

The starting point for the detailed description of the present invention will be the point at which the I-Unit has completed the preparation of the instruction and is ready to load the instruction into LA. This point is indicated by block 82 of the flow diagram of FIGURE 10.3. Initially all of the counters IAUC, OCC, TIBC, ABC and SCC may be considered reset to the address of LA level 1, at the beginning of computer operation. The following description, however, is valid for any period of time under consideration.

IV–A. *Loading of OP CODE, EA, IC+1, and I-Unit INDICATORS*

When no data transfer from the I-Unit to LA is required during the loading of LA, only the OP CODE, EA and IC+1 fields are transferred from the I-Unit to LA. This corresponds to the cases I. A and C, II. A and C, III. A, B, C, VII, VIII, and IX of FIGURE 1.1.

When the I-Unit has completed the preparation of an instruction, it is ready to load the instruction into LA. Before loading, however, it is necessary for the I-Unit to determine whether it is permissible to load (that is, does LA have a buffer level available). OK TO LOAD is the output of AND circuit A-1 in FIGURE 4.2. The input to this AND circuit is IAUC≠SCC−1 (i.e. the count in IAUC is one less than the count in SCC) and the output of flip-flop FF-1 which may, for the present, be assumed to have been reset to "1". The

IAUC≠SCC−1 signal indicates that the IAUC is free to advance; thus, there is a LA buffer level available.

OK TO LOAD signal enters AND circuits A-3 and A-4 in FIGURE 4.1. AND circuit A-370 provides the request for use of the Address Bus. When the address bus is free as determined by the ADDRESS BUS PRIORITY signal, A-4 has an output which will turn on the Load Sequencer FF-2 and start the Load Timer T-1. The details of a typical Priority System is shown in 6.2. The Memory Address Bus Priority Control is shown in FIGURE 6.3. The output of FF-2 turns off FF-1 through OR circuit O-89 and AND circuit A-377 in FIGURE 4.2.

Load Timer T-1 turns off the I PREPARATION COMPLETE signal so that the load sequence will not start again until the I-Unit is ready to load again. FF-2 in FIGURE 4.1 has the function of sending the OP CODE, EA, IC+1 and Indicator fields to LA. These bits appear on Bus 1, Bus 2, Bus 3 and Bus 4, respectively, of FIGURE 3. The Load Timer T-1 determines the time at which this information should be sampled into the LA level specified by the IAUC. A typical timer is shown in FIGURE 9.1. When a timer times out (last stage triggered) a pulse appears therefrom to sample the information on a bus into the appropriate register. The flip-flops used in the LA levels are of the bipolar set type as illustrated in FIGURE 4. The formation of the pulses for sampling into the fields is shown in FIGURE 4.3. The control bit field is shown in detail with a sampling pulse input in FIGURES 2.1 and 2.2.

FF-2 is turned off by Timer T-1 at the end of the timing cycle by means of AND circuit A-371 after the transfer of the information to LA is completed.

If the particular instruction being loaded into LA by FF-2 requires an external memory fetch, a fetch sequencer flip-flop FF-3 is turned on by AND circuit A-3. This sequencer initiates an external memory fetch if there is no comparison between the Effective Address $EA_I$ of the instruction being sent to LA and the addresses already in the LA buffers which may be compared with. The request for a memory fetch comes from the output of AND circuit A-5. The outputs of AND circuits A-7, A-8 and A-9 indicate the LA level to which data is to return from memory. The NO COMPARE signal at the input to A-5 comes from OR circuit O-3 whose inputs are the output of FF-4 which remembers that there is no address comparison until the fetch has been accepted and an $EA_I \neq EA_{LA}$ signal which appears on the NO ADDRESS COMPARISON line from FIGURE 7.1. The fact that the memory bus control unit has accepted the fetch request turns off FF-3 and FF-4.

If an address comparison occurs, no memory fetch request is made since the AND circuit A-5 is not energized by OR circuit O-3. Instead of a fetch being made, FF-3 is turned off by means of AND circuit A-375 and OR circuit O-2.

A signal indicating the end of address bus use is sent to the address bus priority circuit in FIGURE 6.3 by OR circuit O-142. This signal occurs at the end of the loading of LA by Timer T-1 if no memory fetch was necessary. These cases are determined by AND circuit A-374 or by AND circuit A-376. A-374 is energized if the memory fetch sequencer is not turned on. A-376 is energized when an address comparison is detected. Furthermore, when a memory fetch is required, OR circuit (FIGURE 4.1) remains up so long as FF-3 is on.

IV–B. *Loading of OP CODE, EA, IC+1, I-Unit Indicators and DATA in Cases Ib, IIb, V, VI of FIGURE 1.1*

This loading is similar to Section IV–A with the exception that in this case the DATA will be supplied to LA by the I-Unit through the I-Checker. The Loading Sequencer FF-5 and Load Timer T-2 shown in FIGURE 4.4 are used in this case. AND circuit A-10 requires an input "Checker Priority" which indicates that the Checker is free to be used for loading LA. The Load Sequencer FF-5 and Load Timer T-2 transfer the EA, IC+1, Indicators, OP CODE and control bits to LA. In addition, they transfer DATA from the I-Unit to LA.

IV–C. *Loading of Control Bits*

The control bits are loaded into the LA level by either Load Timer T-1 or Load Timer T-2. The setting of the individual control bits is defined in the chart in FIGURE 1.1. This chart indicates each type of instruction and the possible memory address areas for each instruction. The generation of these control bits is shown in FIGURES 1.2 and 1.3. The setting of the control bits of a typical LA level is shown in FIGURES 2.1 and 2.2.

IV–D. *Advancing IAUC*

At the end of loading LA from the I-Unit, the IAUC should be advanced. When no external memory fetch is associated with the loading of LA, then the timing out of the load Timer T-1 or T-2 is sufficient to advance the IAUC. If an external memory fetch is required, the MEMORY BUS ACCEPT will advance the IAUC. The advance condition is shown in FIGURE 5.1.

The actual advance pulse generation is shown in FIGURE 5.2. The IAUC interlock which prevents the IAUC from catching up to the SCC is also illustrated in FIGURE 5.2. The IAUC itself is shown in FIGURE 5.3.

Once the ADVANCE IAUC condition exists, flip-flop FF–1 is set to "1" by A–2 and O–1 to indicate OK TO LOAD if no IAUC INTERLOCK as shown by the logic circuit in FIGURE 4.2. If there is no IAUC INTERLOCK as determined from FIGURE 5.2, both inputs of AND circuit A–1 are energized and the signal OK TO LOAD is given to the I-Unit to allow it to load another level of LA when the I-Unit is ready.

With the exception of the various loading control bit configurations, and the necessity to make external memory fetches in some cases, and in some other cases to supply data to LA by means of the I-Checker, all LA loading cycles proceed in the same manner and are as described above.

The loading of LA frees the I-Unit so that it may proceed to prepare its next instruction. After the loading, LA provides the necessary further functions to supply the OP CODE and Operands to the E-Unit in the proper program sequence.

Indicators are also set at the proper program time.

IV–E. *Set Up of Forwarding (FIGURE 2.3)*

Each time a loading of LA is performed, the $EA_I$ gated by the I-Unit onto the memory address bus is compared with the EA of the levels of LA which have a C bit=1. The comparison has no significance if the instruction being loaded is of the "Unconditional Branch" or "Indicator Setting Only" types. In other cases, the following action is taken when $EA_I=EA_k$ and $C_k=1$:

(1) Non-Store instruction being loaded
  (*a*) The $F_k$ bit is set to "1"
  (*b*) The IAUC value is set into the FA field of level *k*
  (*c*) The C*k* bit is set to "0"

(2) Store type instruction being loaded
  (*a*) The C*k* bit is set to "0."

The setting of the F bit of the level whose EA is the same as the $EA_I$ being loaded is accomplished by means of AND circuit A–14 and OR circuit O–7 in FIGURE 2.3 and AND circuit A–30 in FIGURE 2.2. The C bit of the level whose EA compares with $EA_I$ is set to "0" through AND circuits A–14, A–15 and OR circuit O–8 in FIGURE 2.3 and AND circuit A–33 and OR circuit O–13 in FIGURE 2.1.

The setting of the Forwarding Address FA of the level whose EA is equal to $EA_I$ is shown in the lower part of FIGURE 2.3. The Forwarding Address for simplicity is shown as a single bit for each level to which forwarding is possible. Thus, there would be *n*—1 bits for an LA system employing *n* levels. All bits of the Forwarding Address would be "0" except the bit which represents the destination level in case Forwarding is required.

IV–F. *Return of Operands Fetched From External Memory*

When the fetch request for an operand is made by the I-Unit for return to one of the LA levels, a return address is sent with the request. This return address is the IAUC value at the time the request is made. The Memory Bus Control Unit controls the fetching of the desired operand. While the memory is performing its fetch cycle, the MBCU stores the return address until the fetched operand is available. At that time the MBCU, by using the stored return address, gates the memory operand from the Memory Out Bus into the proper LA level by sending a select pulse to that level. The selection by memory of a particular level causes the OK bit of that level to be set to "1" by AND circuit A–13 and OR circuit O–6 in FIGURE 2.1.

IV–G. *Checking of Fetched Operands—Function of OCC*

Operands which return from memory have a checking code associated with them which is not suitable for use by E-Units. If this is the case, as assumed here, a check bit conversion is necessary. Thus, operands which have been fetched from external memory will be checked for the correct memory type check code while the E-Unit type check code is generated. This operation is accomplished in the I-Checker under control of OCC.

In some types of loading operations, the Operand may exist in the proper check code form, as is the case when the data is supplied to LA by the I-Unit through the I-Checker. In this case no check bit conversion is required and the OCC may skip over these levels of LA.

The necessity for checking and check bit conversion is determined by examination of the H bit for each LA level. If the level at which the OCC stands has H=1, then the operand exists in its memory check code form. If H=0, either the operand exists in its E-Unit check code form or else there is no operand. Thus, the OCC, seeing an H bit of "1" at its level, must perform the check and check code conversion. If H=0 at the OCC level, no action is required and the OCC advances to the next level.

In order to be sure that the H bit at any level is valid, it is necessary to know that the level has been loaded. This status is insured by requiring that there is no interlock between the OCC and the IAUC, i.e. OCC≠IAUC. When this condition exists, the H bit of the OCC level may be examined. If the H bit is "0," the OCC is advanced; if the H bit is "1," an examination of the OK bit must be made to see whether the operand *has been* received from memory. If the OK bit is "0," the operand has not returned from memory and the checking controls must wait. If the OK bit is "1," the operand is in the LA level and checking may proceed.

There is one case where the H bit is "1" but no check bit conversion is necessary. This case occurs when an I-Unit store-to-external memory instruction is in LA. In this case, the data has been loaded into LA through the I-Checker and the proper Memory Check Code was generated on the way from the I-Unit to LA. The fact that the S bit is "on" in the level at which the OCC *stands* is sufficient to tell the OCC to advance beyond this level with no action required. FIGURE 10.6 presents a flow diagram of OCC action.

IV–H. *Details of Checking Operands Fetched From External Memory and OCC Action*

The circuitry for determining whether or not a check of the memory check code is required is shown in FIGURE 3.1. For example, if OCC is standing at a value corresponding to LA level *j*(OCC=*j*), the output of OR circuit O–20 is brought up by AND circuit A–40 if all its inputs are up, i.e., H*j*=1, S*j*=0 and OK*j*=1. The output of OR circuit O–20 then energizes AND circuit A–44 in FIGURE 4.5. The other inputs to A–44 are a sample pulse, a CHKR PRIORITY which indicates that it is OK to use the checker at this time and a $\overline{\text{HOUSECLEAN MODE}}$. The $\overline{\text{HOUSECLEAN MODE}}$ is assumed to be up at this time and means not a HOUSECLEAN MODE operation (see FIGURE 4.15). The purpose of the input to A–44 from the zero side of FF–7 is to prevent repeated energization of A–44 at each sample pulse. Once A–44 has turned on FF–6 and *Chk* Timer T–3, FF–7 is turned on (i.e. set to "1"), thus blocking further use of A–44 until the OCC has been advanced and a new level decoding has taken place.

FF–6, which is turned on by A–44, performs the gating of the DATA and Check Bits from LA level *j* to the I-Checker by means of AND circuit A–46. The Check Timer T–3 times the check cycle. At the end of the check cycle, T–3 allows the sampling of the DATA and E–Unit type Check Bits into the DATA and Check Bit fields of LA level *j* by means of AND circuit A–49. The output of AND circuit A–49 is also used to set the control bit $H_j$ to "0" (FF–10=0) through OR circuit O–15 as indicated in FIGURE 2.1. The check timer T–3 also turns off FF–6 thus closing the gate to the checker.

It has been assumed that there is enough delay in the checker path so that it is possible to gate from a register to the checker and to sample the output of the checker into the same register without race conditions causing problems. However, if necessary, either a delay means may be inserted into the path or a latching means connected to the output of the checker during sampling time.

The setting of the $H_j$ bit (FF-10) to "0" at the end of the check cycle causes the energization of OR circuit O-18 in FIGURE 3.1 which in turn energizes AND circuit A-41 and OR circuit O-21. The output of O-21 signals an ADVANCE CONDITION for the OCC. If there is no interlock with the IAUC as indicated by the output of the inverter I-2 in FIGURE 5.4, A-55 is energized and advances the OCC. The OCC is shown in FIGURE 5.5. The advance pulse from A-55 turns off FF-7 in FIGURE 4.5.

In the event that no OCC Action were required at level *j*, O-21 of FIGURE 3.1 would have been energized immediately by AND circuit A-41 when the OCC≠IAUC line came up to cause the OCC to advance as soon as there was no interlock between the OCC and the IAUC.

IV-I. *Transfer of Operands to the E-Unit—Function of TBC*

After E-Unit operands are ready in LA (i.e., returned from memory and checked), it is necessary to make these operands available to the E-Unit in the proper sequence. This operation is performed by the TBC.

The operands are known to be valid if OCC has advanced beyond TBC. Thus, TBC≠OCC is one condition for determining whether or not to use the Transfer Bus. Another condition is that the instruction buffered in the level at which TBC stands requires use of the E-Unit. Further conditions that influence the TBC Action are whether the instruction is a store, since a store does not require that an operand be supplied to the E-Unit, and whether the operand specified in the instruction is in an internal register. The internal register operands are supplied at the ABC level rather than at the TBC level since all execution up to this point in the program must be complete before the contents of the internal register can be guaranteed to be valid.

When it is determined that the Transfer (T) Bus is to be used, the DATA or OP CODE or both in the LA level specified by the TBC are gated onto the Transfer Bus. A signal is then sent to the E-Unit indicating that DATA or OP CODE or both are available for use by the E-Unit when it is ready for them. If the E-Unit is idle, it will immediately gate the appropriate information into an internal receiving buffer register and send back a signal indicating that the E-Unit has started. If on the other hand, the E-Unit is still executing a previous instruction or part of an instruction, it will wait until it has finished working on the previous instruction. When it is finished, it will then gate in the DATA and OP CODE and return a signal to LA indicating that it has started. The E-UNIT STARTED signal closes the gates from the LA level specified by TBC, resets the T Bus Timer and sets up the conditions for advancing the TBC.

The TBC action is shown in the flow diagram form in FIGURE 10.7.

IV-J. *Details of TBC Action*

The circuitry for deciding whether or not to use the Transfer Bus is shown in FIGURE 3.2. No decision is made until TBC≠OCC to insure that the DATA in the level specified by TBC is valid in both DATA and Check Bits.

Assume TBC=*j*. We will first cover the case in which use of the Transfer Bus is required for both DATA and OP CODE. This case is determined by the following control bits: $EOP_j=1$, $INT_j=0$ and $S_j=0$, thereby representing an E-Unit instruction of the fetch type with an operand in external memory. Under these conditions, the $EOP_j=1$ input line of AND gate A-115 is energized. One of the other inputs to A-115 is ICM which is the output of FF-21 in FIGURE 4.7. This flip-flop remembers whether the last instruction had its IC bit=1. If FF-21 is "off" or set to "0," it indicates that the current level of LA being decoded by TBC is not the first level of the instruction and, therefore, this level's OP CODE is not to be used.

Let us assume that FF-21 is "on" or set to "1." Therefore, when TBC≠OCC, all the inputs to AND circuit A-115 are up or energized to provide an output which in turn energizes OR circuit O-58 which in turn indicates use of the TBC OP CODE. OR circuit O-59 is also energized by means of AND circuits A-116 and A-119 to indicate that the TBC data is to be used.

The output of OR circuit O-58 feeds AND circuit A-74 in FIGURE 4.7. Other inputs to A-74 are from the "0" side of FF-45, the "0" of FF-12 and $\overline{\text{HOUSECLEAN MODE}}$. FF-45 remembers that TBC action has started. Once TBC action is started, further action is blocked until the TBC is advanced. For the present, we will assume that FF-45 contains a "0." FF-12 remembers that the ABC requires use of the Transfer Bus. Thus, the "0" side of FF-12 is used to block TBC action until the ABC has finished with the Transfer Bus. Let us assume that FF-12 also contains a "0." Therefore, AND circuit A-74 is energized at sample time and turns on FF-44. Likewise, the output of OR circuit O-59 in FIGURE 3.2 energizes A-62 in FIGURE 4.7 to turn on FF-11. FF-11 then gates the data field of LA level *j* onto the Transfer Bus by means of AND gate A-249, and FF-44 gates the OP CODE field of LA level *j* onto the OP CODE portion of the Transfer Bus by means of AND gate A-250. The outputs of AND gates 249 and 250 are applied to gates, not shown, for gating the DATA and OP CODE onto the Transfer Bus.

Timer T-4 was set off by the output of OR circuit O-49. This timer determines when the DATA and OP CODE have arrived at the E-Unit. At this time, FF-43 is turned on by AND gate A-71. FF-41 provides the stimulus to AND circuits A-251 and A-68 whose outputs indicate to the E-Unit that it may sample in the OP CODE and DATA when ready. FF-43 also energizes A-69 which in turn energizes OR gate O-99 thereby signaling the E-Unit to start processing the instruction when it is ready.

When the E-Unit actually does start, it returns the signal E-UNIT STARTED which energizes A-252 whose output provides the advance condition for the TBC by means of O-32. A-252 also causes FF-43, FF-44 and FF-11 to be set to "0." When the TBC advances due to E-UNIT STARTED, FF-45 is turned "off" by OR circuit O-28. The formation of the advance pulse is performed by the logic circuit shown in FIGURE 5.6.

The ADVANCE TBC CONDITION signal from O-32 in FIGURE 4.7, which was used to advance TBC, also conditions AND circuits A-247 and A-248 whose outputs are used to set FF-21 to remember whether the IC bit of level *j* was a "1" or a "0." The TBC decoding of the IC bit is shown in FIGURE 3.3.

If the preceding case involved an E-Unit fetch type instruction, but it was not the first level of the instruction, the operation would have been identical to that described with the following exception. The flip-flop FF-44 would not have been turned "on" since the line TBC DECODE USE OP CODE line would not have been energized since the ICM flip-flop FF-21 would be "off," thus deconditioning A-115. Since FF-44 is not turned "on," no OP CODE is gated to the E-Unit and the E-Unit is not told to sample in the OP CODE (i.e. AND circuits A-250 and A-251 are not energized).

Another case of TBC action involves a store-to-external memory when the store is the first level (OP CODE bearing level) of the instruction. This case is also similar to those described above except that only the OP CODE is gated to the E-Unit. The E-Unit is told to gate in the OP CODE and to start when ready. FF-11, not being turned "on," distinguishes the action of this case from the first case discussed.

When an internal register is specified, ABC action is specified. $INT_j$ energizes A-117 (FIGURE 3.2) when TBC=*j* and TBC≠OCC to in turn energize O–60 which turns "on" FF–12 in FIGURE 4.7. If the instruction is of the E–Unit type and the IC memory (ICM) flip-flop FF–21 is "off" (set to "0"), the TBC will also decode USE OP CODE which appears as an output from O–58 in FIGURE 3.2 to turn "on" FF–44 in FIGURE 4.7 to gate the OP CODE to the E–Unit. However, the GO WHEN READY signal from O–99 is blocked since the "0" side of FF–12 will decondition A–69. Thus, only when the ABC is ready to transfer the data from the internal register to the E–Unit, is the GO WHEN READY signal supplied to the E–Unit by means of AND circuit A–64. After the E–Unit starts as a result of this signal, the flip-flops are turned off as usual and the TBC is advanced. When ABC has finished transferring the internal operand, it also turns off FF–12 by means of O–38.

There are cases when ABC requires use of the Transfer Bus but no OP CODE or DATA are gated by the TBC controls. Such a case arises during an I–Unit Store Operation. In this case both O–60 and O–61 in FIGURE 3.2 are energized. The output of O–60 turns "on" FF–12 which blocks further use of the T Bus by the TBC. The output of O–61 energizes A–72 in FIGURE 4.7. when ABC=TBC. The condition ABC=TBC is used as an input to A–72 to prevent TBC from getting too far ahead of ABC when no TBC action is required. The output of A–72 provides the stimulus to O–32 which advances TBC. After ABC is finished with the T Bus, FF–12 is turned "off" allowing normal TBC Action to resume.

When NO TBC ACTION REQUIRED is decoded, TBC is advanced as soon as ABC=TBC as described above. The TBC interlock circuits are shown in FIGURE 5.6 and the TBC itself is shown in FIGURE 5.7.

IV–K. *ABC Action*

(1) TRANSFER OF INTERNAL OPERANDS TO EXECUTION UNITS

When an internal operand is specified in an *n*th instruction, instruction *n*−1 must be completed before the fetch of the internal register can be accomplished since the internal register may be altered as a result of the Execution Unit's action in instruction *n*−1. The fetch of the internal register is performed at the ABC level. When instruction *n*−1 has been completed, the internal register, as specified by the EA of the LA level at which ABC stands, is gated to the Arithmetic Checker In Bus. The Arithmetic Checker Out Bus is then sampled into the E–Unit's receiving register. The OP CODE for this instruction is gated onto the OP CODE portion of the T Bus by TBC and is sampled into the E–Unit's OP CODE register by the ABC controls. When both of these functions have been accomplished, a signal is sent to the E–Unit telling it that its OP CODE and DATA are ready and it should, therefore, start its operation.

(2) TRANSFER OF INTERNAL OPERAND TO I-UNIT

In case some I–Unit instruction has an EA which specifies an internal register as holding the desired operand, LA must supply this operand to the I–Unit at the proper time in the program sequence of instructions. If instruction *n* requires the internal register, instruction *n*−1 must be completed before the internal register may be fetched. The procedure for transferring the operand to the I–Unit is as follows. Assume that instruction *n*, which requires the transfer of an internal operand to the I–Unit, occupies LA level *j*. When ABC=*j* and all execution for instruction *n*−1 has been completed, the contents of the internal register specified by EA are gated to the Arithmetic Checker In Bus. The Arithmetic Checker Out Bus is gated into LA level *j*. LA level *j* is then gated to the I-Checker and sampled into the I–Unit's receiving register.

(3) TRANSFER OF INDICATORS TO THE INDICATOR REGISTER

The I–Unit in preparing instructions and in performing its indexing functions may be required to set indicators. These indicators may be error indications or index modification result indicators, such as index value=0, index value>0, index count=0, etc. The circuits for setting these registers are not shown, since they do not constitute part of the present invention. These indicators are not set into the Indicator Register of the LA directly by the I–Unit since this would generally result in the indicator being set out of its proper program sequencer. Thus, the indicators, which result from the I–Unit's action on a particular instruction, must be buffered in the LA level which contains this instruction. In some cases, the only function of an LA level will be to carry these indicators fo placement into the Indicator Register at the proper time. Every level of LA will have an indicator transfer operation to perform unless it is a level which is to perform the fetch of an internal register for I–Unit use. The ABC level is the level used for sending the I–Unit indicators to the Indicator Register. It should also be mentioned that the E–Unit can generate a set of indicators, usually as a function of the result obtained by the execution of an instruction.

(4) TRANSFER OF DATA TO LA IN E-UNIT STORE TYPE OPERATION TO EXTERNAL MEMORY

At the completion of the E-Unit's portion of the store, the DATA is gated to the Arithmetic Checker In Bus by the E-Unit. The DATA may be latched there if the Checker Bus has storage. A last cycle store signal sent from the E-Unit to LA initiates the gating of the Arithmetic Checker Out Bus DATA into the LA level specified by the ABC. The DATA then remains in this level for eventual storage to the address specified by the EA stored in said level. The storage is performed from the SCC level, i.e., when the SCC count selects this LA level.

(5) E-UNIT STORE TO INTERNAL REGISTER

An E-Unit store to an internal register proceeds in the same fashion as described in the preceding section except that the DATA to be stored is not gated into the LA level specified by ABC. Instead it is gated into the internal register specified by the EA field of the LA level at which the ABC stands.

(6) TRANSFER OF IC+1 FIELD TO IC+1 BUFFER

The IC+1 buffer contains the address of the instruction following the one which is currently in process. The function of the IC+1 buffer is to enable the program to continue its course in case a program interruption is encountered. In this case, the IC+1 buffer contents are gated into the IC of the I-Unit during the recovery routine.

The transfer to the IC+1 buffer of the IC+1 field of the LA level specified by the ABC is performed at the time the indicators are transferred to the Indicator Register. However, the IC+1 field is transferred only if the IC control bit in the level specified by the ABC is a "1," indicating that it is the first level of an "elementalized" instruction.

(7) I-UNIT STORE TO INTERNAL REGISTER

An I-Unit store to an internal register proceeds as follows. Assume ABC=*j*. The DATA from level *j* are gated to the T Bus and are sampled into the E-Unit receiving register. From there the DATA is gated to the Arithmetic Checker In Bus. The Arithmetic Checker Out Bus is sampled into the internal register specified by $EA_j$.

(8) CHECK FOR "INTERRUPT" AND "OK TO MODIFY ADDRESSABLE REGISTERS"

The setting of I-Unit, E-Unit or LA indicators into the Indicator Register may cause a program interruption of the instruction associated with said indicators. The interruption, if it occurs, may be one of two types. The first type will suppress actual execution of the instruction;

the second type causes interruption after the completion of the instruction. Interruption of a program generally calls for the "out-of-turn" retrieval of special instructions from the external memory, then a return to the instruction which follows the instruction causing the interrupt. Generally speaking, the I-Unit indicators may cause an interruption before the execution of the instruction is completed, and the E-Unit indicators may cause an interruption after the completion of the instruction. The determination of whether or not an interruption is to occur is made at the ABC level. If an interruption is to occur before the completion of an instruction, the E-Unit is not allowed to modify addressable internal registers in accordance with a result. Furthermore, the E-Unit is reset so that any action it has started is rejected.

If there is to be no interruption before the completion of the instruction, the E-Unit is given a signal that it is OK to modify addressable registers (OK MAR). This signal enables the E-Unit to complete its operation (including the setting of its own indicators). At the completion of the E-Unit's operation, the status of the interrupt system is examined to determine whether an interruption is required as a result of the E-Unit indicators.

If no interruption is required in either of the two cases described, the ABC is advanced as soon as possible after completion of the instruction. If an interruption is required, a "Recovery Required" flip-flop is turned on. The recovery action will be described later.

A conditional branch operation which requires the E-Unit for testing the branch condition will also turn on the "Recovery Required" trigger. This operation will also be described during the discussion of the recovery action.

IV–L. *Details of ABC Action*

(1) TRANSFER OF INDICATORS

The first area to be discussed will be the transfer of the indicators to the Indicator Register and the transfer of the IC+1 field to the IC+1 buffer. The interrogation of the Interrupt Mechanism and the OK TO MODIFY ADDRESSABLE REGISTERS (OK MAR) signal will also be described. These portions of the ABC action are shown in the flow diagram in FIGURE 5.1.

Assume ABC=*j* and TBC≠OCC, which indicates that level *j* may be processed. If the instruction in LA level *j* is not an I-Unit fetch of an Internal Register then OR circuit O–71 in FIGURE 3.4 is energized from the output of AND gate A–147. The output of O–71 starts the transfer of the indicators to the Indicator Register by energizing A–253 in FIGURE 4.8 (FF–23 is assumed to contain a "0"). A–253 turns "on" FF–22 and starts the timer T–6. The output of FF–22 and ABC=*j* energizes A–256 which gates the indicators and the IC+1 field out of level *j*. The timer T–6 determines when the indicators should be sampled into the Indicator Register. If the IC bit level *j* is a "1," the output O–76 in FIGURE 3.5 causes A–258 in FIGURE 4.8 to be energized, thereby causing the IC+1 field to be set into the IC+1 buffer. Timer T–6 also turns on FF–23 which remembers that an indicator transfer has occurred.

After the indicator transfer has occurred, timer T-6 starts the Interrupt timer T-7 in FIGURE 4.9. The starting of T-7 is accomplished by means of A-259 if $IC_j=1$. When the timer T-7 has timed out, either A-260 or A-263 will be energized, depending upon the status of the interrupt line. If there is to be an interrupt, FF-26 is turned "on" by A-263. If there is no interrupt, F-24 is turned "on" by A-260. The interrupt signal is generated in FIGURE 5 due to an equal comparison between any of the 1 bits in the Indicator Register and correspondingly positioned 1 bits in the Mask Register, which itself may be filled by means of an appropriate store instruction. Assuming that there is no interrupt and FF-24 is turned "on" and also that FF-25 is "on," then A-265 will be energized and will turn on FF-29. FF-29 is the flip-flop which specifies that it is OK to Modify Addressable Registers provided ABC has been advanced (see A-11 in FIGURE 5.9). A-265 also turns "off" FF-24 making it ready for the next interrupt test.

The MAR MODE trigger FF-29 is in a "1" condition for advancing the ABC in most instances. If the conditions for advancing ABC (FIGURE 5.8) are examined, we see that A-335 provides the advance condition for an I-Unit fetch of an internal register and no MAR MODE is required. AND gates A-336, A-337, A-338, A-339 and A-340 all have MAR MODE (the output of FF-29) as one input. Thus, except for an I-Unit fetch of an internal register, MAR MODE is required for the advancing of the ABC.

If the instruction in the LA level *j* requires use of the E-Unit, the output of A-111 in FIGURE 5.9 allows the E-Unit to complete its operation (FF-46 which remembers if ABC has been advanced may be assumed to be "on"), after which O-104 and A-262 in FIGURE 4.9 turn off FF-25 and also FF-46 (FIGURE 5.9).

A-262 also starts the E Interrupt Timer T-8. If there is an interrupt condition, T-8 will turn "on" FF-28 by means of A-266. If there is no interrupt, T-8 will turn "on" FF-25 by means of A-261.

FIGURE 10.9 shows the timing of the various signals in a waveform diagram for the case of No Interrupt controlled by either the LA indicators or the E-Unit indicators.

(2) TRANSFER OF E-UNIT INTERNAL OPERANDS

The decoding of the condition which determines the necessity for the transfer of an internal operand to the E-Unit is shown in FIGURE 3.4. If ABC is assumed to be equal to *j*, then OR circuit O-66 is energized by A-151 which requires that ABC=*j*, TBC≠OCC, $EOP_j=1$, $S_j=0$ and $INT_j=1$. This condition of the $EOP_j$, $S_j$ and $INT_j$ triggers indicates an internal fetch for the E-Unit. TBC≠OCC is used to asure that the level has been loaded by the I-Unit.

OR circuit O-67 is also energized in this case by means of O-64. The output of O-67 feeds A-267 in FIGURE 4.10. The input to A-267 comes from the "0" side of FF-31 which remembers when a bus transfer has been initiated. The ABC advance turns "off" FF-31. If we assume that FF-31 is "off," then A-267 and O-110 are energized. The output of O-110 feeds A-273. The other inputs to A-273 are $\overline{\text{HOUSECLEAN MODE}}$ and a sample pulse. If we assume that $\overline{\text{HOUSECLEAN MODE}}=1$, then at sample time A-273 will turn "on" FF-30. A-273 also starts Timer T-5 which times the transfer of the contents of the internal register over the Arithmetic Checker Bus.

The output of FF-30 feeds a group of AND circuits (one for each internal addressable register). Another input to these AND circuits is the output of O-67. Each AND circuit also has an input line which specifies which internal register is to be used. These input lines come from the output of an address decoder. The decoder is fed by the EA field of level *j* by means of a group of AND circuits and OR circuits shown symbolically by A-271 and O-111. Thus, one of the internal registers would be gated to the A Bus by one of the AND circuits A-275, A-276 or A-277. The A Bus Timer T-5 times the transfer and provides the "gate in" signal for the E-Unit's receiving register by means of A-278. T-5 also provides the GO WHEN READY signal to the E-Unit by means of A-64 and O-99 in FIGURE 4.7. In this case, the E-Unit will start immediately since it always will be idle prior to an internal fetch.

At the end of the A Bus Transfer, T-5 energizes A-285 which in turn energizes O-114. The output of O-114 energizes A-283 which turns "off" FF-12 in FIGURE 4.7 through O-38. Turning FF-12 off is necessary to allow the TBC to continue processing.

When the E-Unit finishes the operation, it sends the E-UNIT FINISHED signal to LA thereby starting T-8 (FIGURE 4.9). T-8 in turn energizes A-109 in FIGURE 5.8 which turns "on" FF-47 which remembers that the E-Unit has finished. The output of FF-47 energizes A-338 to provide the condition for advancing ABC when MAR MODE is obtained.

(3) E-UNIT STORE-TO-AN-INTERNAL REGISTER

The operation for an E-Unit store-to-an-internal register is very similar to the internal fetch. When the E-Unit has completed processing the data to be stored and has received the OK MAR signal, it gates the DATA to the A Bus. It also sends the signal E STORE COMPLETE to LA. This signal, arriving at the input to A-268 (FIGURE 4.10), turns "on" FF-30 and starts timer T-5. FF-30 has no effect, however, since all the AND circuits that it feeds also have an input line from the output of O-67 (FIGURE 3.4) which is set to "off" or "0" for a store operation. Timer T-5 energizes AND circuits A-280, A-281, etc. to provide gating into the appropriate internal register. The control bits for this case (III–C in FIGURE 1.1) are so arranged that AND gates A-161 and A-163 (FIGURE 3.5) have no outputs, and, therefore, the output line ABC DECODES A BUS to LA of OR gate O-77 is down. Thus, the output of inverter I-35 in FIGURE 4.10 is up to energize AND gates 280, 281, etc., thereby gating the A Bus to the internal registers.

T–5 also turns "on" flip-flop T–5 M(FF–31) which provides the condition for advancing ABC if MAR MODE occurs (see A–339, FIGURE 5.8).

(4) E-UNIT STORE-TO-EXTERNAL MEMORY

An E-Unit store-to-external memory operation would have exactly the same ABC action except that A-279 would be energized instead of A-280, etc. to gate the output of the A Bus into LA level *j* rather than into an internal register. The control bit arrangement in Case III–A of FIGURE 1.1 is applied to the logic circuits in FIGURE 3.5 so that the line ABC DECODES A BUS to LA is now up.

(5) E-UNIT STORE-TO-INDEX MEMORY

An E-Unit store-to-index memory operation proceeds in exactly the same manner as an E-Unit store-to-external memory except that no attempt is made to advance ABC after T–5 has fired. T–5 Memory (T–5 M trigger) is used to energize A–233 (FIGURE 4.6) which in turn initiates an I-Checker cycle to transfer the word to the I-Unit for storage into the Index Memory. Such a transfer is accomplished by A–234 firing timer T–9 when I-Checker priority exists (FF–20 is assumed to be set to "0"). A–234 also turns "on" FF–19 which provides the gating of LA level *j* to the I-Checker. Timer T–9 times the check cycle, provides the gating in signal to the I-Unit by means of AND gate A–364 and also turns "on" FF–20. For this case, ABC is advanced by the "on" condition of FF–20 which in turn feeds AND gate A–340 (see FIGURE 5.8).

(6) I-UNIT INTERNAL STORE

An I-Unit internal store operation proceeds in the same manner as an E-Unit store-to-an internal register operation with the following exceptions. FF–30, which is turned "on" by A–269, O–110 and A–273 (see FIGURE 4.10) has the effect of gating the E-Unit's receiving register to the A Bus via A–104. The A Bus Transfer is once again timed by T–5, and the output of the A Bus is gated into the internal register specified by $EA_j$. Once again, the chart in FIGURE 1.1 determines the signals produced by the logic circuit in FIGURE 3.5. After the transfer T–5M (FF–31) is turned on to provide the advance condition for ABC (see A–336 in FIGURE 5.8).

(7) I-UNIT INTERNAL FETCH

An I-Unit internal fetch operation proceeds as follows. Timer T–5 is started and FF–30 is turned "on" by A–267 (FIGURE 4.10). *FF–*30 gates the internal register to the A Bus. Timer T–5 times the transfer and provides the gate signal to gate the output of A Bus into LA level *j* (see A–279 in FIGURE 4.10). As in prior cases, FIGURE 1.1 determines the control bit arrangement to provide this gating signal in accordance with the conditions of OR gates O–70 in FIGURE 3.4 and O–77 in FIGURE 3.5. At the end of this transfer, timer T–9 (FIGURE 4.6) is fired (if there is priority for use of the I-Checker) by means of O–93, A–233 and A–234. FF–19 is also turned "on" at this time and performs the gating of LA level *j* to the I-Checker. Timer T–9 times the transfers to the I-Unit and turns "on" FF–20 which provides the advance condition for ABC (see A–335 in FIGURE 5.8).

IV–M. *SCC Action*

The SCC performs two major functions. First, it provides the check bit conversion to the memory check code, if necessary, before a store operation and specifies the LA level which is to be gated to the MBCU for storage. Secondly it provides the forwarding feature.

The operation of the SCC is shown in flow diagram form in FIGURE 10.10. Again the condition TBC≠OCC is required to assure that the LA level has been loaded.

Let us start with the simplest case first wherein no action is required by SCC. This case arises when the level at which SCC stands does not contain a store-to-external memory and in addition, the F bit is "0". This condition causes AND gates A–208 and A–197 to energize O–83 in FIGURE 3.7. The output of O–83 energizes O–115 in FIGURE 4.11 which turns "off" (see FIGURE 2.1) the $C_j$ bit by means of A–292. Such action is necessary to block future compares or matches with this register until it is again loaded by the I-Unit.

O–115 also turns on FF–32 by means of A–286 ($\overline{\text{T–11M}}$) is assumed to be a "1"). The output of FF–32 feeds A–346 in FIGURE 5.11. If $F_j$ has not been set during the cycle in which $C_j$ is set to "0," the input line, $\overline{\text{SCC DECODE FORWARD}}$, to A–346 will be up or a "1." Thus, A–346 will be completely energized (assuming $\overline{\text{HOUSECLEAN MODE}}$=1) and will in turn energize O–133. The output of O–133 feeds the advance interlock circuits in FIGURE 5.12 which advances the SCC (FIGURE 5.13) if SCC≠ABC. The SCC advance pulse resets FF–32.

The next case to consider is that of forwarding when the SCC level does not contain a store-to-external memory instruction. For any forwarding situation, the output of O–80 in FIGURE 3.7 is a "1" since A–205 is up. O–80 feeds A–287 in FIGURE 4.11. If the OK bit of level *j* is set to "1" (it is assumed that SCC=*j*) and if I-Checker priority exists for forwarding, then A–287 is energized. (Incidentally, FF–32 is turned on since the output of O–115 is also a "1" for the case being described. However, its output is prevented from doing anything harmful because A–346 (FIGURE 5.11) is down since F=1.) A–287 turns on FF–33 and starts the Forward Timer T–10. FF–33 gates the DATA from $LA_j$ to the I-Checker while T–10 times the transfer. The $H_j$ bit determines which check code the checker should check. This check is performed by A–289 and A–290 in FIGURE 4.11. At the end of the check cycle, the outputs of the checker (data and E-Unit type check code) are sampled by a group of AND gates A–297 . . . A–299 (FIGURE 4.1). At this time, $F_j$ is set to "0" by A–332. Once $F_j$ has been set to "0," the output of FF–32 becomes effective. The turning off of $F_j$ makes the output of inverter I–24 (FIGURE 3.7) become a "1" which serves as an input to A–346 in FIGURE 5.11. Once again when all the conditions are met for advancing SCC, SCC is advanced and FF–32 is reset.

Another case to be considered is a store-to-external memory. If a "forward" condition also exists, the forwarding takes place first as described above. The decision that a store is required appears on the output of either O–81 or O–85 (FIGURE 3.7). The output of O–81 indicates that a check bit conversion is required before the store takes place. The output of O–85 indicates that a store is required, but no check bit conversion is needed. Let us take the case requiring a check bit conversion. The output of O–81 feeds A–303 in FIGURE 4.13. If the $OK_j$ is a "1", if no forwarding is required and if the checker priority exists, A–303 will turn "on" FF–34 and start the store check timer T–11. FF–34 gates the DATA from $LA_j$ to the checker. T–11 times the transfer and provides a signal to the checker indicating that the E-Unit type check code is to be decoded. At the end of the check cycle, the outputs of the checker (data and memory type check code) are sampled into LA level *j*. FF–34 is then turned off. FF–35 remembers that a check bit conversion has taken place. The output of FF–35 feeds A–312 in FIGURE 4.14. The output of A–312 turns on FF–36 when the MBCU address bus priority exists. The output of FF–36 provides the gating of LA level *j* (by means of A–315) to the MBCU and also provides the STORE REQUEST signal. When the MBCU sends a MEMORY BUS ACCEPT signal, A–311 turns "off" FF–36 and A–311 energizes A–380 which turns off the $S_j$ bit. At this point, the output of the SCC decoder (FIGURE 3.7) will indicate NO SCC ACTION required. If no Forwarding is needed, SCC will then be advanced as described previously. If Forwarding is required, it will also proceed as already described. The SCC advance signal resets all memory FF's associated with SCC action.

The final case to be described is the case of a store in which no check bit conversion is necessary. The output of O–85 (FIGURE 3.7) will be a "1" for this case, and its outputs feeds A–313 in FIGURE 4.14. If address bus priority exists, FF–36 will be turned "on" ($\overline{T\text{–}11M}$ will be a "1") to initiate the store request as before. The remainder of this cycle is the same as for the check bit conversion case just described.

IV–N. *Houseclean and Recovery Action*

If a RECOVERY is required because of program interruption or a "successful" conditional branch, there are some necessary "housecleaning" functions which must be performed. When a RECOVERY is required, the ABC is not advanced. The housecleaning that is performed is the following:

(1) The SCC must execute all stores up to the level at which ABC resides. If the level at which ABC has stopped contains a store, this store is executed if the RECOVERY is not type 1 as determined by the condition of FF–26 (FIGURE 4.9).

(2) After the SCC has reached the ABC count, it is then necessary to restore any old index words which have been loaded into LA by the I-Unit. These index words will lie between the IAUC (IAUC stops because I-Unit cannot load anymore) and the ABC.

(3) The contents of the IC+1 buffer must be gated into the I-Unit Instruction Counter.

IV–O. *Details of Houseclean Action*

A flow diagram of the Houseclean Action is shown in FIGURE 10.11. When a RECOVERY is required, one of the RECOVERY REQUIRED flip-flops (FF–26, FF–27 or FF–28) is turned on (see FIGURE 4.9). Any one of these FF's will energize OR circuit O–108 whose output has several functions among which are resetting the controls of the E-Unit, and feeding I–27. The output of I–27 prevents a future turn on of FF–1 in FIGURE 4.2 by making the line NO RECOVERY REQUIRED connected to AND gate A–2 have the value "0". Also the output of I–27 blocks the advance of ABC by deconditioning AND gates A–335, A–336, A–337, A–338,

A–339 and A–340 in FIGURE 5.8. Thus, the effect of the RECOVERY FF's is to suspend the loading of LA by the I-Unit to prevent ABC advance and also to reset the E-Unit controls.

The SCC continues its operation normally until the SCC and ABC are at the same level or count. When SCC=ABC two cases arise. The first occurs when the RECOVERY is not of type 1 (i.e. FF–26 in FIGURE 4.9 is not "on"). In this case, one input to O–119 in FIGURE 4.13 becomes a "0"; however, since the other input is a "1", normal action may take place at A–303 in FIGURE 4.13. A similar condition exists with regards to O–103 and A–313 in FIGURE 4.14. Also, in order to turn "on" the HOUSECLEAN MODE FF (FF–38, FIGURE 4.15) it is necessary to have the ADVANCE SCC CONDITION signal (see A–317 in FIGURE 4.15) which exists only after all SCC action has been accomplished. Thus, for a RECOVERY which is not type 1, HOUSECLEAN MODE would be turned on only after all stores up to and including the level at which ABC resides had been completed. At that time, A–317 would energize O–126 which then would turn "on" FF–38.

The second case to be considered involves a RECOVERY type 1. In this case FF–26 (FIGURE 4.9) contains a "1". Therefore when SCC=ABC, both inputs to O–119 (FIGURE 4.13) will be "0", thus blocking A–303. Similarly, both inputs to O–103 in FIGURE 4.14 are "0" which blocks A–313. Finally, the "1" output of FF–26 energizes A–318 to turn on HOUSECLEAN MODE (FF–38); the result being that the SCC is not allowed to execute any stores when it gets to the level where ABC is standing.

Now that HOUSECLEAN MODE FF–38 has been entered, all normal control functions are blocked. It is also necessary to transfer all old index words to the I-Unit to restore the index memory to its proper state. However, before this is done, it is necessary to transfer the branch address to the I-Unit if the RECOVERY is a branch RECOVERY (FF–27 in FIGURE 4.9). The "0" side of FF–27 prevents the advancing of SCC and ABC by de-conditioning A–348 (FIGURE 5.11) in the event of a branch RECOVERY. The "1" side of FF–27 feeds A–366 in FIGURE 4.16 which turns on FF–41. FF–41 in turn initiates a check cycle to transfer the address to the I-Unit. This transfer is accomplished by A–369 in FIGURE 4.16, and O–97 in FIGURE 4.6. The output of O–97 turns on FF–19 to gate out LA, and also starts Timer T–9 which times the transfer. A–365 in FIGURE 4.6 provides the signal for gating the output of the checker into the Instruction Counter of the I-Unit. At the end of the transfer, A–367 (FIGURE 4.16) sets FF–41 to "0" and sets FF–42 to "1". The transfer of the branch address to the I-Unit is now completed.

Now we must consider the transfer of old index words to the I-Unit. This transfer is accomplished in the following manner. The decoder in FIGURE 3.8 determines whether or not there is an old index word in the level specified by SCC. If there is not, the output of I–25 is a "1" which feeds AND circuits A–348 and A–383 in FIGURE 5.11. If there is no branch address transfer in progress (which we shall assume) then one of these AND circuits will energize O–133. The output of O–133 feeds A–362 in FIGURE 5.8 which energizes O–131 in FIGURE 5.8 which in turn provides the advance condition for ABC. A–362 also energizes A–363 in FIGURE 5.9 which in turn will advance SCC via O–139 in FIGURE 5.12. Thus, both ABC and SCC are advanced simultaneously when SCC does not decode an old index word in a particular level.

If SCC does decode an old index word, the output of O–86 in FIGURE 3.8 will be a "1" which feeds A–235 and A–236 in FIGURE 4.6. A–235 requests use of the checker. If checker priority exists, A–236 turns on FF–19 and starts timer T–9, thus initiating a transfer of the old index word through the I-Checker to the I-Unit.

A–244 provides the signal which permits the address of the index word to be gated to the I-Unit. A–242 provides the signal to sample into the register which is to receive the index address. As the index address is being gated to the I-Unit, it is compared with the addresses in all of the LA registers other than the one being used. This comparison is shown in FIGURE 7.3. ([C] denotes a group of exclusive OR's, etc. used to form a compare circuit.) If a "compare" is found, each level which compares with the index address being sent to the I-Unit will have its XRS bit set to "0" by A–384 and O–143 in FIGURE 2.2. This setting is necessary for the following reason. Suppose that the same index word were modified twice in succession by the I-Unit, thereby requiring two loadings of old index words into LA. Now, if a RECOVERY is required, only the first of these should be restored since it represents the oldest index word with that address. The setting of XRS to "0" for the second word will cause SCC to decide that the second level does not contain an old index word.

After the transfer of the index word to the I-Unit, T–9 turns off FF–19 and turns on FF–20 (FIGURE 4.6). The output of FF–20 feeds A–349 (FIGURE 5.11) which provides the condition for advancing SCC and ABC simultaneously as described previously.

The action continues in this fashion until SCC=IAUC and the SCC ADVANCE CONDITION exists. At this point all of the housecleaning function has been performed except for the transfer of the IC+1 buffer content to the I-Unit Instruction Counter (provided we are not in a Branch Recovery cycle since the branch address has already been set into the Instruction Counter for this case). When SCC=IAUC and ADVANCE SCC CONDITION exists, A–323 in FIGURE 4.15 indicates that LA is empty. A–322 energizes A–320 which turns "on" FF–39 and starts timer T–12 which initiates the transfer of the IC+1 buffer to the Instruction Counter. If the RECOVERY is not a branch RECOVERY, A–361 will sample IC+1 into the I-Unit Instruction Counter at the end of the transfer. When timer T–12 has timed out, it also turns "on" FF–40 and resets FF–39 by means of A–321. Timer T–12 also reset the I-Unit controls. FF–40 resets the RECOVERY flip-flops (FF–26, FF–27, FF–28 in FIGURE 4.9), thus returning the machine to a state from which it may resume its processing.

While a preferred embodiment of the look ahead invention has been disclosed herein, many variations and modifications may be made thereto without departing from the spirit of the invention as expressed in the appended claims. For example, the checking features, interrupt operation, and addressable internal memories may be omitted. Further, any number of LA levels may be used, while the priorities noted in FIGURES 6.3 and 6.1 may be altered.

What is claimed is:

1. A data processing system including memory means having information stored therein at various addresses, said information consisting of data words and instruction words, control means for transferring information to and from said memory means, an instruction unit for selecting information in said memory means, said instruction unit including an instruction counter for specifying the addresses of instruction words stored in said memory means and an instruction register for storing instruction words transferred from said memory means, said instruction words specifying requested data words and operation codes, and an execution unit for performing a processing operation on data words, in combination with a plurality of addressable buffer registers for storing information, a plurality of changable addressing means associated with said buffer registers, each of said addressing means selectively controlling said buffer registers to perform processing operations thereon in accordance with said instruction words, and means interlocking the operation of said plurality of addressing means so that a processing operation is performed on a buffer register by only one of said addressing means at a time.

2. A data processing system as defined in claim 1 wherein said plurality of changeable addressing means comprises a first ring counter for controlling the transfer of information to a buffer register corresponding to the count in said first counter, means to step the count of said first counter to correspond to successive buffer registers, a second ring counter for controlling the checking of information in a buffer register corresponding to the count in said second counter, means to step the count of said second counter to correspond to successive buffer registers, a third ring counter for controlling the transfer of information to said execution unit from a buffer register corresponding to the count in said third counter, means to step the count of said third counter to correspond to successive buffer registers, a fourth ring counter for transferring information from said execution unit to a buffer register corresponding to the count in said fourth counter, means for stepping the count of said fourth counter to correspond to successive buffer registers, a fifth ring counter for transferring information to said memory means from a buffer register corresponding to the count in said fifth counter, means inhibiting the control function of each of said second, third, fourth and fifth counters when its count equals the count of the next lower order counter, and means inhibiting said first counter when the count thereof is one unit less than the count of said fifth counter.

3. A data processing system as defined in claim 1 wherein said plurality of changeable addressing means comprises $n$ ring counters for controlling different processing operations, a first ring counter for controlling the transfer of information to a buffer register corresponding to the count in said first counter, means to step the count of said first counter to correspond to successive buffer registers, a second ring counter for controlling the checking of information in a buffer register corresponding to the count in said second counter, means to step the count of said second counter to correspond to successive buffer registers, a third ring counter for controlling the transfer of information to said execution unit from a buffer register corresponding to the count in said third counter, means to step the count of said third counter to correspond to successive buffer registers, a fourth ring counter for transferring information from each execution unit to a buffer register corresponding to the count in said fourth counter, means for stepping the count of said fourth counter to correspond to successive buffer registers, a fifth ring counter for transferring information to said memory means from a buffer register corresponding to the count in said fifth counter, means inhibiting the control function of each of said second, third, fourth and fifth . . . $(n-1)$th and $n$th counters when its count equals the count of the next lower order counter, and means inhibiting said first counter when the count thereof is one unit less than the count of said $n$th counter.

4. A data processing system as defined in claim 1 wherein each changeable addressing means includes a plural stage ring counter.

5. A data processing system as defined in claim 3 wherein each counter has a stage associated with each of said buffer registers.

6. A data processing system as defined in claim 1 further comprising a first counter holding a first value and controlling the transfer of both an instruction word from said instruction register and also a first requested data word to the buffer register specified by said first value, means to step said first counter to a second value, a second counter for controlling the transfer of information from said buffer registers to said execution unit, means to step said second counter to said first value to control the transfer of said first data word and the operation code from said specified buffer register to said execution unit, means responsive to said last mentioned transfer to step said second counter to said second value, a third counter for controlling the transfer of a processed data word from said execution unit to one of said buffer registers, means to step said third counter to said second value to transfer said processed data word to the buffer register specified by said second value, a fourth counter for controlling the transfer of data words from said buffer registers to said memory means, and means to step said fourth counter to said second value to transfer said processed data word from the buffer register specified by said second value to said memory means.

7. A data processing system as defined in claim 1 wherein an instruction word has a data memory address field and an operation code field, and further comprising means for storing data and corresponding data memory addresses in said buffer registers, comparing means for performing a comparison between said data memory address field and said data memory addresses, means responsive to a match of said addresses to select data from the matching buffer register, and means responsive to a non-match of said addresses to select data from said memory means at the address specified by said data memory address field.

8. A data processing system as defined in claim 7 wherein each buffer register includes a first bistable stage selectively settable to a first and a second condition, means for permitting said comparison when said first bistable device is in its first condition, means for setting said first bistable device to its second condition after said comparison is performed, and means to prevent said comparison when said first bistable device is in its second condition.

9. A data processing system as defined in claim 8 wherein each buffer register includes a second bistable stage settable to a first and a second condition, means for forwarding data from said matching buffer register to another buffer register when the second bistable stage of said matching register is in its first condition, means responsive to said forwarding means for setting said second bistable stage to its second condition, and mean for preventing the forwarding of data when said second bistable stage is in the second condition.

10. A data processing system as defined in claim 9 further comprising means for storing in said matching buffer register a forwarding address specifying the buffer register to which the data is to be forwarded.

11. A data processing system as defined in claim 1 further comprising means for storing instruction words in said buffer registers, each buffer register containing a recovery field holding a count which is one unit greater than the memory address of the instruction word stored in each buffer register, means for interrupting the operation of said system, means for terminating the interruption, and means to set into said instruction counter the recovery field of the buffer register containing the instruction word associated with said execution unit when said interruption occurred.

12. A data processing system as defined in claim 11 further comprising an index memory containing the data word memory address indexes the purpose of which is to alter data word addresses to obtain effective data word addresses, means for storing in said instruction register an instruction word requesting a modification of an index, means for storing said index in a buffer register, and means for returning said index to said index memory when an interruption of said system occurs.

13. A data processing system as defined in claim 1 further comprising means for decoding the operation code of each instruction word stored in said instruction register, means responsive to said decoding means for generating a plurality of control bits associated with each instruction word, and means for storing said each instruction word and associated control bits in the same buffer register, said buffer register being specified by one of said changeable addressing means.

14. A data processing system as defined in claim 1 further comprising means in each of said buffer registers for indicating whether a data word has been stored therein.

References Cited in the file of this patent

UNITED STATES PATENTS 2,959,351 Hamilton et al. ---------- Nov. 8, 1960

OTHER REFERENCES

BRL Report No. 1115, March 1961, "A Third Survey of Domestic Electronic Digital Computing Systems," by Martin H. Weik, Ballistic Research Laboratories, Aberdeen Proving Ground, Maryland; p. 369 relied on.